US012015784B2

(12) United States Patent
Zhang et al.

(10) Patent No.: US 12,015,784 B2
(45) Date of Patent: Jun. 18, 2024

(54) MULTI-MODELS FOR INTRA PREDICTION

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Hongbin Liu, Beijing (CN); Jizheng Xu, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 18/345,608

(22) Filed: Jun. 30, 2023

(65) Prior Publication Data

US 2023/0345009 A1 Oct. 26, 2023

Related U.S. Application Data

(63) Continuation of application No. 17/246,821, filed on May 3, 2021, which is a continuation of application No. PCT/CN2019/116015, filed on Nov. 6, 2019.

(30) Foreign Application Priority Data

Nov. 6, 2018 (WO) ................ PCT/CN2018/114158
Dec. 1, 2018 (WO) ................ PCT/CN2018/118799
(Continued)

(51) Int. Cl.
*H04N 7/12* (2006.01)
*H04N 19/105* (2014.01)
(Continued)

(52) U.S. Cl.
CPC ......... *H04N 19/149* (2014.11); *H04N 19/105* (2014.11); *H04N 19/11* (2014.11);
(Continued)

(58) Field of Classification Search
CPC ............................ H04N 19/149; H04N 19/42
See application file for complete search history.

(56) References Cited

U.S. PATENT DOCUMENTS 9,288,500 B2 3/2016 Budagavi
9,307,237 B2 4/2016 Liu
(Continued)

FOREIGN PATENT DOCUMENTS

CN 101502120 A 8/2009
CN 101877785 A 11/2010
(Continued)

OTHER PUBLICATIONS

Examination Report from Australian Patent Application No. 2020226566 dated Nov. 7, 2022. (4 pages).
(Continued)

*Primary Examiner* — Y Lee
(74) *Attorney, Agent, or Firm* — Conley Rose, P.C.

(57) ABSTRACT

A method for video processing is provided. The method includes determining, for a conversion between a current video block of a video that is a chroma block and a coded representation of the video, a final prediction P(x, y) of a chroma sample at a position (x, y) in the current video block as a combination of prediction results of multiple cross-component linear models (MCCLMs), wherein the MCCLMs are selected based on the position (x, y) of the chroma sample; and performing the conversion based on the final prediction.

20 Claims, 39 Drawing Sheets

(30) Foreign Application Priority Data

| | | |
|---|---|---|
| Dec. 7, 2018 | (WO) | PCT/CN2018/119709 |
| Dec. 29, 2018 | (WO) | PCT/CN2018/125412 |
| Jan. 1, 2019 | (WO) | PCT/CN2019/070002 |
| Feb. 22, 2019 | (WO) | PCT/CN2019/075874 |
| Feb. 24, 2019 | (WO) | PCT/CN2019/075993 |
| Feb. 26, 2019 | (WO) | PCT/CN2019/076195 |
| Mar. 24, 2019 | (WO) | PCT/CN2019/079396 |
| Mar. 25, 2019 | (WO) | PCT/CN2019/079431 |
| Mar. 26, 2019 | (WO) | PCT/CN2019/079769 |

(51) Int. Cl.

| | |
|---|---|
| ***H04N 19/11*** | (2014.01) |
| ***H04N 19/132*** | (2014.01) |
| ***H04N 19/149*** | (2014.01) |
| ***H04N 19/159*** | (2014.01) |
| ***H04N 19/176*** | (2014.01) |
| ***H04N 19/184*** | (2014.01) |
| ***H04N 19/186*** | (2014.01) |
| ***H04N 19/189*** | (2014.01) |
| ***H04N 19/30*** | (2014.01) |
| ***H04N 19/42*** | (2014.01) |
| ***H04N 19/50*** | (2014.01) |
| ***H04N 19/593*** | (2014.01) |
| ***H04N 19/70*** | (2014.01) |

(52) U.S. Cl.
CPC ......... *H04N 19/132* (2014.11); *H04N 19/159* (2014.11); *H04N 19/176* (2014.11); *H04N 19/184* (2014.11); *H04N 19/186* (2014.11); *H04N 19/189* (2014.11); *H04N 19/30* (2014.11); *H04N 19/42* (2014.11); *H04N 19/50* (2014.11); *H04N 19/593* (2014.11); *H04N 19/70* (2014.11)

(56) References Cited

U.S. PATENT DOCUMENTS

| | | | |
|---|---|---|---|
| 9,462,273 | B2 | 10/2016 | Zhang |
| 9,948,930 | B2 | 4/2018 | Panusopone |
| 10,045,023 | B2 | 8/2018 | Pettersson |
| 10,063,886 | B2 | 8/2018 | Ye |
| 10,200,700 | B2 | 2/2019 | Zhang |
| 10,237,558 | B2 | 3/2019 | Ikeda |
| 10,277,895 | B2 | 4/2019 | Panusopone |
| 10,326,986 | B2 | 6/2019 | Zhang |
| 10,326,989 | B2 | 6/2019 | Hong |
| 10,368,107 | B2 | 7/2019 | Zhang |
| 10,382,781 | B2 | 8/2019 | Zhao |
| 10,419,757 | B2 | 9/2019 | Chen |
| 10,477,240 | B2 | 11/2019 | Zhang |
| 10,484,712 | B2 | 11/2019 | Zhang |
| 10,499,068 | B2 | 12/2019 | Hannuksela |
| 10,523,949 | B2 | 12/2019 | Panusopone |
| 10,542,264 | B2 | 1/2020 | Panusopone |
| 10,567,808 | B2 | 2/2020 | Panusopone |
| 10,575,023 | B2 | 2/2020 | Panusopone |
| 10,602,180 | B2 | 3/2020 | Chen |
| 10,609,402 | B2 | 3/2020 | Zhao |
| 10,616,596 | B2 | 4/2020 | Panusopone |
| 10,645,395 | B2 | 5/2020 | Yu |
| 10,674,165 | B2 | 6/2020 | Panusopone |
| 10,694,188 | B2 | 6/2020 | Hong |
| 10,701,402 | B2 | 6/2020 | Baylon |
| 10,742,978 | B2 | 8/2020 | Abe |
| 10,939,128 | B2 | 3/2021 | Zhang |
| 10,979,717 | B2 | 4/2021 | Zhang |
| 10,999,581 | B2 | 5/2021 | Zhang |
| 11,019,344 | B2 | 5/2021 | Zhang |
| 11,025,915 | B2 | 6/2021 | Zhang |
| 11,057,642 | B2 | 7/2021 | Zhang |
| 11,115,655 | B2 | 9/2021 | Zhang |
| 11,245,892 | B2 | 2/2022 | Zhang |
| 11,438,581 | B2 | 9/2022 | Zhang |
| 11,438,598 | B2 | 9/2022 | Zhang |
| 11,729,405 | B2 | 8/2023 | Zhang |
| 2008/0089411 | A1 | 4/2008 | Wenger |
| 2012/0287995 | A1 | 11/2012 | Budagavi |
| 2012/0328013 | A1 | 12/2012 | Budagavi |
| 2013/0128966 | A1 | 5/2013 | Gao |
| 2013/0188696 | A1 | 7/2013 | Liu |
| 2013/0188703 | A1 | 7/2013 | Liu |
| 2013/0188705 | A1 | 7/2013 | Liu |
| 2013/0272396 | A1 | 10/2013 | Liu |
| 2014/0233650 | A1 | 8/2014 | Zhang |
| 2014/0355692 | A1 | 12/2014 | Ramasubramonian |
| 2015/0036745 | A1 | 2/2015 | Hsu |
| 2015/0098510 | A1 | 4/2015 | Ye |
| 2015/0365684 | A1 | 12/2015 | Chen |
| 2016/0105657 | A1 | 4/2016 | Zhang |
| 2016/0277762 | A1 | 9/2016 | Zhang |
| 2017/0016972 | A1 | 1/2017 | Bhat |
| 2017/0085917 | A1 | 3/2017 | Hannuksela |
| 2017/0150176 | A1 | 5/2017 | Zhang |
| 2017/0150183 | A1 | 5/2017 | Zhang |
| 2017/0244975 | A1 | 8/2017 | Huang |
| 2017/0295365 | A1 | 10/2017 | Budagavi |
| 2017/0295366 | A1 | 10/2017 | Chen |
| 2017/0347123 | A1 | 11/2017 | Panusopone |
| 2017/0359595 | A1 | 12/2017 | Zhang |
| 2017/0366818 | A1 | 12/2017 | Zhang |
| 2017/0374384 | A1 | 12/2017 | Xiu |
| 2018/0041779 | A1 | 2/2018 | Zhang |
| 2018/0048889 | A1 | 2/2018 | Zhang |
| 2018/0063527 | A1 | 3/2018 | Chen |
| 2018/0063531 | A1 | 3/2018 | Hu |
| 2018/0063553 | A1 | 3/2018 | Zhang |
| 2018/0077426 | A1 | 3/2018 | Zhang |
| 2018/0115787 | A1 | 4/2018 | Koo |
| 2018/0139469 | A1 | 5/2018 | Lainema |
| 2018/0184103 | A1 | 6/2018 | Panusopone |
| 2018/0205946 | A1 | 7/2018 | Zhang |
| 2018/0220130 | A1 | 8/2018 | Zhang |
| 2018/0220138 | A1 | 8/2018 | He |
| 2019/0014316 | A1 | 1/2019 | Panusopone |
| 2019/0028701 | A1 | 1/2019 | Yu |
| 2019/0028702 | A1 | 1/2019 | Yu |
| 2019/0045184 | A1 | 2/2019 | Zhang |
| 2019/0082184 | A1 | 3/2019 | Hannuksela |
| 2019/0110045 | A1 | 4/2019 | Zhao |
| 2019/0110076 | A1 | 4/2019 | Lim |
| 2019/0174133 | A1 | 6/2019 | Abe |
| 2019/0268599 | A1 | 8/2019 | Hannuksela |
| 2019/0289306 | A1 | 9/2019 | Zhao |
| 2019/0297339 | A1 | 9/2019 | Hannuksela |
| 2019/0306516 | A1 | 10/2019 | Misra |
| 2019/0313108 | A1 | 10/2019 | Zhang |
| 2019/0342546 | A1 | 11/2019 | Lin |
| 2020/0128272 | A1 | 4/2020 | Jangwon |
| 2020/0154100 | A1 | 5/2020 | Zhao |
| 2020/0154115 | A1 | 5/2020 | Ramasubramonian |
| 2020/0177911 | A1 | 6/2020 | Aono |
| 2020/0195930 | A1 | 6/2020 | Choi |
| 2020/0195970 | A1 | 6/2020 | Ikai |
| 2020/0195976 | A1 | 6/2020 | Zhao |
| 2020/0252619 | A1 | 8/2020 | Zhang |
| 2020/0260070 | A1 | 8/2020 | Yoo |
| 2020/0267392 | A1 | 8/2020 | Lu |
| 2020/0288135 | A1 | 9/2020 | Laroche |
| 2020/0359051 | A1 | 11/2020 | Zhang |
| 2020/0366896 | A1 | 11/2020 | Zhang |
| 2020/0366910 | A1 | 11/2020 | Zhang |
| 2020/0366933 | A1 | 11/2020 | Zhang |
| 2020/0382769 | A1 | 12/2020 | Zhang |
| 2020/0382800 | A1 | 12/2020 | Zhang |
| 2020/0413062 | A1 | 12/2020 | Onno |
| 2021/0136392 | A1 | 5/2021 | Ma |
| 2021/0152837 | A1 | 5/2021 | Zhang |
| 2021/0211681 | A1 | 7/2021 | Zhang |
| 2021/0258571 | A1 | 8/2021 | Zhang |

(56) References Cited

U.S. PATENT DOCUMENTS

| | | | |
|---|---|---|---|
| 2021/0297656 | A1 | 9/2021 | Ma |
| 2021/0297694 | A1 | 9/2021 | Zhang |
| 2021/0344902 | A1 | 11/2021 | Zhang |

FOREIGN PATENT DOCUMENTS

| | | | |
|---|---|---|---|
| CN | 103096055 | A | 5/2013 |
| CN | 103379321 | A | 10/2013 |
| CN | 103650512 | A | 3/2014 |
| CN | 103782596 | A | 5/2014 |
| CN | 103856782 | A | 6/2014 |
| CN | 103916673 | A | 7/2014 |
| CN | 104380741 | A | 2/2015 |
| CN | 104471940 | A | 3/2015 |
| CN | 104718759 | A | 6/2015 |
| CN | 104871537 | A | 8/2015 |
| CN | 105472387 | A | 4/2016 |
| CN | 106464887 | A | 2/2017 |
| CN | 106664410 | A | 5/2017 |
| CN | 106664425 | A | 5/2017 |
| CN | 107005711 | A | 8/2017 |
| CN | 107079150 | A | 8/2017 |
| CN | 107079166 | A | 8/2017 |
| CN | 107181948 | A | 9/2017 |
| CN | 107211121 | A | 9/2017 |
| CN | 107211124 | A | 9/2017 |
| CN | 107431795 | A | 12/2017 |
| CN | 107534711 | A | 1/2018 |
| CN | 107787582 | A | 3/2018 |
| CN | 107836116 | A | 3/2018 |
| CN | 108293112 | A | 7/2018 |
| CN | 108464002 | A | 8/2018 |
| CN | 109005408 | A | 12/2018 |
| CN | 109218730 | A | 1/2019 |
| CN | 109274969 | A | 1/2019 |
| CN | 113491121 | B | 10/2021 |
| GB | 2495942 | A | 5/2013 |
| GB | 201802972 | | 2/2018 |
| JP | 201334163 | A | 2/2013 |
| JP | 2018056685 | A | 4/2018 |
| JP | 7123268 | B2 | 8/2022 |
| JP | 7212157 | B2 | 1/2023 |
| KR | 20140019388 | A | 2/2014 |
| RU | 2336663 | C1 | 10/2008 |
| RU | 2601843 | C2 | 11/2016 |
| RU | 2603548 | C2 | 11/2016 |
| TW | 201817236 | A | 5/2018 |
| TW | 201826796 | A | 7/2018 |
| TW | 201832562 | A | 9/2018 |
| WO | 2008123254 | A1 | 10/2008 |
| WO | 2013001794 | A1 | 1/2013 |
| WO | 2013102293 | A1 | 7/2013 |
| WO | 2014010943 | A1 | 1/2014 |
| WO | 2016066028 | A1 | 5/2016 |
| WO | 2016115708 | A1 | 7/2016 |
| WO | 2017139937 | A1 | 8/2017 |
| WO | 2017199800 | A1 | 11/2017 |
| WO | 2017203882 | A1 | 11/2017 |
| WO | 2018021374 | A1 | 2/2018 |
| WO | 2018030294 | A1 | 2/2018 |
| WO | 2018035130 | A1 | 2/2018 |
| WO | 2018039596 | A1 | 3/2018 |
| WO | 2018053293 | A1 | 3/2018 |
| WO | 2018092870 | A1 | 5/2018 |
| WO | 2018116802 | A1 | 6/2018 |
| WO | 2018116925 | A1 | 6/2018 |
| WO | 2018118940 | A1 | 6/2018 |
| WO | 2018132710 | A1 | 7/2018 |
| WO | 2018140587 | A1 | 8/2018 |
| WO | 2018174457 | A1 | 9/2018 |
| WO | 2018181448 | A1 | 10/2018 |
| WO | 2018236031 | A1 | 12/2018 |
| WO | 2019004283 | A1 | 1/2019 |
| WO | 2019006363 | A1 | 1/2019 |

OTHER PUBLICATIONS

Notice of Allowance from U.S. Appl. No. 17/246,794 dated Dec. 21, 2022.

International Search Report and Written Opinion from International Patent Application No. PCT/CN2019/115985 dated Feb. 1, 2020(10 pages).

International Search Report and Written Opinion from International Patent Application No. PCT/CN2019/115992 dated Feb. 5, 2020(10 pages).

International Search Report and Written Opinion from International Patent Application No. PCT/CN2019/115999 dated Jan. 31, 2020(10 pages).

International Search Report and Written Opinion from International Patent Application No. PCT/CN2019/116015 dated Jan. 23, 2020(10 pages).

International Search Report and Written Opinion from International Patent Application No. PCT/CN2019/116027 dated Jan. 23, 2020 (10 pages).

International Search Report and Written Opinion from International Patent Application No. PCT/CN2019/116028 dated Jan. 23, 2020 (9 pages).

International Search Report and Written Opinion from International Patent Application No. PCT/CN2019/121850 dated Feb. 7, 2020 (11 pages).

International Search Report and Written Opinion from International Patent Application No. PCT/CN2019/123229 dated Mar. 6, 2020 (9 pages).

International Search Report and Written Opinion from International Patent Application No. PCT/CN2019/076361 dated May 18, 2020 (10 pages).

International Search Report and Written Opinion from International Patent Application No. PCT/CN2019/076362 dated May 9, 2020 (11 pages).

International Search Report and Written Opinion from International Patent Application No. PCT/CN2020/080823 dated Jun. 16, 2020 (9 pages).

International Search Report and Written Opinion from International Patent Application No. PCT/CN2020/081304 dated Jun. 23, 2020 (11 pages).

Non-Final Office Action from U.S. Appl. No. 16/850,509 dated Jun. 11, 2020.

Non-Final Office Action from U.S. Appl. No. 16/987,670 dated Sep. 8, 2020.

Non-Final Office Action from U.S. Appl. No. 16/940,877 dated Sep. 17, 2020.

Non-Final Office Action from U.S. Appl. No. 16/940,826 dated Oct. 1, 2020.

Non-Final Office Action from U.S. Appl. No. 16/987,844 dated Sep. 25, 2020.

Non-Final Office Action from U.S. Appl. No. 16/993,526 dated Oct. 9, 2020.

Notice of Allowance from U.S. Appl. No. 16/993,487 dated Sep. 29, 2020.

Notice of Allowance from U.S. Appl. No. 16/940,877 dated Dec. 9, 2020.

Examination Report from Indian Patent Application No. 202147020318 dated Feb. 22, 2022 (6 pages).

Extended European Search Report from European Patent Application No. 19881464.2 dated Mar. 4, 2022 (11 pages).

Extended European Search Report from European Patent Application No. 19881776.9 dated Mar. 2, 2022 (14 pages).

Extended European Search Report from European Patent Application No. 19883299.0 dated Mar. 9, 2022 (9 pages).

Notice of Allowance from U.S. Appl. No. 17/201,711 dated Feb. 24, 2022.

Non-Final Office Action from U.S. Appl. No. 17/246,794 dated Feb. 28, 2022.

Extended European Search Report from European Patent Application No. 19881016.0 dated Jan. 7, 2022 (10 pages).

Non-Final Office Action from US Patent Application No. 17/466,188 dated Dec. 24, 2021.

(56) References Cited

OTHER PUBLICATIONS

Document: JVET-D0110, Zhang, K., et al., "Enhanced Cross-component Linear Model Intra-prediction," Joint Video Exploration Team (JVET) of ITU-T SG 16 WP 3 and ISO/IEC JTC 1/SC 29/WG 11 4th Meeting: Chengdu, CN, Oct. 15-21, 2016, 5 pages.
Document: JVET-M0211-v3, Huo, J., et al., "CE3-related: Fixed Reference Samples Design for CCLM," Joint Video Experts Team (JVET) of ITU-T SG 16 WP 3 and ISO/IEC JTC 1/SC 29/WG 11 13th Meeting: Marrakech, MA, Jan. 9-18, 2019, 6 pages.
Ma et al. "CE3: Multi-directional LM (MDLM) (Test 5.4.1 and 5.4.2)" Joint Video Experts Team (JVET) of ITU-T SG 16 WP 3 and 1SO/IEC JTC 1/SC 29/VVG 11, 12th Meeting: Macao, CN, JVET-L0338, Oct. 3-12, 2018.
JVET-L0191.
Laroche et al. "Non-CE3: On Cross-Component Linear Model Simplification," Joint Video Experts Team (JVET) of ITU-T SG 16 WP3 and ISO/IEC JTC 1/SC 29/VVG 11, 11th Meeting: Ljubljana, SI, Jul. 10-18, 2018, JVET-K0204, 18, Jul. 2018.
Zhang et al. "Enhanced Cross-Component Linear Model Intra-Prediction" Joint Video Exploration Tearn (JVET) of ITU-T SG 16 WP 3 and 1SO/IEC JTC 1/SC 29/WG 11, 4th Meeting: Chengdu, CN, Oct. 15-21, 2016, JVET-00110 Oct. 21, 2016.
Zhang et al. "CE3-related: CCLM Prediction with Single-Line Neighbouring Luma Samples," Joint Video Experts Team (JVET) of ITU-T SG 16 WP3 and ISO/IEC JTC 1/SC 29/WG 11, 12th Meeting, Macao, CN, JVET-L0329, Oct. 12, 2018.
WAN "Non-CE3: CCLM Performance of Extended Neighboring Region," Joint Video Experts Team (JVET) of ITU-T S, SG 16 WP 3 and 1SO/IEC JTC 1/SC 29/VVG 11, JVET-L0107, Oct. 12, 2018.
Choi et al." CE3-related: Reduced Number of Reference Samples of CCLM Parameter Calculation," Joint Video t:: Experts Tearn (JVET) of ITU-T SG 16 WP 3 and ISO/IEC JTC 1/SC 29/VVG 11, 12th Meeting: Macao, CN, Oct. 12, 2018, JVET-L0138, Oct. 2018.
Ma et al. "CE3-related: CCLM Coefficients Derivation Method without Down-Sampling Operation" JVET Document Management Systems, JVET-L0341, 2018.
Chen et al. "Algorithm Description of Joint Exploration Test Model 4," Joint Video Exploration Team (JVET) of ITU-T SG 16 WP3 and ISO/IEC JTC 1/SC 29/WG 11, 4th Meeting: Chengdu, CN, Oct. 21, 2016, JVET-D1001, Oct. 2016.
Ma et al. "CE3: CCLM/MDLM Using Simplified Coefficients Derivation Method (Test 5.6.1, 5.6.2 and 5.6.3)" Joint f/ideo Experts Team (JVET) of ITU-T SG 16 WP 3 and 1SO/IEC JTC 1/SC 29/VVG, 11, 12th Meeting: Macao, CN, Oct. 12, 2018, JVET-L0340-rl, Oct. 2018.
Zhuo et al. "CE3-related: Fixed Reference Samples Design for CCLM," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0211v1, 2019.
Zhang et al. "Enhanced Cross-Component Linear Model for Chroma Intra-Prediction in Video Coding," IEEE Transactions on Image Processing, Aug. 2018, 27(8):3983-3997.
Bross et al. "Versatile Video Coding (Draft 1)" Joint Video Experts Team (JVET) of ITU-T SG 16 WP 3 and ISO/IEC JTC 1/SC 29/WG 11, 10th Meeting: San Diego, US, Apr. 10-20, 2018, Document JVET-J1001-v1 & v2.
Bross et al. "Versatile Video Coding (Draft 2)" Joint Video Experts Team (JVET) of ITU-T SG 16 WP 3 and ISO/IEC JTC 1/SC 29/WG 11, 11th Meeting: Ljubljana, SI, Jul. 10-18, 2018, JVET-K1001, Jul. 2018.
Zhao et al. "CE3-related: Simplified Look-Up Table for CCLM Mode", Joint Video Experts Team (JVET) of ITU-T SG 6 WP 3 and ISO/IEC JTC 1/SC 29/WG 11, 13th Meeting, JVET-M0493, Jan. 2019.
Ma et al. "CE3: Classification-based mean value for CCLM Coefficients Derivation", Joint Video Experts Team (JVET) of ITU-T SG 16 WP 3 and 1SO/IEC JTC 1/SC 29/VVG 11, 13th Meeting, JVET-M0401, Jan. 2019.
Chen et al. "Algorithm Description of Versatile Video Coding and Test Model 3 (VTM 3)" Joint Video Experts Team (JVET) of ITU-T SG 16 WP3 and 1SO/IEC JTC 1/SC 29/VVG 11, 2018, Document No. JVET-L1002.
Choi et al. Non-CE3: CCLM Prediction for 4:2:2 and 4:4:4 Color Format Joint Video Experts Team (JVET) of ITU-T SG 16 WP 3 and ISO/IEC JTC 1/SC 29/VVG 11, 14th Meeting, Geneva, CH, Mar. 2019, Document JVET-N0229.
Van Der Auwera et al. "Description of Core Experiment 3: Intra Prediction and Mode Coding," Joint Video Experts Team (JVET) of ITU-T SG 16 WP 3 and ISO/IEC JTC 1/SC 29/WG 11, 10th Meeting, San Diego, USA, Apr. 10-20, 2018, document JVET-J1023, 2018.
Lin et al. "CE3-Related: Non-Zero Reference Lines Padding Method on the Top-Line of CTU," Joint Video Experts Team (JVET) of ITU-T SG 16 WP 3 and ISO/IEC JTC 1/SC 29/WG 11, 12th Meeting, Macao, CN Oct. 3-12, 2018, JVET-L0515, 2018.
Ikeda et al. "CE3-Related: Sampling Point Extension of CCLM," Joint Video Experts Team (JVET) of ITU-T SG 16 WP 3 and ISO/IEC JTC 1/SC 29/WG 11 15th Meeting, Gothenburg, SE, Jul. 3-12, 2019, document JVET-O0412, 2019.
Zhang et al. "Multi-Model Based Cross-Component Linear Model Chroma Intra-Prediction for Video Coding," 2017 IEEE Visual Communications and Image Processing (VCIP), St. Petersburg, USA, 2017.
Sjoberg et al. "Description of SDR and HDR Video Coding Technology Proposal by Ericsson and Nokia," Joint Video Exploration Team (JVET) of ITU-T SG 16 WP 3 and ISO/IEC JTC 1/SC 29/WG 11 10th Meeting: San Diego, CA, USA, Apr. 10-20, 2018, document JVET-J0012, 2018.
Filippov et al. "CE3-Related: Reference Sample Processing for Wide-Angle Intra-Prediction," Joint Video Experts Team (JVET) of ITU-T Sg 16 WP 3 and ISO/IEC JTC 1/SC 29/WG 11 11th Meeting: Ljubljana, SI, Jul. 10-18, 2018, document JVET-K0059, 2018.
Van Der Auwera et al. "BoG Report on Intra Prediction and Mode Coding (CE3-Related)," Joint Video Experts Team (JVET) of ITU-T SG 16 WP 3 and ISO/IEC JTC 1/SC 29/WG 11 11th Meeting: Ljubljana, SI, Jul. 10-18, 2018 document JVET-K0539, 2018.
Zhang et al. "Test Model 6 of 3D-HEVC and MV-HEVC," Joint Collaborative Team on 3D Video Coding Extension Development of ITU-T SG 16 WP 3 and ISO/IEC JTC 1/SC 29/WG 11, 6th Meeting, Geneva, CH, Oct. 25-Nov. 1, 2013, document JCT3V-F1005, N13940, 2013. retrieved from the internet Dec. 18, 2013.
Weigand et al. Joint Drat 5: Scalable Video Coding (in Integrated Form with ITU-T Rec. H.2641 ISO/IEC 14996-10), Joint Video Team ( (JVT) of ISO/IEC MPEG & ITU-T VCEG (ISO/IEC JTC1/SC29/WG11 and ITU-T SG 16 Q.6) 18th Meeting, Bangkok, Thailand, Jan. 14-20, 2006, documentJVT-R201, 2006.
Hanhart et al. "CE3-Related: Enabling Different Chroma Sample Location Types in CCLM," Joint Video Experts Team (JVET) of ITU-T SG 16 WP 3 and ISO/IEC JTC 1/SC 29/WG 11, 12th Meeting, Macau, CN, Oct. 3-12, 2018, document JVET-L0239, 2018.
Bross et al. "Versatile Video Coding (Draft 3)," Joint Video Experts Team (JVET) of ITU-T SG 16 WP 3 and ISO/IEC JTC 1/SC 29/WG 11 12th Meeting: Macao, CN, Oct. 3-12, 2018, document JVET-L1001, 2018.
Bross et al. "High efficiency Video Coding (HEVC) Text Specification Draft 7," Joint Collaborative Team on Video Coding (JCT-VC) of ITU-T SG16 WP3 and ISO/IEC JTC1/SC29/WG11 9th Meeting: Geneva, CH, Apr. 27-May 7, 2012, document JCTVC-11003, 2012.
Chen et al. "Single Depth Intra Coding Mode in 3D-HEVC," Proceeding of 2015 IEEE International Symposium on Circuits and Systems (May 27, 2015) IEEE pp. 1130-1133, ISBN:978-1-4799-8391-9<doi:10.1109/ISCAS.2015.7168837>.
Ramasubramonian et al. "Cross-Check of JVET-K0204: on Cross-Component Linear Model Simplification," Joint Video Exploration Team (JVET) of ITU-T SG 16 WP 3 and ISO/IEC JTC 1/SC 29/WG 11 11th Meeting: Ljubljana, SI, Jul. 10-18, 2018, document JVET-K0512, 2018.

(56) References Cited

OTHER PUBLICATIONS

Chen et al. "Non-RCE1: Multiple LM Chroma Modes," Joint Collaborative Team on Video Coding (JCT-VG) of ITU-T SG 16 WP 3 and ISO/IEC JTC 1/SC 29/1/VG 11, 13th Meeting, Incheon, KR, Apr. 18-26, 2013, document JCTVC-M0116, 2013.
Chen et al. "Algorithm Description of Joint Exploration Test Model 3," Joint Video Exploration Team (JVET) of ITU-T SG 16 WP3 and ISO/IEC JTC 1/SC 29/WG 11, 3rd Meeting: Geneva, CH, May 26-Jun. 1, 2016, JVET-C1001, 2016.
"Digital Processing Technology for Television Signals: The Third Digital High-Speed Processing Circuit," Broadcasting Technology, Mar. 1990, 43(3):94-99, ISSN: 0287-8658.
Katayama et al. "Motion JPEG Coder/Decoder NAJPEGL," NEC Technical Journal, 1999, 52(3):70-73, ISSN: 0285-4139.
Zhu et al. "Real-Time Detection of Line Segments on FPGA," IEICE Technical Report, Sep. 2010, 10 (204):7-12, ISSN: 0913-5685.
Oita et al. "Interactive Visualization for Turbulence Analysis in Sibilant," IEICE Technical Report, Oct. 2011, 111 235): 97-102.
Zhang et al. "EE5: Enhanced Cross-Component Linear Model Intra-Prediction," Joint Video Exploration Team (JVET) of ITU-T SG 16 WP 3 and 1SO/IEC JTC 1/SC 29/WG 11, 5th Meeting, Geneva, CH, Jan. 12-20, 2017, JVET-E0077, Jan. 2017.
Document: JVET-L0191, Laroche, G., et al., "CE3-5.1: On cross-component linear model simplification," Joint Video Experts Team (JVET) of ITU-T SG 16 WP 3 and ISO/IEC JTC 1/SC 29/WG 11 12th Meeting: Macao, CN, Oct. 3-12, 2018, 6 pages.
Draft_text_JVET_L0191, Laroche, G., et al., "CE3-5.1: On cross-component linear model simplification," Joint Video Experts Team (JVET) of ITU-T SG 16 WP 3 and ISO/IEC JTC 1/SC 29/WG 11 12th Meeting: Macao, CN, Oct. 3-12, 2018, 4 pages.
Document: JVET-K0122-v1, Filippov, A., et al., "CE3-related: Alternative techniques for DC mode without division," Joint Video Experts Team (JVET) of ITU-T SG 16 WP 3 and ISO/IEC JTC 1/SC 29/WG 11 11th Meeting: Ljubljana, SI, Jul. 10-18, 2018, 6 pages.
Helmrich, Christian, "Improved Robustness for Calculation of Cross-Component Linear Model Parameters," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0093, 2019.
Huo et al. "CE3-related: Fixed Reference Samples Design for CCLM," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0211v1, 2019.
Wang et al. "CE3-Related: Modified Linear Model Derivation for CCLM Modes," Joint Video Experts Team (JVET) of ITU-T SG 16 WP 3 and ISO/IEC JTC 1/SC 29/WG 11 13th Meeting, Marrakech, MA Jan. 9-18, 2019, document JVET-M0274, 2019.
Document: JVET-M0219-v2, Choi, J., et al., "CE3-related: Reduced number of reference samples for CCLM parameter calculation," Joint Video Experts Team (JVET) of ITU-T SG 16 WP 3 and ISO/IEC JTC 1/SC 29/WG 11 13th Meeting: Marrakech, MA, Jan. 9-18, 2019, 4 pages.
Summons to attend Oral Proceedings for European Application No. 20759225.4 dated Nov. 9, 2023, 8 pages.
Document: JVET-L0239-v2, Hanhart, P., et al., "CE3-related: Enabling different chroma sample location types in CCLM," Joint Video Experts Team (JVET) of ITU-T SG 16 WP 3 and ISO/IEC JTC 1/SC 29/WG 11 12th Meeting: Macau, CN, Oct. 3-12, 2018, 8 pages.
Document: JVET-K0204-v3, Laroche, G., et al., "Non-CE3: On cross-component linear model simplification," Joint Video Experts Team (JVET) of ITU-T SG 16 WP 3 and ISO/IEC JTC 1/SC 29/WG 11 11th Meeting: Ljubljana, SI, Jul. 10-18, 2018, 7 pages.
Document: JVET-L0138-v2, Choi, J., et al., "CE3-related : Reduced number of reference samples for CCLM parameter calculation," Joint Video Experts Team (JVET) of ITU-T SG 16 WP 3 and ISO/IEC JTC 1/SC 29/WG 11 12th Meeting: Macao, CN, Oct. 3-12, 2018, 6 pages.

```
int g_aiLMDivTableHighSimp_128[] = {
    65536, 32768, 21845, 16384, 13107, 10922, 9362 , 8192 , 7281 , 6553 , 5957 , 5461 , 5041 , 4681 , 4369 , 4096 ,
    3855 , 3640 , 3449 , 3276 , 3120 , 2978 , 2849 , 2730 , 2621 , 2520 , 2427 , 2340 , 2259 , 2184 , 2114 , 2048 ,
    1985 , 1927 , 1872 , 1820 , 1771 , 1724 , 1680 , 1638 , 1598 , 1560 , 1524 , 1489 , 1456 , 1424 , 1394 , 1365 ,
    1337 , 1310 , 1285 , 1260 , 1236 , 1213 , 1191 , 1170 , 1149 , 1129 , 1110 , 1092 , 1074 , 1057 , 1040 , 1024 ,
    1008 , 992  , 978  , 963  , 949  , 936  , 923  , 910  , 897  , 885  , 873  , 862  , 851  , 840  , 829  , 819  ,
    809  , 799  , 789  , 780  , 771  , 762  , 753  , 744  , 736  , 728  , 720  , 712  , 704  , 697  , 689  , 682  ,
    675  , 668  , 661  , 655  , 648  , 642  , 636  , 630  , 624  , 618  , 612  , 606  , 601  , 595  , 590  , 585  ,
    579  , 574  , 569  , 564  , 560  , 555  , 550  , 546  , 541  , 537  , 532  , 528  , 524  , 520  , 516  , 512  ,
};

int g_aiLMDivTableHighSimp_64[] = {
    65536, 32768, 21845, 16384, 13107, 10922, 9362 , 8192 , 7281 , 6553 , 5957 , 5461 , 5041 , 4681 , 4369 , 4096 ,
    3855 , 3640 , 3449 , 3276 , 3120 , 2978 , 2849 , 2730 , 2621 , 2520 , 2427 , 2340 , 2259 , 2184 , 2114 , 2048 ,
    1985 , 1927 , 1872 , 1820 , 1771 , 1724 , 1680 , 1638 , 1598 , 1560 , 1524 , 1489 , 1456 , 1424 , 1394 , 1365 ,
    1337 , 1310 , 1285 , 1260 , 1236 , 1213 , 1191 , 1170 , 1149 , 1129 , 1110 , 1092 , 1074 , 1057 , 1040 , 1024 ,
};

int g_aiLMDivTableHighSimp_32[] = {
    65536, 32768, 21845, 16384, 13107, 10922, 9362 , 8192 , 7281 , 6553 , 5957 , 5461 , 5041 , 4681 , 4369 , 4096 ,
    3855 , 3640 , 3449 , 3276 , 3120 , 2978 , 2849 , 2730 , 2621 , 2520 , 2427 , 2340 , 2259 , 2184 , 2114 , 2048 ,
};
```

FIG. 16

```
int iDeltaLuma = maxLuma[0] - minLuma[0];
shift = 0;
add = 0;
if (iDeltaLuma > 64) {
    shift = 4;
    add = 8;
    iDeltaLuma = (iDeltaLuma + add) >> shift;
}
a       = (((maxLuma[1] - minLuma[1]) * g_aiLMDivTableHighSimp_64[iDeltaLuma - 1] + add) >> shift);
```

2812 — Determining, for a conversion between a current video block of a video that is a chroma block and a coded representation of the video, positions at which luma samples are downsampled, wherein the downsampled luma samples are used to determine parameters of a cross-component linear model (CCLM) based on chroma samples and downsampled luma samples, wherein the downsampled luma samples are at positions corresponding to positions of the chroma samples that are used to derive the parameters of the CCLM 2814 — Performing the conversion based on the determining

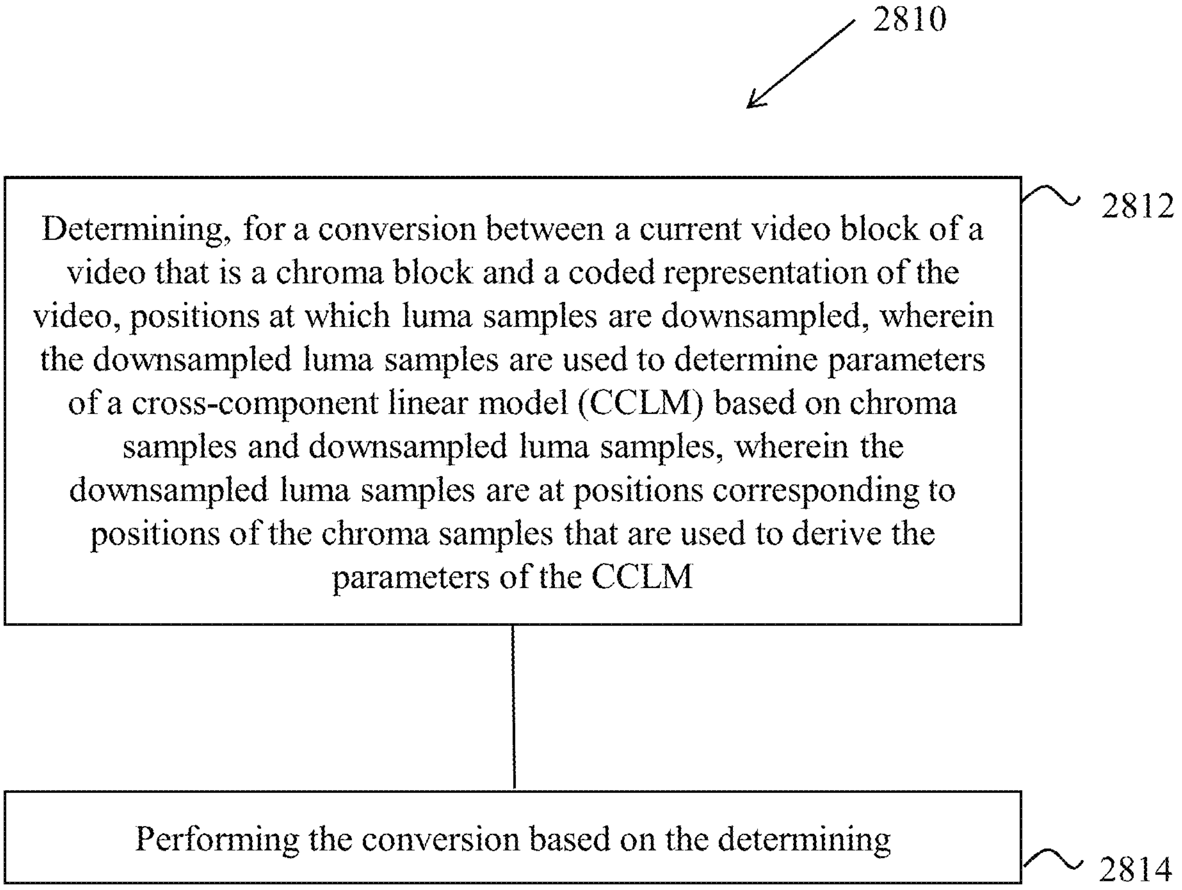

FIG. 28A

MULTI-MODELS FOR INTRA PREDICTION

CROSS REFERENCE TO RELATED APPLICATIONS

This application is the Continuation application of U.S. patent application Ser. No. 17/246,821 filed on May 3, 2021, which is a continuation of International Application No. PCT/CN2019/116015, filed on Nov. 6, 2019, which claims the priority to and benefits of International Patent Application No. PCT/CN2018/114158, filed on Nov. 6, 2018, International Patent Application No. PCT/CN2018/118799, filed on Dec. 1, 2018, International Patent Application No. PCT/CN2018/119709, filed on Dec. 7, 2018, International Patent Application No. PCT/CN2018/125412, filed on Dec. 29, 2018, International Patent Application No. PCT/CN2019/070002, filed on Jan. 1, 2019, International Patent Application No. PCT/CN2019/075874, filed on Feb. 22, 2019, International Patent Application No. PCT/CN2019/075993, filed on Feb. 24, 2019, International Patent Application No. PCT/CN2019/076195, filed on Feb. 26, 2019, International Patent Application No. PCT/CN2019/079396, filed on Mar. 24, 2019, International Patent Application No. PCT/CN2019/079431, filed on Mar. 25, 2019, and International Patent Application No. PCT/CN2019/079769, filed on Mar. 26, 2019. For all purposes under the U.S. law, the entire disclosures of the aforementioned applications are incorporated by reference as part of the disclosure of this application.

TECHNICAL FIELD

This patent document relates to video processing techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video processing, and for example, simplified linear model derivations for the cross-component linear model (CCLM) prediction mode in video coding are described. The described methods may be applied to both the existing video coding standards (e.g., High Efficiency Video Coding (HEVC)) and future video coding standards (e.g., Versatile Video Coding (VVC)) or codecs.

In one representative aspect, the disclosed technology may be used to provide a method for video processing. The method includes determining, for a conversion between a current video block of a video that is a chroma block and a coded representation of the video, parameters of a cross-component linear model based on two chroma samples from a group of neighboring chroma samples, wherein the two chroma samples are selected from the group based on a position rule; and performing the conversion based on the determining In one representative aspect, the disclosed technology may be used to provide a method for video processing. The method includes determining, for a conversion between a current video block of a video that is a chroma block and a coded representation of the video, parameters of a cross-component linear model based on selected chroma samples based on positions of the chroma samples, wherein the selected chroma samples are selected from a group of neighboring chroma samples, and performing the conversion based on the determining.

In another representative aspect, the disclosed technology may be used to provide a method for video processing. The method includes determining, for a current video block, a group of neighboring chroma samples used to derive a set of values for parameters of a linear model, wherein a width and a height of the current video block is W and H, respectively, and wherein the group of neighboring chroma samples comprises at least one sample that is located beyond 2×W above neighboring chroma samples or 2×H left neighboring chroma samples; and performing, based on the linear model, a conversion between the current video block and a coded representation of a video including the current video block.

In another representative aspect, the disclosed technology may be used to provide a method for video processing. The method includes: determining, for a conversion between a current video block of a video that is a chroma block and a coded representation of the video, multiple sets of parameters, wherein each set of parameters defines a cross-component linear model (CCLM) and is derived from a corresponding group of chroma samples at corresponding chroma sample positions; determining, based on the multiple sets of parameters, parameters for a final CCLM; and performing the conversion based on the final CCLM.

In another representative aspect, the disclosed technology may be used to provide a method for video processing. The method includes determining, for a conversion between a current video block of a video and a coded representation of the video, parameters of a cross-component linear model (CCLM) based on maximum and minimum values of chroma and luma samples of N groups of chroma and luma samples selected from neighboring luma and chroma samples of the current video block; and performing the conversion using the CCLM.

In another representative aspect, the disclosed technology may be used to provide a method for video processing. The method includes determining, for a conversion between a current video block of a video that is a chroma block and a coded representation of the video, parameters of a cross-component linear model that are completely determinable by two chroma samples and corresponding two luma samples; and performing the conversion based on the determining.

In another representative aspect, the disclosed technology may be used to provide a method for video processing. The method includes determining, for a conversion between a current video block of a video that is a chroma block and a coded representation of the video, parameters of a cross-component linear model using a parameter table whose entries are retrieved according to two chroma sample values and two luma sample values; and performing the conversion based on the determining.

In another representative aspect, the disclosed technology may be used to provide a method for video processing. The method includes determining, for a conversion between a current video block of a video that is a chroma block and a coded representation of the video, a final prediction P(x, y) of a chroma sample at a position (x, y) in the current video block as a combination of prediction results of multiple cross-component linear models (MCCLMs), wherein the MCCLMs are selected based on the position (x, y) of the chroma sample; and performing the conversion based on the final prediction.

In another representative aspect, the disclosed technology may be used to provide a method for video processing. The method includes performing, for a conversion between a current video block of a video that is a chroma block and a coded representation of the video, a first determination regarding whether a first cross-component linear model (CCLM) that uses only left-neighboring samples is used for predicting samples of the current video block and/or a second determination regarding whether a second cross-component linear model (CCLM) that uses only above-neighboring samples is used for predicting samples of the current video block; and performing the conversion based on the first determination and/or the second determination.

In another representative aspect, the disclosed technology may be used to provide a method for video processing. The method includes determining, for a conversion between a current video block of a video and a coded representation of the video, a context that is used to code a flag using arithmetic coding in the coded representation of the current video block, wherein the context is based on whether a top-left neighboring block of the current video block is coded using a cross-component linear model (CCLM) prediction mode; and performing the conversion based on the determining.

In another representative aspect, the disclosed technology may be used to provide a method for video processing. The method includes determining, for a conversion between a current video block of a video and a coded representation of the video, a coding order for one or more indications of a direct intra prediction mode (DM mode) and a linear intra prediction mode (LM mode) based on a coding mode of one or more neighboring blocks of the current video block; and performing the conversion based on the determining.

In another representative aspect, the disclosed technology may be used to provide a method for video processing. The method includes determining, for a conversion between a current video block of a video and a coded representation of the video, parameters for a linear model prediction or cross-color component prediction based on refined chroma and luma samples of the current video block; and performing the conversion based on the determining.

In another representative aspect, the disclosed technology may be used to provide a method for video processing. The method includes determining, for a conversion between a current video block of a video that is a chroma block and a coded representation of the video, parameters for a linear model prediction or cross-color component prediction based on by selecting neighboring samples based on a position of a largest or a smallest neighboring sample; and performing the conversion based on the determining.

In another representative aspect, the disclosed technology may be used to provide a method for video processing. The method includes determining, for a conversion between a current video block of a video and a coded representation of the video, parameters for a linear model prediction or cross-color component prediction based on a main color component and a dependent color component, the main color component selected as one of a luma color component and a chroma color component and the dependent color component selected as the other of the luma color component and the chroma color component; and performing the conversion based on the determining.

In another representative aspect, the disclosed technology may be used to provide a method for video processing. The method comprises: performing downsampling on chroma and luma samples of a neighboring block of the current video block; determining, for a conversion between a current video block of a video that is a chroma block and a coded representation of the video, parameters of cross-component linear model (CCLM) based on the downsampled chroma and luma samples obtained from the downsampling; and performing the conversion based on the determining.

In another representative aspect, the disclosed technology may be used to provide a method for video processing. The method comprises: determining, for a conversion between a current video block of a video that is a chroma block and a coded representation of the video, parameters of a cross-component linear model (CCLM) based on two or more chroma samples from a group of neighboring chroma samples, wherein the two or more chroma samples are selected based on a coding mode of the current video block; and performing the conversion based on the determining.

In another representative aspect, the disclosed technology may be used to provide a method for video processing. The method comprises: determining, for a conversion between a current video block of a video that is a chroma block and a coded representation of the video, parameters of cross-component linear model (CCLM) based on chroma samples that are selected based on W available above-neighboring samples, W being an integer; and performing the conversion based on the determining.

In another representative aspect, the disclosed technology may be used to provide a method for video processing. The method comprises: determining, for a conversion between a current video block of a video that is a chroma block and a coded representation of the video, parameters of cross-component linear model (CCLM) based on chroma samples that are selected based on H available left-neighboring samples of the current video block; and performing the conversion based on the determining.

In another representative aspect, the disclosed technology may be used to provide a method for video processing. The method comprises: determining, for a conversion between a current video block of a video that is a chroma block and a coded representation of the video, parameters of a cross-component linear model (CCLM) based on two or four chroma samples and/or corresponding luma samples; and performing the conversion based on the determining.

In another representative aspect, the disclosed technology may be used to provide a method for video processing. The method comprises: selecting, for a conversion between a current video block of a video that is a chroma block and a coded representation of the video, chroma samples based on a position rule, the chroma samples used to derive parameters of a cross-component linear model (CCLM); and performing the conversion based on the determining, wherein the position rule specifies to select the chroma samples that are located within an above row and/or a left column of the current video block.

In another representative aspect, the disclosed technology may be used to provide a method for video processing. The method comprises: determining, for a conversion between a current video block of a video that is a chroma block and a coded representation of the video, positions at which luma samples are downsampled, wherein the downsampled luma samples are used to determine parameters of a cross-component linear model (CCLM) based on chroma samples and downsampled luma samples, wherein the downsampled luma samples are at positions corresponding to positions of the chroma samples that are used to derive the parameters of the CCLM; and performing the conversion based on the determining.

In another representative aspect, the disclosed technology may be used to provide a method for video processing. The method comprises: determining, for a conversion between a current video block of a video that is a chroma block and a coded representation of the video, a method to derive parameters of a cross-component linear model (CCLM) using chroma samples and luma samples based on a coding condition associated with the current video block; and performing the conversion based on the determining.

In another representative aspect, the disclosed technology may be used to provide a method for video processing. The method comprises: determining, for a conversion between a current video block of a video that is a chroma block and a coded representation of the video, whether to derive maximum values and/or minimum values of a luma component and a chroma component that are used to derive parameters of a cross-component linear model (CCLM) based on availability of a left-neighboring block and an above-neighboring block of the current video block; and performing the conversion based on the determining.

In another representative aspect, the disclosed technology may be used to provide a method for video processing. The method comprises determining, for a conversion between a current video block of a video and a coded representation of the video, parameters of a coding tool using a linear model based on selected neighboring samples of the current video block and corresponding neighboring samples of a reference block; and performing the conversion based on the determining.

In another representative aspect, the disclosed technology may be used to provide a method for video processing. The method comprises: determining, for a conversion between a current video block of a video and a coded representation of the video, parameters of a local illumination compensation (LIC) tool based on N neighboring samples of the current video block and N corresponding neighboring samples of a reference block, wherein the N neighboring samples of the current video block are selected based on positions of the N neighboring samples; and performing the conversion based on the determining, wherein the LIC tool uses a linear model of illumination changes in the current video block during the conversion.

In another representative aspect, the disclosed technology may be used to provide a method for video processing. The method comprises determining, for a conversion between a current video block of a video that is a chroma block and a coded representation of the video, parameters of a cross-component linear model (CCLM) based on chroma samples and corresponding luma samples; and performing the conversion based on the determining, wherein some of the chroma samples are obtained by a padding operation and the chroma samples and the corresponding luma samples are grouped into two arrays G0 and G1, each array including two chroma samples and corresponding luma samples.

In yet another representative aspect, the above-described method is embodied in the form of processor-executable code and stored in a computer-readable program medium.

In yet another representative aspect, a device that is configured or operable to perform the above-described method is disclosed. The device may include a processor that is programmed to implement this method.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

FIG. 16 shows an example of lookup tables used in LM derivations.

FIG. 17 shows an example of an LM parameter derivation process with 64 entries.

FIGS. 28A-28C show flowcharts of example methods for video processing based on some implementations of the disclosed technology.

FIG. 31A shows an example when both above and left neighboring samples are available and FIG. 31B shows an example when only above neighboring samples are available and top-right is not available.

DETAILED DESCRIPTION

Figure 1:
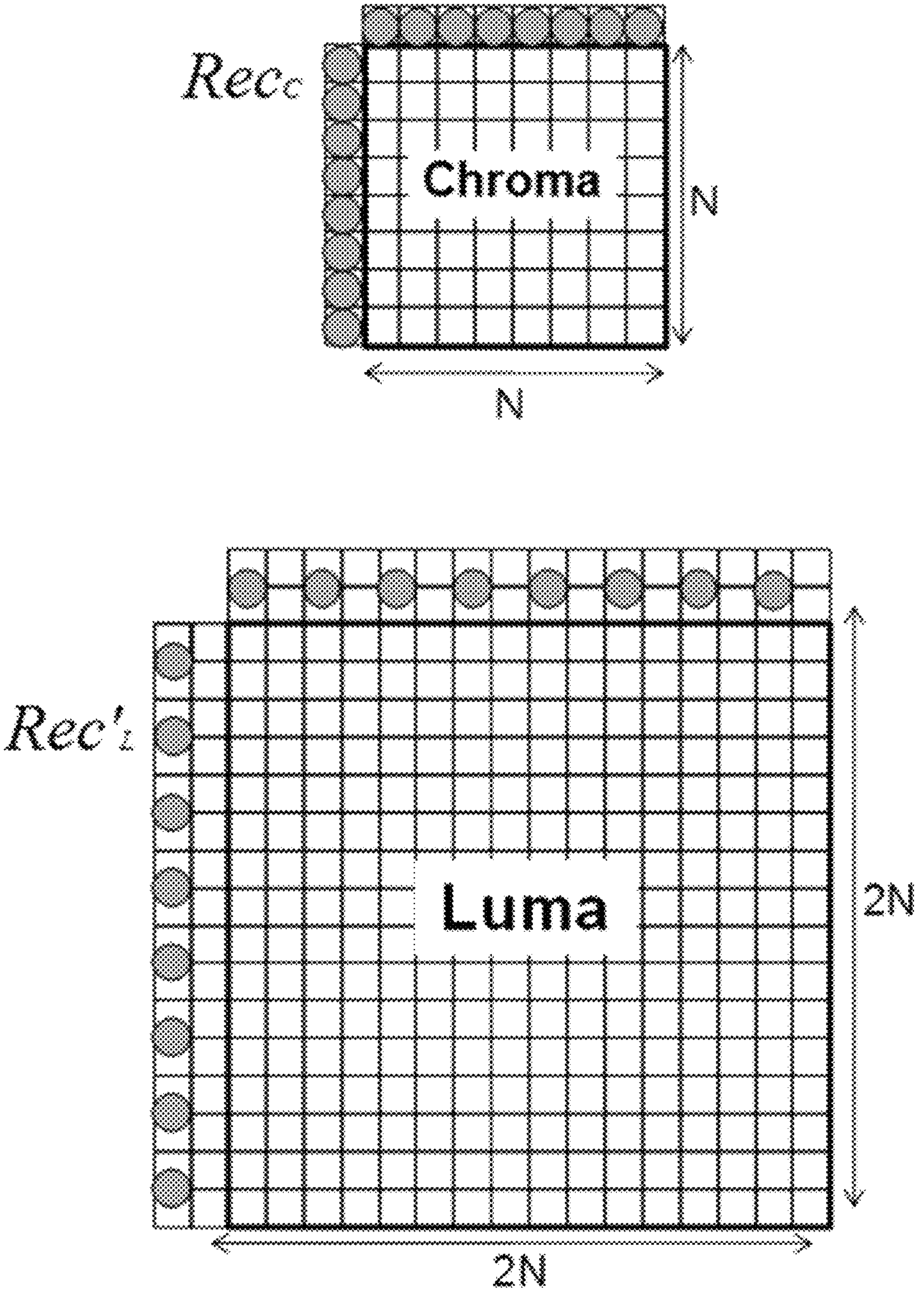
FIG. 1 shows an example of locations of samples used for the derivation of the weights of the linear model used for cross-component prediction.

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding (VVC) standard to be finalized, or other current and/or future video coding standards.

Embodiments of the disclosed technology may be applied to existing video coding standards (e.g., HEVC, H.265) and future standards to improve runtime performance. Section headings are used in the present document to improve readability of the description and do not in any way limit the discussion or the embodiments (and/or implementations) to the respective sections only.

1 Embodiments of Cross-Component Prediction

Cross-component prediction is a form of the chroma-to-luma prediction approach that has a well-balanced trade-off between complexity and compression efficiency improvement.

1.1 Examples of the Cross-Component Linear Model (CCLM)

In some embodiments, and to reduce the cross-component redundancy, a cross-component linear model (CCLM) prediction mode (also referred to as LM), is used in the JEM, for which the chroma samples are predicted based on the reconstructed luma samples of the same CU by using a linear model as follows:

$$\mathrm{pred}_C(i,j)=\alpha\cdot rec_L'(i,j)+_f \tag{1}$$

Here, $\mathrm{pred}_C(i,j)$ represents the predicted chroma samples in a CU and $\mathrm{rec}_L'(i,j)$ represents the downsampled reconstructed luma samples of the same CU for color formats 4:2:0 or 4:2:2 while $\mathrm{rec}_L'(i,j)$ represents the reconstructed luma samples of the same CU for color format 4:4:4. CCLM parameters α and β are derived by minimizing the regression error between the neighboring reconstructed luma and chroma samples around the current block as follows:

$$\alpha=\frac{N\cdot\sum(L(n)\cdot C(n))-\sum L(n)\cdot\sum C(n)}{N\cdot\sum(L(n)\cdot L(n))-\sum L(n)\cdot\sum L(n)} \tag{2}$$

$$\text{and }\beta=\frac{\sum C(n)-\alpha\cdot\sum L(n)}{N}. \tag{3}$$

Here, L(n) represents the down-sampled (for color formats 4:2:0 or 4:2:2) or original (for color format 4:4:4) top and left neighboring reconstructed luma samples, C(n) represents the top and left neighboring reconstructed chroma samples, and value of N is equal to twice of the minimum of width and height of the current chroma coding block.

In some embodiments, and for a coding block with a square shape, the above two equations are applied directly. In other embodiments, and for a non-square coding block, the neighboring samples of the longer boundary are first subsampled to have the same number of samples as for the shorter boundary. FIG. 1 shows the location of the left and above reconstructed samples and the sample of the current block involved in the CCLM mode.

In some embodiments, this regression error minimization computation is performed as part of the decoding process, not just as an encoder search operation, so no syntax is used to convey the α and β values.

In some embodiments, the CCLM prediction mode also includes prediction between the two chroma components, e.g., the Cr (red-difference) component is predicted from the Cb (blue-difference) component. Instead of using the reconstructed sample signal, the CCLM Cb-to-Cr prediction is applied in residual domain. This is implemented by adding a weighted reconstructed Cb residual to the original Cr intra prediction to form the final Cr prediction:

$$\mathrm{pred}^*_{Cr}(i,j)=\mathrm{pred}_{Cr}(i,j)+\alpha\cdot\mathrm{resi}_{Cb}'(i,j) \tag{4}$$

Here, $\mathrm{resi}_{Cb}'(i,j)$ presents the reconstructed Cb residue sample at position (i,j).

In some embodiments, the scaling factor α may be derived in a similar way as in the CCLM luma-to-chroma prediction. The only difference is an addition of a regression cost relative to a default a value in the error function so that the derived scaling factor is biased towards a default value of −0.5 as follows:

$$\alpha = \frac{N \cdot \sum(Cb(n) \cdot Cr(n)) - \sum Cb(n) \cdot \sum Cr(n) + \lambda \cdot (-0.5)}{N \cdot \sum(Cb(n) \cdot Cb(n)) - \sum Cb(n) \cdot \sum Cb(n) + \lambda} \quad (5)$$

Here, Cb(n) represents the neighboring reconstructed Cb samples, Cr(n) represents the neighboring reconstructed Cr samples, and $\lambda$ is equal to $\Sigma(Cb(n) \cdot Cb(n)) >> 9$.

In some embodiments, the CCLM luma-to-chroma prediction mode is added as one additional chroma intra prediction mode. At the encoder side, one more RD cost check for the chroma components is added for selecting the chroma intra prediction mode. When intra prediction modes other than the CCLM luma-to-chroma prediction mode is used for the chroma components of a CU, CCLM Cb-to-Cr prediction is used for Cr component prediction.

1.2 Examples of Multiple Model CCLM

In the JEM, there are two CCLM modes: the single model CCLM mode and the multiple model CCLM mode (MMLM). As indicated by the name, the single model CCLM mode employs one linear model for predicting the chroma samples from the luma samples for the whole CU, while in MMLM, there can be two models.

In MMLM, neighboring luma samples and neighboring chroma samples of the current block are classified into two groups, each group is used as a training set to derive a linear model (i.e., a particular $\alpha$ and $\beta$ are derived for a particular group). Furthermore, the samples of the current luma block are also classified based on the same rule for the classification of neighboring luma samples.

Figure 2:
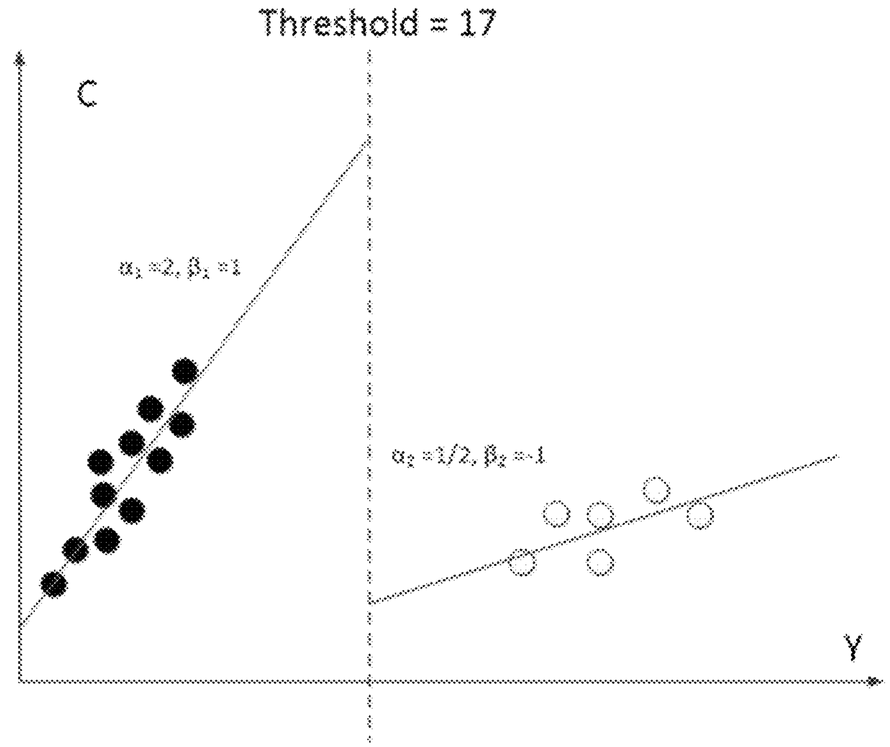
FIG. 2 shows an example of classifying neighboring samples into two groups.

FIG. 2 shows an example of classifying the neighboring samples into two groups. Threshold is calculated as the average value of the neighboring reconstructed luma samples. A neighboring sample with $Rec'_L[x,y] <= $ Threshold is classified into group 1; while a neighboring sample with $Rec'_L[x,y] >$ Threshold is classified into group 2.

$$\begin{cases} Pred_c[x, y] = \alpha_1 \times Rec'_L[x, y] + \beta_1 & \text{if } Rec'_L[x, y] \le \text{Threshold} \\ Pred_c[x, y] = \alpha_2 \times Rec'_L[x, y] + \beta_2 & \text{if } Rec'_L[x, y] > \text{Threshold} \end{cases} \quad (6)$$

1.3 Examples of Downsampling Filters in CCLM

In some embodiments, and to perform cross-component prediction, for the 4:2:0 chroma format, where 4 luma samples corresponds to 1 chroma samples, the reconstructed luma block needs to be downsampled to match the size of the chroma signal. The default downsampling filter used in CCLM mode is as follows:

$$Rec'_L[x,y] = \{2 \times Rec_L[2x,2y] + 2 \times Rec_L[2x,2y+1] + Rec_L[2x-1,2y] + Rec_L[2x+1,2y] + Rec_L[2x-1,2y+1] + Rec_L[2x+1,2y+1] + 4\} >> 3 \quad (7)$$

Figure 3A:
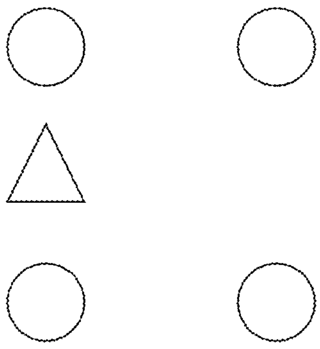
FIG. 3A shows an example of a chroma sample and its corresponding luma samples.

Here, the downsampling assumes the "type 0" phase relationship as shown in FIG. 3A for the positions of the chroma samples relative to the positions of the luma samples, e.g., collocated sampling horizontally and interstitial sampling vertically.

The exemplary 6-tap downsampling filter defined in (6) is used as the default filter for both the single model CCLM mode and the multiple model CCLM mode.

Figure 3B:
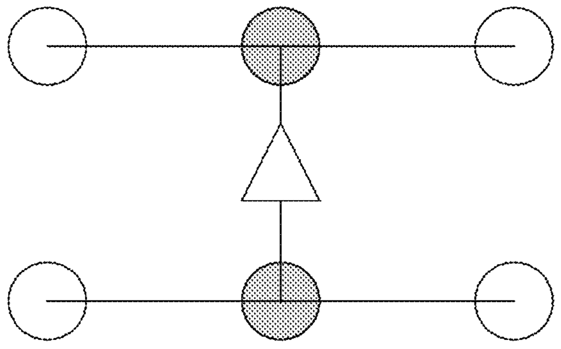
FIG. 3B shows an example of down filtering for the cross-component linear model (CCLM) in the Joint Exploration Model (JEM).

In some embodiments, and for the MMLM mode, the encoder can alternatively select one of four additional luma downsampling filters to be applied for prediction in a CU, and send a filter index to indicate which of these is used. The four selectable luma downsampling filters for the MMLM mode, as shown in FIG. 3B, are as follows:

$$Rec'_L[x,y](Rec_L[2x,2y] + Rec_L[2x+1,2y] + 1) >> 1 \quad (8)$$

$$Rec'_L[x,y] = (Rec_L[2x+1,2y] + Rec_L[2x+1,2y+1] + 1) >> 1 \quad (9)$$

$$Rec'_L[x,y] = (Rec_L[2x,2y+1] + Rec_L[2x+1,2y+1] + 1) >> 1 \quad (10)$$

$$Rec'_L[x,y] = (Rec_L[2x,2y] + Rec_L[2x,2y+1] + Rec_L[2x+1,2y] + Rec_L[2x+1,2y+1] + 2) >> 2 \quad (11)$$

1.4 Multi-Directional LM (MDLM)

Figure 4A:
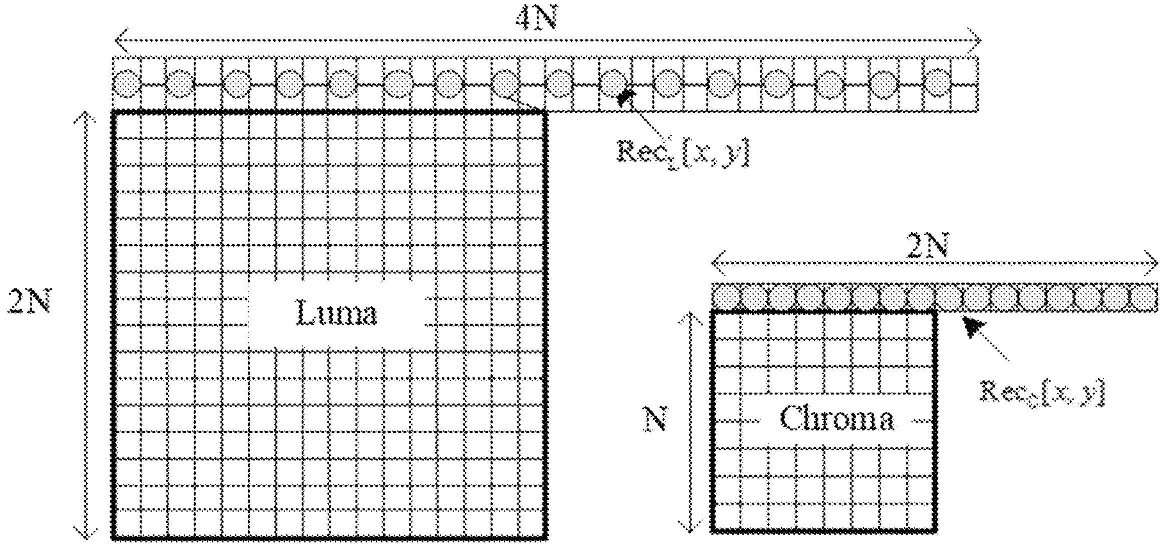
FIGS. 4A and 4B show examples of only top-neighboring and only left-neighboring samples used for prediction based on a linear model, respectively.
Figure 4B:
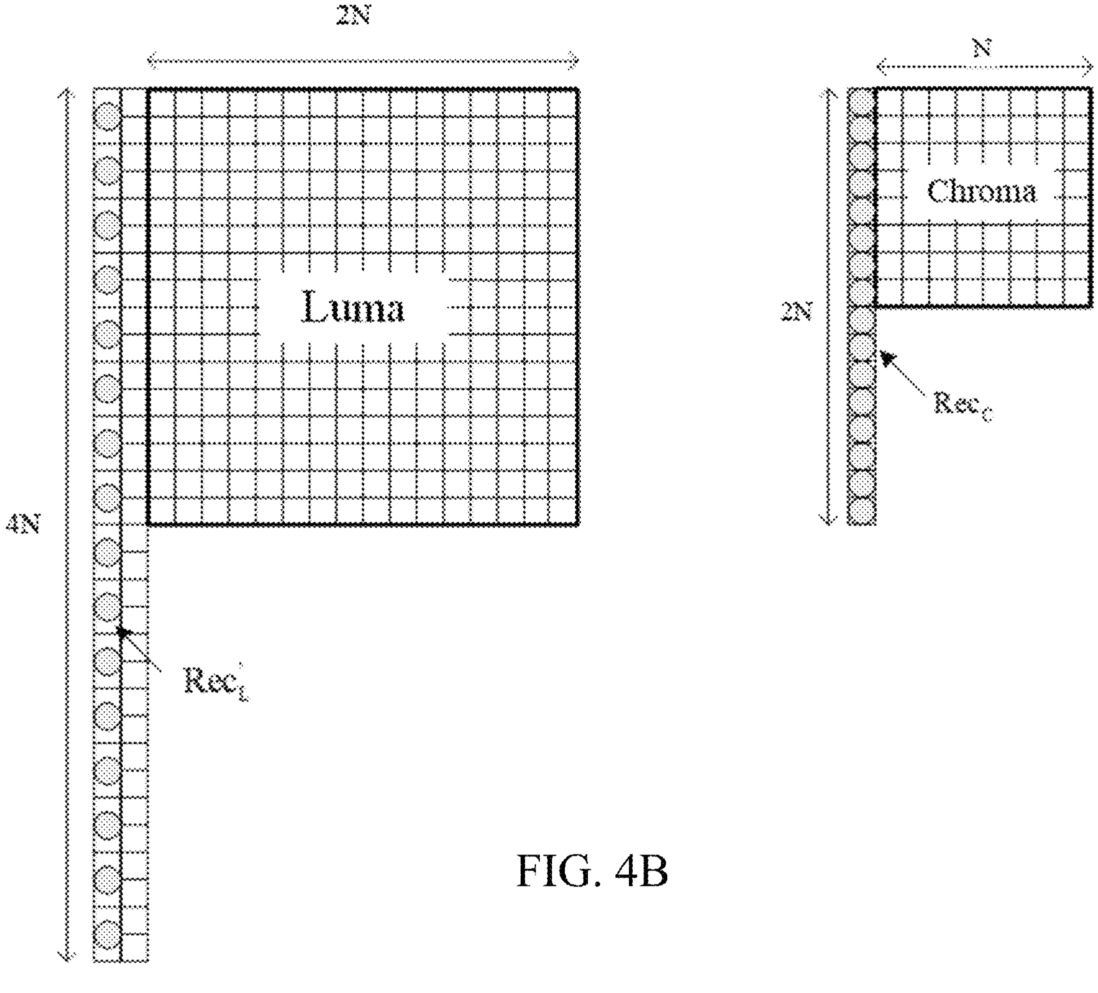

This existing implementation proposes multi-directional LM (MDLM). In MDLM, two additional CCLM modes are proposed: LM-A, where the linear model parameters are derived only based on the top-neighboring (or above-neighboring) samples as shown in FIG. 4A, and LM-L, where the linear model parameters are derived only based on the left-neighboring samples as shown in FIG. 4B.

1.5 Cross-Component Linear Model Simplification

Figure 5:
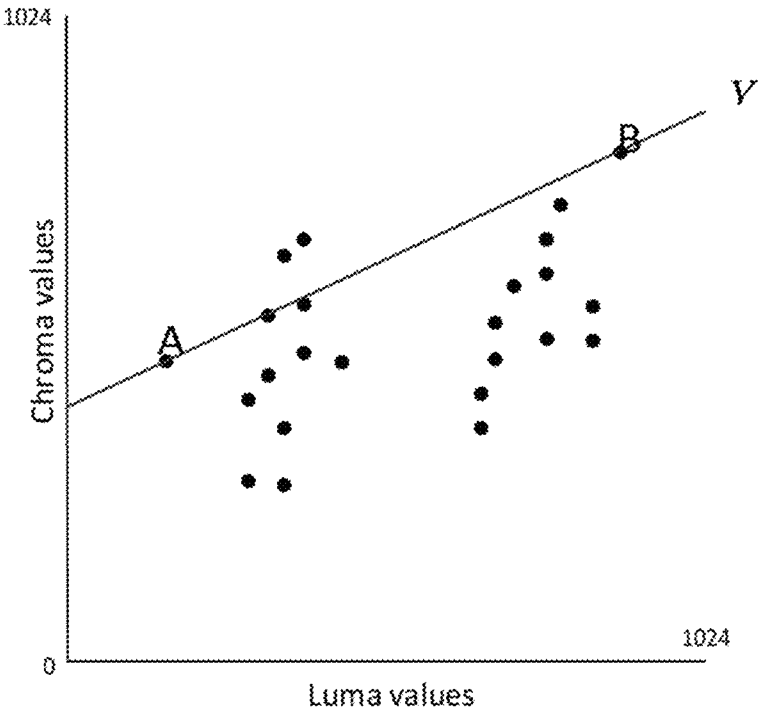
FIG. 5 shows an example of a straight line between minimum and maximum luma values as a function of the corresponding chroma samples.

This existing implementation proposes to replace the LMS algorithm of the linear model parameters $\alpha$ and $\beta$ by a straight line equation, so called two-point method. The 2 points (couple of Luma and Chroma) (A, B) are the minimum and maximum values inside the set of neighboring Luma samples as depicted in FIG. 5.

Herein, the linear model parameters $\alpha$ and $\beta$ are obtained according to the following equation:

$$\alpha = \frac{y_B - y_A}{x_B - x_A} \text{ and } \beta = y_A - \alpha x_A.$$

In some embodiments, the division operation needed in the derivation of a is avoided and replaced by multiplications and shifts as below:

```
a = 0;
iShift = 16;
int shift = (uiInternalBitDepth > 8) ? uiInternalBitDepth − 9 : 0;
int add = shift ? 1 << (shift − 1) : 0;
int diff = (MaxLuma− MinLuma + add) >> shift;
if (diff > 0)
{
   int div = ((MaxChroma− MinChroma) *
   g_aiLMDivTableLow[diff − 1] + 32768) >> 16;
   a = (((MaxChroma− MinChroma) *
   g_aiLMDivTableHigh[diff − 1] + div + add) >> shift);
}
   b = MinLuma[1] − ((a * MinLuma[0]) >> iShift);
```

Herein, S is set equal to iShift, $\alpha$ is set equal to a and $\beta$ is set equal to b. Furthermore, g_aiLMDivTableLow and g_aiLMDivTableHigh are two tables each with 512 entries, wherein each entry stores a 16-bit integer.

To derive the chroma predictor, as for the current VTM implementation, the multiplication is replaced by an integer operation as the following:

$$pred_C(i,j) = (\alpha \cdot rec'_L{}^{(i,j)}) >> S + \beta$$

This implementation is also simpler than the current VTM implementation because shift S always has the same value.

1.6 Examples of CCLM in VVC

CCLM as in JEM is adopted in VTM-2.0, but MM-CCLM in JEM is not adopted in VTM-2.0. MDLM and simplified CCLM have been adopted into VTM-3.0.

1.7 Examples of Local Illumination Compensation in JEM

Local Illumination Compensation (LIC) is based on a linear model for illumination changes, using a scaling factor a and an offset b. And it is enabled or disabled adaptively for each inter-mode coded coding unit (CU).

Figure 32:
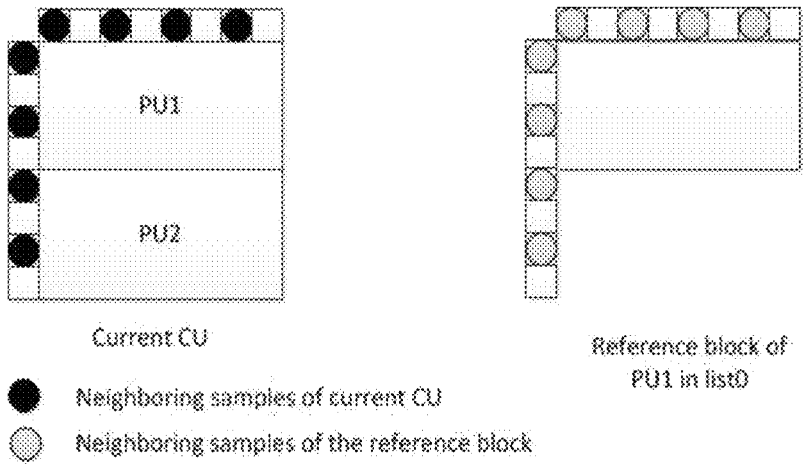
FIG. 32 shows examples of neighboring samples to derive LIC parameters.

When LIC applies for a CU, a least square error method is employed to derive the parameters a and b by using the neighbouring samples of the current CU and their corresponding reference samples. More specifically, as illustrated in FIG. 32, the subsampled (2:1 subsampling) neighbouring samples of the CU and the corresponding pixels (identified by motion information of the current CU or sub-CU) in the reference picture are used. The IC parameters are derived and applied for each prediction direction separately.

When a CU is coded with 2N×2N merge mode, the LIC flag is copied from neighbouring blocks, in a way similar to motion information copy in merge mode; otherwise, an LIC flag is signalled for the CU to indicate whether LIC applies or not.

When LIC is enabled for a picture, additional CU level RD check is needed to determine whether LIC is applied or not for a CU. When LIC is enabled for a CU, mean-removed sum of absolute difference (MR-SAD) and mean-removed sum of absolute Hadamard-transformed difference (MR-SATD) are used, instead of SAD and SATD, for integer pel motion search and fractional pel motion search, respectively.

To reduce the encoding complexity, the following encoding scheme is applied in JEM: LIC is disabled for the entire picture when there is no obvious illumination change between a current picture and its reference pictures. To identify this situation, histograms of a current picture and every reference picture of the current picture are calculated at the encoder. If the histogram difference between the current picture and every reference picture of the current picture is smaller than a given threshold, LIC is disabled for the current picture; otherwise, LIC is enabled for the current picture.

2 Examples of Drawbacks in Existing Implementations

Current implementations introduce a two-point method to replace the LMS approach of LM mode in JEM. Although the new method decreases the number of additions and multiplications in CCLM, it introduces the following problems:

1) Comparisons are introduced to find the minimum and maximum luma values, which are not friendly to a single instruction, multiple data (SIMD) software design.
2) Two lookup-tables with 1024 entries in total storing 16-bit numbers are introduced, with a 2K ROM memory requirement that is not desirable in a hardware design.

3 Exemplary Methods for Cross-Component Prediction in Video Coding

Embodiments of the presently disclosed technology overcome drawbacks of existing implementations, thereby providing video coding with higher coding efficiencies and lower computational complexity. Simplified linear model derivations for cross-component prediction, based on the disclosed technology, may enhance both existing and future video coding standards, is elucidated in the following examples described for various implementations. The examples of the disclosed technology provided below explain general concepts, and are not meant to be interpreted as limiting. In an example, unless explicitly indicated to the contrary, the various features described in these examples may be combined.

In the following examples and methods, the term "LM method" includes, but is not limited to, the LM mode in JEM or VTM, and MMLM mode in JEM, left-LM mode which only uses left neighboring samples to derive the linear model, the above-LM mode which only uses above neighboring samples to derive the linear model or other kinds of methods which utilize luma reconstruction samples to derive chroma prediction blocks. All LM modes which are not the LM-L nor the LM-A are called normal LM modes.

In the following examples and methods, Shift(x, s) is defined as Shift(x, s)=(x+off)>>s, and SignShift(x, s) is defined as $$\text{Sign Shift}(x, s) = \begin{cases} (x + \text{off}) \gg s & x \geq 0 \\ -((x + \text{off}) \gg s) & x < 0 \end{cases}$$

Herein, off is an integer such as 0 or $2^{s-1}$.

The height and width of a current chroma block are denoted H and W, respectively.

Figure 6:
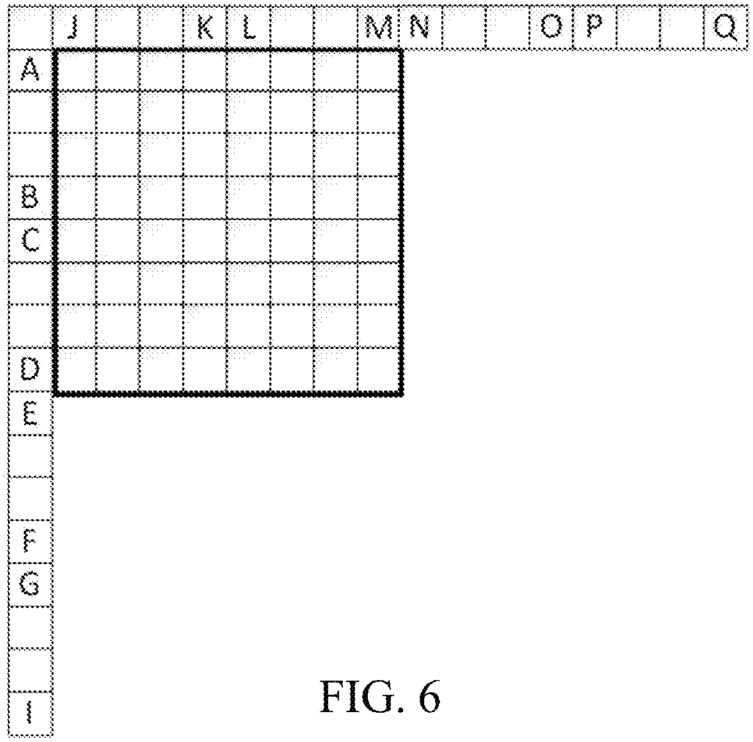
FIG. 6 shows an example of a current chroma block and its neighboring samples.

FIG. 6 shows an example of neighboring samples of the current chroma block. Let the coordinate of the top-left sample of the current chroma block be denoted as (x, y). Then, the neighboring chroma samples (as shown in FIG. 6) are denoted as:

A: Top sample at left: [x−1, y],
B: Top middle sample at left: [x−1, y+H/2−1],
C: Bottom middle sample at left: [x−1, y+H/2],
D: Bottom sample at left: [x−1, y+H−1],
E: Extended-bottom top sample at left: [x−1, y+H],
F: Extended-bottom top middle sample at left: [x−1, y+H+H/2−1],
G: Extended-bottom bottom middle sample at left: [x−1, y+H+H/2],
I: Extended-bottom bottom sample at left: [x−1, y+H+H−1],
J: Left sample at above: [x, y−1],
K: Left middle sample at above: [x+W/2−1, y−1],
L: Right middle sample at above: [x+W/2, y−1],
M: Right sample at above: [x+W−1, y−1],
N: Extended-above left sample at above: [x+W, y−1],
O: Extended-above left middle sample at above: [x+W+W/2−1, y−1],
P: Extended-above right middle sample at above: [x+W+W/2, y−1], and
Q: Extended-above right sample at above: [x+W+W−1, y−1].

Example 1

The parameters α and β in LM methods are derived from chroma samples at two or more specific positions.

a. The derivation is also dependent on the corresponding down-sampled luma samples of selected chroma samples. Alternatively, the derivation is also dependent on the corresponding luma samples of selected chroma samples such as when it is 4:4:4 color format.

b. For example, the parameters α and β in CCLM are derived from chroma samples at $2^S$ (e.g. S=2 or 3) positions, such as:
   i. Position {A, D, J, M};
   ii. Position {A, B, C, D, J, K, L, M};
   iii. Position {A, I, J, Q};
   iv. Position {A, B, D, I, J, K, M, Q};
   v. Position {A, B, D, F, J, K, M, O};
   vi. Position {A, B, F, I, J, K, O, Q};
   vii. Position {A, C, E, I, J, L, N, Q};
   viii. Position {A, C, G, I, J, L, P, Q};
   ix. Position {A, C, E, G, J, L, N, P};
   x. Position {A, B, C, D};
   xi. Position {A, B, D, I};
   xii. Position {A, B, D, F};
   xiii. Position {A, C, E, I};
   xiv. Position {A, C, G, I};
   xv. Position {A, C, E, G};
   xvi. Position {J, K, L, M};
   xvii. Position {J, K, M, Q};
   xviii. Position {J, K, M, O};
   xix. Position {J, K, O, Q};
   xx. Position {J, L, N, Q};
   xxi. Position {J, L, P, Q};
   xxii. Position {J, L, N, P};
   xxiii. Position {A, B, C, E, E, F, G, I};
   xxiv. Position {J, K, L, M, N, O, P, Q};

c. For example, the parameters α and β in CCLM are derived from chroma samples at:
   i. Any combination between {A, B, C, D, E, F, G, I} and {J, K, L, M, N, O, P, Q} such as
      (a) Position A and J;
      (b) Position B and K;
      (c) Position C and L;
      (d) Position D and M;
      (e) Position E and N;
      (f) Position F and O;
      (g) Position G and P;
      (h) Position I and Q;
   ii. Any two different positions fetched from {A, B, C, D, E, F, G,}
      (a) Position A and B;
      (b) Position A and C;
      (c) Position A and D;
      (d) Position A and E;
      (e) Position A and F;
      (f) Position A and G;
      (g) Position A and I;
      (h) Position D and B;
      (i) Position D and C;
      (j) Position E and B;
      (k) Position E and C;
      (l) Position I and B;
      (m) Position I and C;
      (n) Position I and D;
      (o) Position I and E;
      (p) Position I and F;
      (q) Position I and G;
   iii. Any two different positions fetched from {J, K, L, M, N, O, P, Q}
      (a) Position J and K;
      (b) Position J and L;
      (c) Position J and M;
      (d) Position J and N;
      (e) Position J and O;
      (f) Position J and P;
      (g) Position J and Q;
      (h) Position M and K;
      (i) Position M and L;
      (j) Position N and K;
      (k) Position N and L;
      (l) Position Q and K;
      (m) Position Q and L;
      (n) Position Q and M;
      (o) Position Q and N;
      (p) Position Q and O;
      (q) Position Q and P;
      (r) Position Q and Q;
   iv. In one example, if the two selected positions have identical luma value, more positions may be further checked.

d. For example, not all available chroma samples are searched to find the minimum and maximum luma values to derive the parameters α and β in CCLM with the two-point method.
   i. One chroma sample out of K chroma samples (and their corresponding down-sampled luma samples) are included in the searching set. K may be 2, 4, 6 or 8.
      (a) For example, if Rec[x,y] is an above neighboring sample, it is included in the searching set only if x % K==0. If Rec[x,y] is a left neighboring sample, it is included in the searching set only if y % K==0.
   ii. Only Chroma samples at specific positions such as defined in 1.a.i~1.a.xxiv are included in the searching set.

e. For mode LM-L, all selected samples must be left-neighboring samples.

f. For mode LM-A, all selected samples must be above-neighboring samples.

g. The selected positions can be fixed, or they can be adaptive.
   i. In one example, which positions are selected may depend on the width and height of the current chroma block;
   ii. In one example, which positions are selected may be signaled from the encoder to the decoder, such as in VPS/SPS/PPS/slice header/tile group header/tile/CTU/CU/PU.

h. The selected chroma samples are used to derive the parameters α and β with the least mean square method as shown in Eq(2) and Eq(3). In Eq(2) and Eq(3), N is set to be the number of the selected samples.

i. A pair of selected chroma samples are used to derive the parameters α and β with the two-point method.

j. In one example, how to select samples may depend on the availability of the neighboring blocks.
   i. For example, positions A, D, J and M are selected if both the left and the above neighboring blocks are available; position A and D are selected if only the left neighboring block is available; and position J and M are selected if only the above neighboring block is available.

Example 2

Sets of parameters in CCLM mode can be firstly derived and then combined to form the final linear model parameter used for coding one block. Suppose $\alpha_1$ and $\beta_1$ are derived from a group of chroma samples at specific positions denoted as Group 1, $\alpha_2$ and $\beta_2$ are derived from a group of chroma samples at specific positions denoted as Group 2, . . . , $\alpha_N$ and $\beta_N$ are derived from a group of chroma samples at specific positions denoted as Group N, then the final α and β can be derived from $(\alpha_1, \beta_1)$, . . . $(\alpha_N, \beta_N)$.

a. In one example, α is calculated as the average of $\alpha_1$, . . . $\alpha_N$ and β is calculated as the average of $\beta_1$, . . . $\beta_N$.
   i. In one example, $\alpha$=SignShift($\alpha_1+\alpha_2$, 1), $\beta$=SignShift ($\beta_1+\beta_2$, 1).
   ii. In one example, $\alpha$=Shift($\alpha_1+\alpha_2$, 1), $\beta$=Shift($\beta_1+\beta_2$, 1).
   iii. If $(\alpha_1, \beta_1)$ and $(\alpha_2, \beta_2)$ are with different precision, for example, To get a chroma prediction CP from its corresponding down-sampled luma sample LR, it is calculated as
   CP=SignShift($\alpha_1$×LR+$\beta_1$, $Sh_1$) with $(\alpha_1, \beta_1)$, but
   CP=SignShift($\alpha_2$×LR+$\alpha_2$, $Sh_2$) with $(\alpha_2, \beta_2)$ $Sh_1$ is not equal to $Sh_2$, then the parameters need to be shifted before being combined. Suppose $Sh_1>Sh_2$, then before combining, the parameters should be shifted as:
      (a) $\alpha_1$=SignShift($\alpha_1$, $Sh_1-Sh_2$), $\beta_1$=SignShift($\beta_1$, $Sh_1-Sh_2$). Then the final precision is as $(\alpha_2, \beta_2)$.
      (b) $\alpha_1$=Shift($\alpha_1$, $Sh_1-Sh_2$), $\beta_1$=Shift($\beta_1$, $Sh_1-Sh_2$). Then the final precision is as $(\alpha_2, \beta_2)$.
      (c) $\alpha_2=\alpha_2<<(Sh_1-Sh_2)$, $\beta_2=\beta_2<<(Sh_1-Sh_2)$. Then the final precision is as $(\alpha_1, \beta_1)$.

b. Some examples of positions in Group 1 and Group 2:
   i. Group 1: Position A and D, Group 2: Position J and M.
   ii. Group 1: Position A and I, Group 2: Position J and Q.
   iii. Group 1: Position A and D, Group 2: Position E and I, where there are two groups are used for mode LM-L.
   iv. Group 1: Position J and M, Group 2: Position N and Q, where there are two groups are used for mode LM-A.
   v. Group 1: Position A and B, Group 2: Position C and D, where there are two groups are used for mode LM-L.
   vi. Group 1: Position J and K, Group 2: Position L and M, where there are two groups are used for mode LM-A.

Example 3

Suppose two chroma sample values denoted as C0 and C1, and their corresponding luma sample values denoted as L0 and L1 (L0<L1) are inputs. The two-point method can derive α and β with the input as $$\alpha = \frac{C1 - C0}{L1 - L0} \text{ and } \beta = C0 - \alpha L0.$$

The bit depths of luma samples and chroma samples are denoted BL and BC. One or more simplifications for this implementation include:

a. α is output as 0 if L1 is equal to L0. Alternatively, when L1 is equal to L0, a certain intra prediction mode (e.g., DM mode, DC or planar) is used instead of using CCLM mode to derive the prediction block.

b. The division operation is replaced by other operations with no lookup table. log 2 operation may be implemented by checking position of the most significant digit.
   i. α=Shift(C1−C0, Floor($\log_2$(L1−L0)) or α=SignShift(C1−C0, Floor($\log_2$(L1−L0))
   ii. α=Shift(C1−C0, Ceiling($\log_2$(L1−L0)) or α=SignShift(C1−C0, Ceiling($\log_2$(L1−L0))
   iii. Example i or Example ii may be selected based on the value of L1−L0.
      (a) For example, Example i is used if L1−L0<T, otherwise Example ii is used. For example, T can be $$(\text{Floor}(\log_2(L1-L0))+\text{Ceiling}(\log_2(L1-L0)))/2$$

(b) For example, Example i is used if 3×(L1−L0) $<2^{Floor(Log_2(L1-L0))+2}$, otherwise Example ii is used.
      (c) For example, Example i is used if $(L1-L0)^2<2^{2\times Floor(Log_2(L1-L0))+1}$, otherwise Example ii is used.

c. The division operation is replaced by one lookup table denoted as M[k].
   i. The size of the lookup table denoted as V is less than $2^P$, where P is an integer number such as 5, 6, or 7.
   ii. Each entry of the lookup table stores an F-bit integer number, e.g., F=8 or 16.
      (a) In one example, M[k−Z]=((1<<S)+Off)/k, where S is an integer defining the precision, e.g., S=F. Off is an offset, e.g., Off=(k+Z)>>1. Z defines the beginning value of the table, e.g., Z=1, or Z=8, or Z=32. A valid key k inquiring the table must satisfy k>=Z.
   iii. k=Shift(L1−L0, W) is used as the key to inquire the lookup table.
      (a) In one example, W depends on BL, V and Z.
      (b) In one example, W also depends on the value of L1−L0.
   iv. If k is not a valid key to inquire the lookup table (k−Z<0 or k−Z>=V), α is output as 0.
   v. For example, $$\alpha=\text{Shift}((C1-C0)\times M[k-Z],D), \text{ or}$$

$$\alpha=\text{SignShift}((C1-C0)\times M[k-Z],D)$$

vi. To get a chroma prediction CP from its corresponding (e.g., down-sampled for 4:2:0) luma sample LR, it is calculated as $$CP=\text{SignShift}(\alpha\times LR+\beta,Sh), \text{ or}$$

$$CP=\text{Shift}(\alpha\times LR+\beta,Sh)$$

vii. Sh can be a fixed number, or it may depend on the values of C0, C1, L0, L1 used to calculated α and β.
      (a) Sh may depend on BL, BC, V, S and D.
      (b) D may depend on Sh.
   viii. The size of the lookup table denoted as V is equal to $2^P$, where P is an integer number such as 5, 6, 7 or 8. Alternatively, V is set to $2^P$−M (e.g., M is equal to 0).
   ix. Suppose α=P/Q (e.g. Q=L1−L0, P=C1−C0, or they are derived in other ways), then α is calculated with the lookup table as $$\alpha=\text{Shift}(P\times M[k-Z],D) \text{ or } \alpha=\text{SignShift}(P\times M[k-Z],D),$$

where k is the key (index) to inquire an entry in the lookup table.
      (a) In one example, k is derived from Q with a function: k=f(Q).
      (b) In one example, k is derived from Q and P, with a function: k=f(Q, P).

(c) In one example, k is valid in a specific range [kMin, kMax]. For example, kMin=Z and kMax=V+Z.

(d) In one example, k=Shift(Q, W), a. W may depend on BL, V and Z.

b. W may depend on the value of Q.

c. In one example, when k is calculated as Shift(Q, W), then a is calculated with the lookup table as $$\alpha=(\text{Shift}(P\times M[k-Z],D))<<W \text{ or}$$

$$\alpha=(\text{SignShift}(P\times M[k-Z],D))<<W$$

(e) In one example, k is derived in different ways with different values of Q.

a. For example, k=Q when Q<=kMax, and k=Shift (Q, W) when Q>kMax. For example, W is chosen as the smallest positive integer that makes Shift(Q, W) no greater than kMax.

b. For example, k=Min(kMax, Q).

c. For example, k=Max(kMin, Min(kMax, Q)).

(f) In one example, when Q<0, −Q is used to replace Q in the calculation. Then −α is output.

(g) In one example, when Q is equal to 0, then α is set to be a default value such as 0 or 1.

(h) In one example, when Q is equal to $2^E$ E>=0, then α=Shift(P, E) or α=SignShift(P, E).

d. All operations to derive the LM parameters must be within K bits, K can be 8, 10, 12, 16, 24 or 32.

i. If an intermedia variable may exceed the range represented by the constrained bits, it should be clipped or right shifted to be within the constrained bits.

Example 4

Figure 7:
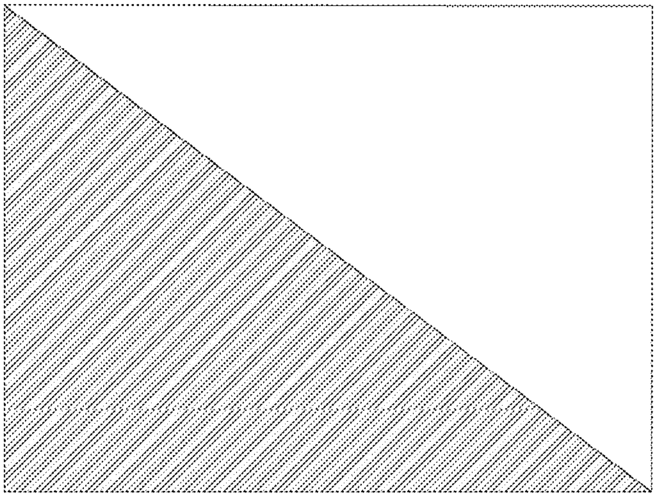
FIG. 7 shows an example of different parts of a chroma block predicted by a linear model using only left-neighboring samples (LM-L) and a linear model using only above-neighboring samples (LM-A).

One single chroma block may use multiple linear models and the selection of multiple linear model is dependent on the position of chroma samples within the chroma block.

a. In one example, LM-L and LM-A mode can be combined in a single chroma block.

b. In one example, some samples are predicted by LM-L mode and other samples are predicted by LM-A mode.

i. FIG. 7 shows an example. Suppose the top-left sample is at position (0,0). Samples at position (x,y) with x>y (or x>=y) are predicted by LM-A, and other samples are predicted by LM-L.

c. Suppose the prediction with LM-L and LM-A for a sample at position (x,y) are denoted as P1(x,y) and P2(x,y), respectively, then the final prediction P(x,y) is calculated as a weighted sum of P1(x,y) and P2(x,y).

i. P(x,y)=w1*P1(x,y)+w2*P2(x,y)

(a) w1+w2=1.

ii. P(x,y)=(w1*P1(x,y)+w2*P2(x,y)+Offset)>>shift, where offset may be 0 or 1<<(shift−1), and shift is an integer such as 1, 2, 3 . . . .

(a) w1+w2=1<<shift.

iii. P(x,y)=(w1*P1(x,y)+((1<<shift)−w1)*P2(x,y)+Offset)>>shift, where offset may be 0 or 1<<(shift−1), and shift is an integer such as 1, 2, 3 . . . .

iv. w1 and w2 may depend on the position (x,y)

(a) For example, w1>w2 (e.g. w1=3, w2=1) if x<y, (b) For example, w1<w2 (e.g. w1=1, w2=3) if x>y, (c) For example, w1=w2 (e.g. w1=2, w2=2) if x==y, (d) For example, w1−w2 increases if y−x increases when x<y, (e) For example, w2−w1 increases if x−y increases when x>y.

Example 5

It is proposed that the neighboring samples (including chroma samples and their corresponding luma samples, which may be down-sampled) are divided into N groups. The maximum luma value and minimum luma value for the k-th group (with k=0, 1, . . . , N−1) is denoted as $\text{MaxL}_k$ and $\text{MinL}_k$, and their corresponding chroma values are denoted as $\text{MaxC}_k$ and $\text{MinC}_k$, respectively.

a. In one example, MaxL is calculated as MaxL=f1 ($\text{MaxL}_{S0}$, $\text{MaxL}_{S1}$, . . . , $\text{MaxL}_{Sm}$); MaxC is calculated as MaxC=f2($\text{MaxC}_{S0}$, $\text{MaxC}_{S1}$, . . . $\text{MaxC}_{Sm}$); MinL is calculated as MinL=f3($\text{MinL}_{S0}$, $\text{MinL}_{S1}$, . . . $\text{MinL}_{Sm}$). MinC is calculated as MinC=f3($\text{MinC}_{S0}$, $\text{MinC}_{S1}$, . . . , $\text{MinC}_{Sm}$). f1, f2, f3 and f4 are functions. The two-point method derives α and β with the input as:

$$\alpha=\frac{\text{Max}\,C-\text{Min}\,C}{\text{Max}\,L-\text{Min}\,L}$$

$$\beta=\text{Min}\,C-\alpha\,\text{Min}\,L$$

i. In one example, f1, f2, f3, f4 all represent the averaging function.

ii. S0, S1, . . . Sm are indices of selected groups which are used to calculate α and β.

(1) For example, all groups are used, e.g., S0=0, S1=1, . . . Sm=N−1.

(2) For example, two groups are used, e.g., m=1, S0=0, S1=N−1.

(3) For example, not all groups are used, e.g. m<N−1, S0=0, S1=2, S3=4, . . . .

b. In one example, samples (or down-sampled samples) located at above rows may be classified to one group and samples (or down-sampled samples) located at left columns of a block may be classified to another group.

c. In one example, samples (or down-sampled samples) are classified based on their locations or coordinates.

i. For examples, samples may be classified into two groups.

(1) For a sample with coordinate (x,y) located at above rows, it is classified into group S0 if x % P=Q, where P and Q are integers, e.g. P=2, Q=1, P=2, Q=0 or P=4, Q=0; Otherwise, it is classified into group S1.

(2) For a sample with coordinate (x,y) located at left columns, it is classified into group S0 if y % P=Q, where P and Q are integers, e.g. P=2, Q=1, P=2, Q=0 or P=4, Q=0; Otherwise, it is classified into group S1.

(3) Only samples in one group, such as S0, are used to find MaxC and MaxL. For example, MaxL=MaxLS0 and MaxC=MaxCS0.

d. In one example, only partial of neighboring samples (or down-sampled samples) are used for divided to N groups.

e. The number of groups (e.g., N) and/or the selected group indices and/or functions (f1/f2/f3/f4) may be pre-defined or signaled in SPS/VPS/PPS/picture header/slice header/tile group header/LCUs/LCU/CUs.

f. In one example, how to select the samples for each group may depend the availability of neighboring blocks.

i. For example, $\text{MaxL}_0/\text{MaxC}_0$ and $\text{MinL}_0/\text{MinC}_0$ are found from position A and D; $\text{MaxL}_1/\text{MaxC}_1$ and $\text{MinL}_1/\text{MinC}_1$ are found from position J and M, then $MaxL=(MaxL_0+MaxL_1)/2$, $MaxC=(MaxC_0+MaxC_1)/2$, $MinL=(MinL_0+MinL_1)/2$, $MinC=(MinC_0+MinC_1)/2$, when both the left and the above neighboring blocks are available.

ii. For example, MaxL/MaxC and MinL/MinC are directly found from position A and D when only the left neighboring block is available.

(1) Alternatively, α and β are set equal to some default values if the above neighboring block is not available. For example, α=0 and β=1<<(bitDepth−1), where bitDepth is the bit depth of the chroma samples.

iii. For example, MaxL/MaxC and MinL/MinC are directly found from position J and M when only the above neighboring block is available.

(1) Alternatively, α and β are set equal to some default values if the left neighboring block is not available. For example, α=0 and β=1<<(bitDepth−1), where bitDepth is the bit depth of the chroma samples.

g. In one example, how to select the samples for each group may depend the width and height of the block.

h. In one example, how to select the samples for each group may depend on the values of samples.

i. In one example, the two samples with the largest luma value and minimum luma value are picked out to be in a first group. And all other samples are in a second group.

Example 6

It is proposed that whether and how to apply LM-L and LM-A mode may depend on the width (W) and height (H) of the current block.

(a) For example, LM-L cannot be applied if W>K×H. e.g., K=2.

(b) For example, LM-A cannot be applied if H>K×W. e.g., K=2.

(c) If one of LM-L and LM-A cannot be applied, the flag to indicate whether LM-L or LM-A is used should not be signaled.

Example 7

Figure 8:
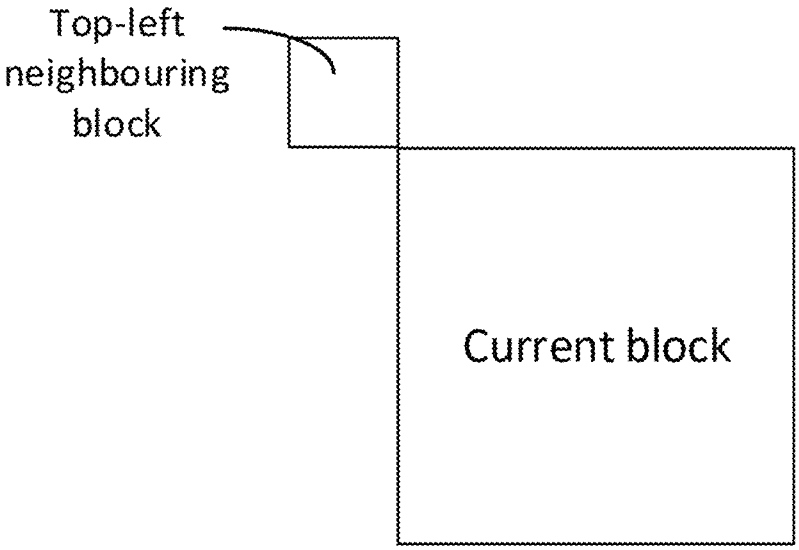
FIG. 8 shows an example of a top-left neighboring block.

A flag is signaled to indicate whether CCLM mode is applied. The context used in arithmetic coding to code the flag may depend on whether the top-left neighboring block as shown in FIG. 8 applies CCLM mode or not.

(a) In one example, a first context is used if the top-left neighboring block applies CCLM mode; and a second context is used if the top-left neighboring block does not apply CCLM mode.

(b) In one example, if the top-left neighboring block is not available, it is considered as not applying CCLM mode.

(c) In one example, if the top-left neighboring block is not available, it is considered as applying CCLM mode.

(d) In one example, if the top-left neighboring block is not intra-coded, it is considered as not applying CCLM mode.

(e) In one example, if the top-left neighboring block is not intra-coded, it is considered as applying CCLM mode.

Example 8

Indications or codewords of DM and LM modes may be coded in different orders from sequence to sequence/picture to picture/tile to tile/block to block.

(a) The coding order of indications of LM and DM (e.g., firstly code whether it is LM mode, if not, then code whether it is DM mode; or firstly code whether it is DM mode, if not, then code whether it is LM mode) may be depend on the mode information of one or multiple neighboring blocks.

(b) In one example, when the top-left block of the current block is available and coded with LM mode, then the indication of LM mode is firstly coded.

(c) Alternatively, when the top-left block of the current block is available and coded with DM mode, then the indication of DM mode is firstly coded.

(d) Alternatively, when the top-left block of the current block is available and coded with non-LM (e.g., DM mode or other intra prediction modes excluding LM), then the indication of DM mode is firstly coded.

(e) In one example, indications of the order may be signaled in in SPS/VPS/PPS/picture header/slice header/tile group header/LCUs/LCU/CUs.

Example 9

In above examples, samples (or down-sampled samples) may be located beyond the range of 2×W above neighboring samples or 2×H left neighboring samples as shown in FIG. 6.

(a) With LM mode or LM-L mode, it may use a neighboring sample RecC[x−1, y+d], where d is in the range of [T, S]. T may be smaller than 0, and S may be larger than 2H−1. For example, T=−4 and S=3H. In another example, T=0, S=max(2H, W+H). In still another example, T=0 and S=4H.

(b) With LM mode or LM-A mode, it may use a neighboring sample RecC[x+d, y], where d is in the range of [T, S]. T may be smaller than 0, and S may be larger than 2W−1. For example, T=−4 and S=3 W. In another example, T=0, S=max(2W, W+H). In still another example, T=0 and S=4 W.

Example 10

In one example, the chroma neighboring samples and their corresponding luma samples (may be down-sampled) are down-sampled before deriving the linear model parameters α and β as disclosed in Examples 1-7. Suppose the width and height of the current chroma block is W and H.

(a) In one example, whether and how to conduct down-sampling may depend on W and H.

(b) In one example, the number of neighboring samples used to derive the parameters left to the current block, and the number of neighboring samples used to derive the parameters above to the current block should be the same after the down-sampling process.

(c) In one example, the chroma neighboring samples and their corresponding luma samples (may be down-sampled) are not down-sampled if W is equal to H.

(d) In one example, the chroma neighboring samples and their corresponding luma samples (may be down-sampled) left to the current block are down-sampled if W<H.

(i) In one example, one chroma sample in each H/W chroma samples are picked to be used for deriving α and β. Other chroma samples are discarded. For example, suppose R[0, 0] represents the top-left sample of the current block, then R[−1, K*H/W], K from 0 to W−1, are picked to be used for deriving α and β.

(e) In one example, the chroma neighboring samples and their corresponding luma samples (may be down-sampled) above to the current block are down-sampled if W>H.

(ii) In one example, one chroma sample in each W/H chroma samples are picked to be used for deriving α and β. Other chroma samples are discarded. For example, suppose R[0, 0] represents the top-left sample of the current block, then R[K*W/H, −1], K from 0 to H−1, are picked to be used for deriving α and β.

Figure 9:
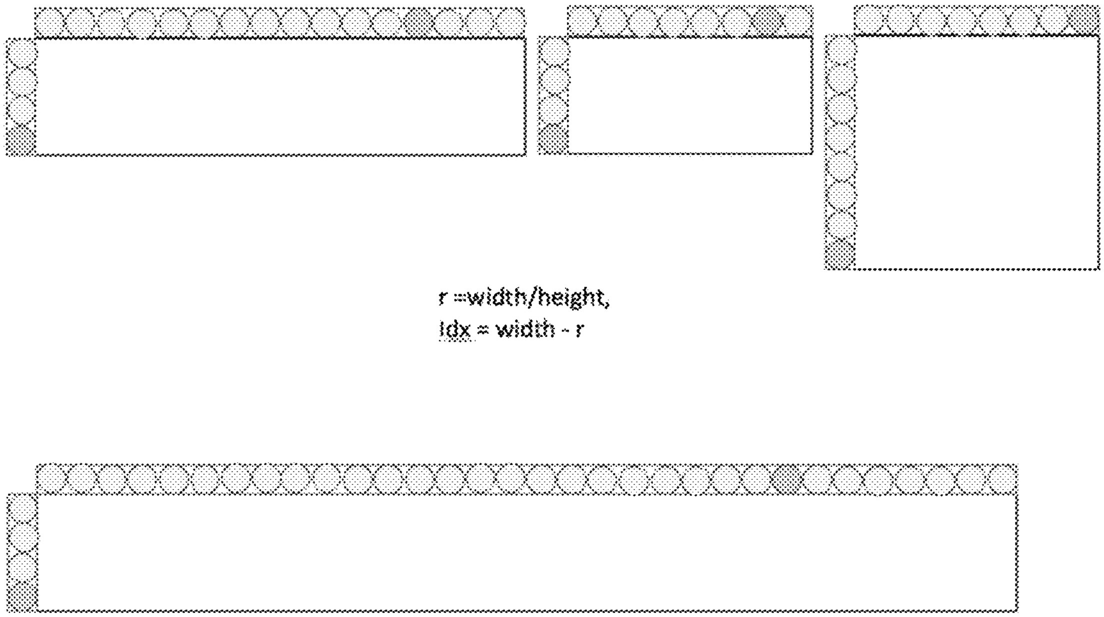
FIG. 9 shows an example of samples to be used to derive a linear model.

(ii) FIG. 9 shows examples of samples to be picked up when position D and position M in FIG. 6 are used to derive α and β, and down-sampling performed when W>H.

Example 11

Neighboring downsampled/originally reconstructed samples and/or downsampled/originally reconstructed samples may be further refined before being used in the linear model prediction process or cross-color component prediction process.

(a) "To be refined" may refer to a filtering processing.

(b) "To be refined" may refer to any non-linear processing (c) It is proposed that several neighbouring samples (including chroma samples and their corresponding luma samples, which may be down-sampled) are picked up to calculate C1, C0, L1 and L0, in order to derive α and β, such as α=(C1−C0) (L1−L0) and β=C0−αL0.

(d) In one example, S neighboring luma samples (maybe down-sampled) denoted as Lx1, Lx2, . . . , LxS, and their corresponding chroma samples denoted as Cx1, Cx2, . . . CxS are used to derive C0 and L0, and T neighboring luma samples (maybe down-sampled) denoted as Ly1, Ly2, . . . , LyT, and their corresponding chroma samples denoted as Cy1, Cy2, . . . CyT are used to derive C1 and L1 as:

(i) C0=f0(Cx1, Cx2, . . . CxS), L0=f1(Lx1, Lx2, . . . LxS), C1=f2(Cy1, Cy2, . . . CyT), L1=f4(Ly1, Ly2, . . . LyT). f0, f1, f2 and f3 are any functions.

(ii) In one example, f0 is identical to f1.

(iii) In one example, f2 is identical to f3.

(iv) In one example, f0 f1 f2 f are identical.

1. For example, they are all the averaging function.

(v) In one example, S is equal to T.

1. In one example, the set {x1, x2, . . . xS} is identical to the set {y1, y2, . . . , yT}.

(vi) In one example, Lx1, Lx2, . . . , LxS are chosen as the smallest S luma samples of a group of luma samples.

1. For example, the group of luma samples includes all neighboring samples used in VTM-3.0 to derive CCLM linear parameters.

2. For example, the group of luma samples includes partial neighboring samples used in VTM-3.0 to derive CCLM linear parameters.

a. For example, the group of luma samples includes four samples as shown in FIG. 2-5.

(vii) In one example, Ly1, Ly2, . . . , LyS are chosen as the largest S luma samples of a group of luma samples.

1. For example, the group of luma samples includes all neighboring samples used in VTM-3.0 to derive CCLM linear parameters.

2. For example, the group of luma samples includes partial neighboring samples used in VTM-3.0 to derive CCLM linear parameters.

a. For example, the group of luma samples includes four samples as shown in FIGS. 2-5.

Example 12

It is proposed to select other neighboring or downsampled neighboring samples based on the largest neighboring or downsampled neighboring sample in a given set of neighboring or downsampled neighboring samples.

(a) In one example, denote the largest neighboring or downsampled neighboring sample is located at position (x0, y0). Then samples in the region (x0−d1, y0), (x0, y0−d2), (x0+d3, y0), (x0, y0+d4) may be utilized to select other samples. Integers {d1, d2, d3, d4} may depend on the position (x0, y0). For example, if (x0, y0) is left to the current block, then d1=d3=1 and d2=d4=0. If (x0,y0) is above to the current block, then d1=d3=0 and d2=d4=1.

(b) In one example, denote the smallest neighboring or downsampled neighboring sample is located at position (x1, y1). Then samples in the region (x1−d1, y1), (x1, y1−d2), (x1+d3, y1), (x1, y1+d4) may be utilized to select other samples. Integers {d1, d2, d3, d4} may depend on the position (x1, y1). For example, if (x1, y1) is left to the current block, then d1=d3=1 and d2=d4=0. If (x1,y1) is above to the current block, then d1=d3=0 and d2=d4=1.

(c) In one example, the above samples are representing samples of one color component (e.g., luma color component). Samples used in CCLM/cross-color component process may be derived by corresponding coordinates of a second color component.

(d) Similar way can be used to derive smallest samples.

Example 13

In above examples, luma and chroma may be switched. Alternatively, luma color component may be replaced by the main color component (e.g., G), and chroma color component may be replaced by dependent color component (e.g., B or R).

Example 14

Selection of locations of chroma samples (and/or corresponding luma samples) may depend on the coded mode information.

Figure 10:
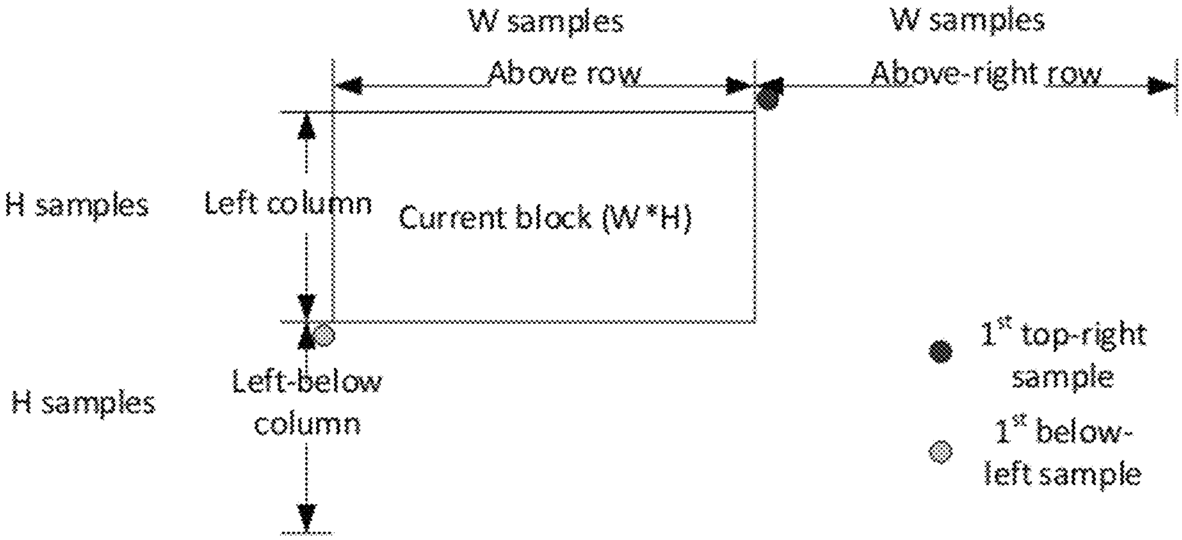
FIG. 10 shows an example of left and below-left columns and above and above-right rows relative to a current block.

(a) Alternatively, furthermore, it may depend on the availability of neighboring samples, such as whether left column or above row or above-right row or below-left column is available. FIG. 10 depicts the concepts of left column/above row/above-right row/below-left column relative to a block.

(b) Alternatively, furthermore, it may depend on the availability of samples located at certain positions, such as whether the $1^{st}$ top-right sample and/or $1^{st}$ below-left sample is available.

(c) Alternatively, furthermore, it may depend on block dimensions.

(i) Alternatively, furthermore, it may depend on the ratio between width and height of current chroma (and/or luma) block.

(ii) Alternatively, furthermore, it may depend on whether the width and/or height is equal to K (e.g., K=2).

(d) In one example, when the current mode is a normal LM mode, the following ways may be applied to select chroma samples (and/or luma samples downsampled or non-downsampled):

(i) If both left column and above row are available, two samples of left column and two of above row may be selected. They may be located at (suppose the top-left coordinate of the current block is (x, y)):

$(x-1,y),(x,y-1),(x-1,y+H-1)$ and $(x+W-1,y-1)$ 1.

$(x-1,y),(x,y-1),(x-1,y+H-H/W-1)$ and $(x+W-1,y-1)$. For example, when $H$ is larger than $W$. 2.

$(x-1,y),(x,y-1),(x-1,y+H-1)$ and $(x+W-W/H-1,y-1)$. For example, when $H$ is smaller than $W$. 3.

$(x-1,y),(x,y-1),(x-1,y+H-\max(1,H/W))$ and $(x+W-\max(1,W/H),y-1)$. 4.

(ii) If only above row is available, samples are only selected from the above row.

1. For example, four samples of above row may be selected.
2. For example, two samples may be selected.
3. How to select the samples may depend on the width/height. For example, four samples are selected when W>2 and two samples are selected when W=2.
4. The selected samples may be located at (suppose the top-left coordinate of the current block is (x, y)):

$(x,y-1),(x+W/4,y-1),(x+2^*W/4,y-1),(x+3^*W/4,y-1)$ a.

$(x,y-1),(x+W/4,y-1),(x+3^*W/4,y-1),(x+W-1,y-1)$ b.

$(x,y-1),(x+(2W)/4,y-1),(x+2^*(2W)/4,y-1),(x+3^*(2W)/4,y-1)$. c.

For example, when top-right row is available, or when 1st top-right sample is available.

$(x,y-1),(x+(2W)/4,y-1),(x+3^*(2W)/4,y-1),(x+(2W)-1,y-1)$. d.

For example, when top-right row is available, or when 1st top-right sample is available.

(iii) If only left column is available, samples are only selected from the left column.

1. For example, four samples of left column may be selected;
2. For example, two samples of left column may be selected;
3. How to select the samples may depend on the width/height. For example, four samples are selected when H>2 and two samples are selected when H=2.
4. The selected samples may be located at:

$(x-1,y),(x-1,y+H/4),(x-1,y+2^*H/4),(x-1,y+3^*H/4)$ a.

$(x-1,y),(x-1,y+2^*H/4),(x-1,y+3^*H/4),(x-1,y+H-1)$ b.

$(x-1,y),(x-1,y+(2H)/4),(x-1,y+2^*(2H)/4),(x-1,y+3^*(2H)/4)$. c.

For example, when below-left column is available, or when 1st below-left sample is available.

$(x-1,y),(x-1,y+2^*(2H)/4),(x-1,y+3^*(2H)/4),(x-1,y+(2H)-1)$. d.

For example, when below-left column is available, or when 1st below-left sample is available.

(iv) For above examples, only two of the four samples may be selected.

(e) In one example, when the current mode is the LM-A mode, it may choose samples according to Example 11(d)(ii).

(f) In one example, when the current mode is the LM-L mode, it may choose samples according to Example 11(d)(iii).

(g) The luma selected samples (e.g., according to the selected chroma locations) may be grouped to 2 groups, one is with the largest value and smallest value of all selected samples, the other group is with all remaining samples.

(i) The two maximum values of 2 groups are averaged as the maximum value in the 2-point method; the two minimum values of 2 groups are averaged as the minimum value in the 2-point method to derive LM parameters.

(ii) When there are only 4 samples selected, two larger sample values are averaged, two smaller sample values are averaged, and averaged values are used as the input to the 2-point method to derive LM parameters.

Example 15

In above examples, luma and chroma may be switched. Alternatively, luma color component may be replaced by the main color component (e.g., G), and chroma color component may be replaced by dependent color component (e.g., B or R).

Example 16

It is proposed to select the above neighbouring chroma samples (and/or their corresponding luma samples which may be down-sampled) based on a first position offset value (denoted as F) and a step value (denoted as S). Suppose the width of available above neighbouring samples to be used is W.

a. In one example, W may be set to the width of current block.
b. In one example, W may be set to (L*width of current block) wherein L is an integer value.
c. In one example, when both above and left blocks are available, W may be set to the width of current block.
   i. Alternatively, when the left block is NOT available, W may be set to (L*width of current block) wherein L is an integer value.
   ii. In one example, L may be dependent on the availability of top-right block. Alternatively, L may depend on the availability of one top-left sample.
d. In one example, W may depend on the coded mode.
   i. In one example, W may be set to the width of current block if the current block is coded as LM mode;
   ii. W may be set to (L*width of current block) wherein L is an integer value if the current block is coded as LM-A mode.
      (a) L may be dependent on the availability of top-right block. Alternatively, L may depend on the availability of one top-left sample.
e. Suppose the top-left coordinate of the current block is (x0, y0), then the above neighbouring samples at positions (x0+F+K×S, y0−1) with K=0, 1, 2, . . . kMax are selected.

f. In one example, F=W/P. P is an integer.
  i. For example, $P=2^i$, where i is an integer such as 1 or 2.
  ii. Alternatively, F=W/P+offset.
g. In one example, S=W/Q. Q is an integer.
  i. For example, Q=2j, where j is an integer such as 1 or 2.
h. In one example, F=S/R. R is an integer.
  i. For example, $R=2^m$, where m is an integer such as 1 or 2.
i. In one example, S=F/Z. Z is an integer.
  i. For example, $Z=2^n$, where n is an integer such as 1 or 2.
j. kMax and/or F and/or S and/or offset may depend on the prediction mode (such as LM, LM-A or LM-L) of the current block;
k. kMax and/or F and/or S and/or offset may depend on the width and/or height of the current block.
l. kMax and/or F and/or S and/or offset may depend on availability of neighbouring samples.
m. kMax and/or F and/or S and/or offset may depend on W.
n. For example, kMax=1, F=W/4, S=W/2, offset=0. Alternatively, furthermore, the settings are done if the current block is LM coded, both the left and above neighbouring samples are available, and W>=4.
o. For example, kMax=3, F=W/8, S=W/4, offset=0. Alternatively, furthermore, the settings are done if the current block is LM coded, only above neighbouring samples are available, and W>=4.
p. For example, kMax=3, F=W/8, S=W/4, offset=0. Alternatively, furthermore, the settings are done if the current block is LM-A coded and W>=4.
q. For example, kMax=1, F=0, S=1, offset=0. Alternatively, furthermore, the settings are done if W is equal to 2.

Example 17

It is proposed to select the left neighbouring chroma samples (and/or their corresponding luma samples which may be down-sampled) based on a first position offset value (denoted as F) and a step value (denoted as S). Suppose the height of available left neighbouring samples to be used is H.

a. In one example, H may be set to the height of current block.
b. In one example, H may be set to (L*height of current block) wherein L is an integer value.
c. In one example, when both above and left blocks are available, H may be set to the height of current block.
  i. Alternatively, when the above block is NOT available, H may be set to (L*height of current block) wherein L is an integer value.
  ii. In one example, L may be dependent on the availability of below-left block. Alternatively, L may be dependent on the availability of one below-left sample.
  iii. Alternatively, H may be set to (height of current block+width of the current block) if the required above-right neighbouring blocks are available.
    (a) In one example, same H above neighbouring samples are picked for LM-A mode and LM mode when left neighbouring samples are unavailable.
d. In one example, H may depend on the coded mode.
  i. In one example, H may be set to the height of current block if the current block is coded as LM mode;
  ii. W may be set to (L*height of current block) wherein L is an integer value if the current block is coded as LM-L mode.
    (a) L may be dependent on the availability of below-left block. Alternatively, L may depend on the availability of one top-left sample.
    (b) Alternatively, W may be set to (height of current block+width of the current block) if the required below-left neighbouring blocks are available.
    (c) In one example, same W left neighbouring samples are picked for LM-L mode and LM mode when above neighbouring samples are unavailable.
e. Suppose the top-left coordinate of the current block is (x0, y0), then the left neighbouring samples at positions (x0−1, y0+F+K×S) with K=0, 1, 2, . . . kMax are selected.
f. In one example, F=H/P. P is an integer.
  i. For example, $P=2^i$, where i is an integer such as 1 or 2.
  ii. Alternatively, F=H/P+offset.
g. In one example, S=H/Q. Q is an integer.
  i. For example, Q=2j, where j is an integer such as 1 or 2.
h. In one example, F=S/R. R is an integer.
  i. For example, $R=2^m$, where m is an integer such as 1 or 2.
i. In one example, S=F/Z. Z is an integer.
  i. For example, $Z=2^n$, where n is an integer such as 1 or 2.
j. kMax and/or F and/or S and/or offset may depend on the prediction mode (such as LM, LM-A or LM-L) of the current block;
k. kMax and/or F and/or S and/or offset may depend on the width and/or height of the current block.
l. kMax and/or F and/or S and/or offset may depend on H.
m. kMax and/or F and/or S and/or offset may depend on availability of neighbouring samples.
n. For example, kMax=1, F=H/4, S=H/2, offset=0. Alternatively, furthermore, the settings are done if the current block is LM coded, both the left and above neighbouring samples are available, and H>=4.
o. For example, kMax=3, F=H/8, S=H/4, offset=0. Alternatively, furthermore, the settings are done if the current block is LM coded, only above neighbouring samples are available, and H>=4.
p. For example, kMax=3, F=H/8, S=H/4, offset=0. Alternatively, furthermore, the settings are done if the current block is LM-L coded and H>=4.
q. For example, kMax=1, F=0, S=1, offset=0 if H is equal to 2.

Example 18

It is proposed two or four neighbouring chroma samples (and/or their corresponding luma samples which may be down-sampled) are selected to derive the linear model parameters.

a. In one example, maxY/maxC and minY/minC are derived from two or four neighbouring chroma samples (and/or their corresponding luma samples which may be down-sampled), and are then used to derive the linear model parameters with the 2-point approach.
b. In one example, if there are two neighbouring chroma samples (and/or their corresponding luma samples which may be down-sampled) are selected to derive the maxY/maxC and minY/minC, minY is set to be the smaller luma sample value and minC is its corresponding chroma sample value; maxY is set to be the larger luma sample value and maxC is its corresponding chroma sample value.

c. In one example, if there are four neighbouring chroma samples (and/or their corresponding luma samples which may be down-sampled) are selected to derive the maxY/maxC and minY/minC, the luma samples and their corresponding chroma samples are divided into two arrays G0 and G1, each contains two luma samples and their corresponding luma samples.
 i. Suppose the four luma samples and their corresponding chroma samples are denoted as S0, S1, S2, S3, then they can be divided into two groups in any order. For example:
  (a) G0={S0, S1}, G1={S2, S3};
  (b) G0={S1, S0}, G1={S3, S2};
  (c) G0={S0, S2}, G1={S1, S3};
  (d) G0={S2, S0}, G1={S3, S1};
  (e) G0={S1, S2}, G1={S0, S3};
  (f) G0={S2, S1}, G1={S3, S0};
  (g) G0={S0, S3}, G1={S1, S2};
  (h) G0={S3, S0}, G1={S2, S1};
  (i) G0={S1, S3}, G1={S0, S2};
  (j) G0={S3, S1}, G1={S2, S0};
  (k) G0={S3, S2}, G1={S0, S1};
  (l) G0={S2, S3}, G1={S1, S0};
  (m) G0 and G1 may be swapped.
 ii. In one example, Luma sample value of G0 [0] and G0 [1] are compared, if luma sample value of G0 [0] is larger than luma sample value of G0 [1], the luma sample and its corresponding chroma sample of G0 [0] are swapped with those onf G0 [1].
  (a) Alternatively, if luma sample value of G0 [0] is larger than or equal to luma sample value of G0 [1], the luma sample and its corresponding chroma sample of G0 [0] are swapped with those onf G0[1].
  (b) Alternatively, if luma sample value of G0 [0] is smaller than luma sample value of G0 [1], the luma sample and its corresponding chroma sample of G0 [0] are swapped with those onf G0 [1].
  (c) Alternatively, if luma sample value of G0 [0] is smaller than or equal to luma sample value of G0 [1], the luma sample and its corresponding chroma sample of G0[0] are swapped with those onf G0[1].
 iii. In one example, Luma sample value of G1 [0] and G1 [1] are compared, if luma sample value of G1[0] is larger than luma sample value of G1[1], the luma sample and its corresponding chroma sample of G1 [0] are swapped with those onf G1[1].
  (a) Alternatively, if luma sample value of G1[0] is larger than or equal to luma sample value of G1 [1], the luma sample and its corresponding chroma sample of G1[0] are swapped with those onf G1 [1].
  (b) Alternatively, if luma sample value of G1[0] is smaller than luma sample value of G1 [1], the luma sample and its corresponding chroma sample of G1[0] are swapped with those onf G1[1].
  (c) Alternatively, if luma sample value of G1[0] is smaller than or equal to luma sample value of G1 [1], the luma sample and its corresponding chroma sample of G1[0] are swapped with those onf G1 [1].
 iv. In one example, Luma sample value of G0 [0] and G1 [1] are compared, if luma sample value of G0 [0] is larger than (or smaller than, or not larger than, or not smaller than) luma sample value of G1[1], then G0 and G1 are swapped.
  (a) In one example, Luma sample value of G0 [0] and G1 [0] are compared, if luma sample value of G0 [0] is larger than (or smaller than, or not larger than, or not smaller than) luma sample value of G1 [0], then G0 and G1 are swapped.
  (b) In one example, Luma sample value of G0 [1] and G1 [0] are compared, if luma sample value of G0 [1] is larger than (or smaller than, or not larger than, or not smaller than) luma sample value of G1 [0], then G0 and G1 are swapped.
  (c) In one example, Luma sample value of G0 [1] and G1 [1] are compared, if luma sample value of G0 [1] is larger than (or smaller than, or not larger than, or not smaller than) luma sample value of G1[1], then G0 and G1 are swapped.
 v. In one example, Luma sample value of G0 [0] and G1 [1] are compared, if luma sample value of G0 [0] is larger than (or smaller than, or not larger than, or not smaller than) luma sample value of G1 [1], then G0 [0] and G1 [1] are swapped.
  (a) In one example, Luma sample value of G0 [0] and G1 [0] are compared, if luma sample value of G0 [0] is larger than (or smaller than, or not larger than, or not smaller than) luma sample value of G1 [0], then G0 [0] and G1 [0] are swapped.
  (b) In one example, Luma sample value of G0 [1] and G1 [0] are compared, if luma sample value of G0 [1] is larger than (or smaller than, or not larger than, or not smaller than) luma sample value of G1 [0], then G0 [1] and G1 [0] are swapped.
  (c) In one example, Luma sample value of G0 [1] and G1 [1] are compared, if luma sample value of G0 [1] is larger than (or smaller than, or not larger than, or not smaller than) luma sample value of G1 [1], then G0 [1] and G1 [1] are swapped.
 vi. In one example, maxY is calculated as the average of luma sample values of G0 [0] and G0 [1], maxC is calculated as the average of chroma sample values of G0 [0] and G0 [1].
  (a) Alternatively, maxY is calculated as the average of luma sample values of G1 [0] and G1 [1], maxC is calculated as the average of chroma sample values of G1[0] and G1[1].
 vii. In one example, minY is calculated as the average of luma sample values of G0 [0] and G0 [1], minC is calculated as the average of chroma sample values of G0 [0] and G0 [1].
  Alternatively, minY is calculated as the average of luma sample values of G1[0] and G1[1], minC is calculated as the average of chroma sample values of G1 [0] and G1 [1].

d. In one example, if there are only two neighbouring chroma samples (and/or their corresponding luma samples which may be down-sampled) are available, they are first padded to be four chroma samples (and/or their corresponding luma samples), then the four chroma samples (and/or their corresponding luma samples) are used to derive the CCLM parameters.
 i. In one example, two padding chroma samples (and/or their corresponding luma samples) are copied from the two available neighbouring chroma samples (and/or their corresponding luma samples which may be down-sampled)

Example 19

In all above examples, the selected chroma samples shall be located within the above row (i.e., with W samples) as depicted in FIG. 10, and/or the left column (i.e., with H samples) wherein W and H are the width and height of the current block.

a. Alternatively, above restriction may be applied when current block is coded with the normal LM mode.
b. Alternatively, the selected chroma samples shall be located within the above row (i.e., with W samples) and above-right row with H samples.
   i. Alternatively, furthermore, the above restriction may be applied when the current block is coded with the LM-A mode.
   ii. Alternatively, furthermore, the above restriction may be applied when the current block is coded with the LM-A mode or the normal LM mode with above row available but left column is unavailable.
c. Alternatively, the selected chroma samples shall be located within the left column (i.e., with H samples) and below-left column with W samples.
   i. Alternatively, furthermore, the above restriction may be applied when the current block is coded with the LM-L mode.
   ii. Alternatively, furthermore, the above restriction may be applied when the current block is coded with the LM-L mode or the normal LM mode with above row unavailable but left column is available.

Example 20

In one example, only the neighbouring luma samples at the positions where corresponding chroma samples are required to derive the CCLM parameters, need to be down-sampled.

Example 21

How to conduct the methods disclosed in this document may depend on the color format (such as 4:2:0 or 4:4:4).
a. Alternatively, how to conduct the methods disclosed in this document may depend on the bit-depth (such as 8-bit or 10-bit).
b. Alternatively, how to conduct the methods disclosed in this document may depend on the color representation method (such as RGB or YCbCr).
c. Alternatively, how to conduct the methods disclosed in this document may depend on the color representation method (such as RGB or YCbCr).
d. Alternatively, how to conduct the methods disclosed in this document may depend on the chroma down-sampling location.

Example 22

Whether to derive the maximum/minimum values of luma and chroma components used to derive CCLM parameters may depend on the availability of left and above neighbours. For example, the maximum/minimum values for luma and chroma components used to derive CCLM parameters may not be derived if both the left and above neighbouring blocks are unavailable.
a. Whether to derive the maximum/minimum values of luma and chroma components used to derive CCLM parameters may depend on the number of available neighbor samples. For example, the maximum/minimum values for luma and chroma components used to derive CCLM parameters may not be derived if numSampL==0 and numSampT==0. In another example, the maximum/minimum values for luma and chroma components used to derive CCLM parameters may not be derived if numSampL+numSampT==0. In the two examples, numSampL and numSampT are the number of available neighbouring samples from left and above neighbouring blocks.
b. Whether to derive the maximum/minimum values of luma and chroma components used to derive CCLM parameters may depend on the number of picked samples used to derive the parameters. For example, the maximum/minimum values for luma and chroma components used to derive CCLM parameters may not be derived if cntL==0 and cntT==0. In another example, the maximum/minimum values for luma and chroma components used to derive CCLM parameters may not be derived if cntL+cntT==0. In the two examples, cntL and cntT are the number of picked samples from left and above neighbouring blocks.

Example 23

In one example, the proposed method to derive the parameters used in CCLM, may be used to derive the parameters used in LIC or other coding tools that relies on linear model.
a. The bullets disclosed above may be applied to LIC, such as by replacing "chroma neighbouring samples" by "neighbouring samples of the current block" and replacing "corresponding luma samples" by "neighbouring samples of the reference block".
b. In one example, the samples utilized for LIC parameter derivation may exclude samples certain positions in the above row and/or left column.
   i. In one example, the samples utilized for LIC parameter derivation may exclude the first one in the above row.
      (a) Suppose that the top-left sample's coordinate is (x0, y0), it is proposed to exclude (x0, y0-1) for the usage of LIC parameters.
   ii. In one example, the samples utilized for LIC parameter derivation may exclude the first one in the left column.
      (a) Suppose that the top-left sample's coordinate is (x0, y0), it is proposed to exclude (x0−1, y0) for the usage of LIC parameters.
   iii. Whether to apply above methods and/or how to define the certain positions may depend on the availability of left column/above row.
   iv. Whether to apply above methods and/or how to define the certain positions may depend on block dimension.
c. In one example, N neighbouring samples (which may be down-sampled) of the current block and N corresponding neighbouring samples (which may be down-sampled correspondingly) of the reference block may be used to derive the parameters used for LIC.
   i. For example, N is 4.
   ii. In one example, the N neighboring samples may be defined as N/2 samples from above row; and N/2 samples from left column.
      (a) Alternatively, the N neighboring samples may be defined as N samples from above row or left column.
   iii. In another example, N is equal to min (L, T), where T is the total number of available neighbouring samples (which may be down-sampled) of the current block.
      (a) In one example, L is set to 4
   iv. In one example, the selection of the coordinates of the N samples may follow the rule for selecting N samples in the CCLM process.
   v. In one example, the selection of the coordinates of the N samples may follow the rule for selecting N samples in the LM-A process.
   vi. In one example, the selection of the coordinates of the N samples may follow the rule for selecting N samples in the LM-L process.
   vii. In one example, how to select the N samples may depend on the availability of above row/left column.

d. In one example, the N neighbouring samples (which may be down-sampled) of the current block and the N corresponding neighbouring samples (which may be down-sampled correspondingly) of the reference block are used to derive the parameters used in LIC, may be picked up based on sample positions.
   i. The picking up method may depend on width and height of the current block.
   ii. The picking up method may depend on the availability of the neighbouring blocks.
   iii. For example, K1 neighbouring samples may be picked up from the left neighbouring samples and K2 neighbouring samples are picked up from the above neighbouring samples, if both above and left neighbouring samples are available. E.g. K1=K2=2.
   iv. For example, K1 neighbouring samples may be picked up from the left neighbouring samples if only left neighbouring samples are available. E.g. K1=4.
   v. For example, K2 neighbouring samples may be picked up from the above neighbouring samples if only above neighbouring samples are available. E.g. K2=4.
   vi. For example, the above samples may be picked up with a first position offset value (denoted as F) and a step value (denoted as S) which may depend on the dimension of the current block and the availability of the neighbouring blocks.
      (a) For example, methods disclosed in bullet 13 can be applied to derive F and S.
   vii. For example, the left samples may be picked up with a first position offset value (denoted as F) and a step value (denoted as S) which may depend on the dimension of the current block and the availability of the neighboring blocks.
      (a) For example, methods disclosed in bullet 14 can be applied to derive F and S.
e. In one example, the proposed method to derive the parameters used in CCLM, may also be used to derive the parameters used in LIC, when the current block is affine-coded.
f. The above methods may be used to derive the parameters used in other coding tools that relies on linear model.

In another example, cross-component prediction mode is proposed wherein the chroma samples are predicted with corresponding reconstructed luma samples according to the prediction model, as shown in Eq. 12. In Eq. 12, $Pred_C(x, y)$ denotes a prediction sample of chroma. α and β are two model parameters. $Rec'_L(x, y)$ is a down-sampled luma sample.

$$Pred_C(x,y)=\alpha\times Rec'_L(x,y)+\beta. \quad (12)$$

Figure 11:
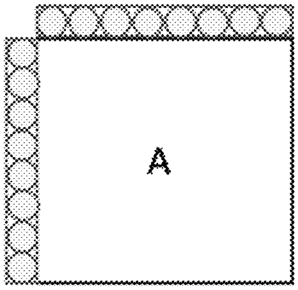
FIG. 11 shows an example of a current block and its reference samples.

A six-tap filter is introduced for the luma down-sampled process for block A in FIG. 11, as shown in Eq. 13.

$$Rec'_L(x,y)=(2\times Rec_L(2x,2y)+2\times Rec_L(2x,2y+1)+Rec_L(2x-1,2y)+Rec_L(2x+1,2y)+Rec_L(2x-1,2y+1)+Rec_L(2x+1,2y+1)+4)>>3. \quad (13)$$

The above surrounding luma reference samples shaded in FIG. 11 are down-sampled with a 3-tap filter, as shown in Eq. 14. The left surrounding luma reference samples are down-sampled according to Eq. 15. If the left or above samples are not available, a 2-tap filter defined in Eq. 16 and Eq. 17 will be used.

$$Rec'_L(x,y)=(2\times Rec_L(2x,2y)+Rec_L(2x-1,2y)+Rec_L(2x+1,2y))>>2 \quad (14)$$

$$Rec'_L(x,y)=(2\times Rec_L(2x,2y)+Rec_L(2x,2y+1)+Rec_L(2x,2y-1))>>2 \quad (15)$$

$$Rec'_L(x,y)(3\times Rec_L(2x,2y)+Rec_L(2x+1,2y)+2)>>2 \quad (16)$$

$$Rec'_L(x,y)(3\times Rec(2x,2y)+Rec_L(2x,2y+1)+2)>2 \quad (17)$$

In particular, the surrounding luma reference samples are down sampled to the equal size to the chroma reference samples. The size is denoted as width and height. To derive α and β, only two or four neighboring samples are involved. A look-up table is applied to avoid the division operation when deriving α and β. The derivation methods is illustrated below.

3.1 Exemplary Methods with Up to Two Samples (1) The ratio r of width and height is calculated as shown in Eq. 18.

$$r=\begin{cases}\frac{\text{width}}{\text{height}} & \text{if width} \geq \text{height}\\ \frac{\text{height}}{\text{width}} & \text{if height} < \text{width}\end{cases} \quad (18)$$

Figure 12:
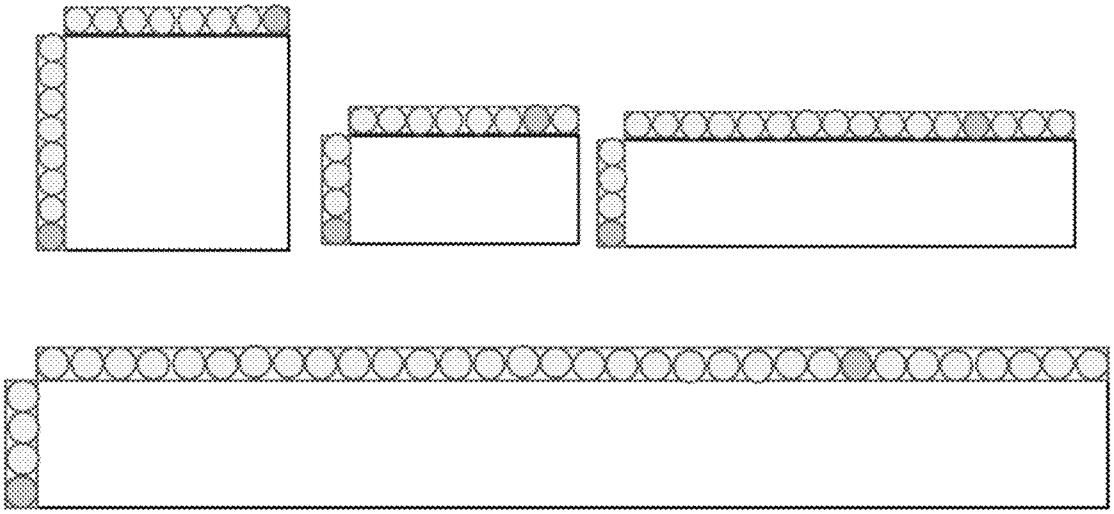
FIG. 12 shows examples of two neighboring samples when both left and above neighboring reference samples are available.

(2) If the above and the left blocks are both available, 2 samples locating at posA of the first above line, and posL of the first left line are selected. To simplify the description, width is assumed as the longer side. The derivation of posA and posL is shown in Eq. 19 (The position index starts from 0). FIG. 12 shows some examples of different width and height ratio (1, 2, 4 and 8, respectively). The selected samples are shaded.

$$posA=\text{width}-r$$

$$posL=\text{height} \quad (19)$$

Figure 13:
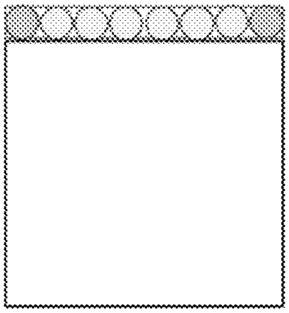
FIG. 13 shows examples of two neighboring samples when only above neighboring reference samples are available.
Figure 14:
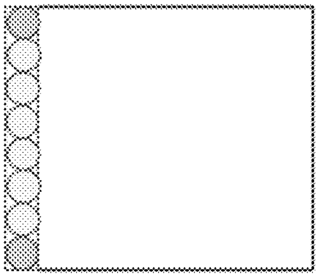
FIG. 14 shows examples of two neighboring samples when only left neighboring reference samples are available.

(3) If the above block is available while the left block is not available, the first and the posA points of the above line are selected, as shown in FIG. 13.
(4) If the left block is available while the above block is not available, the first and the posL points of the left line are selected, as shown in FIG. 14.
(5) A chroma prediction model is derived according to the luminance and chrominance values of selected samples.
(6) If neither of the left and above blocks are available, a default prediction model is used, with α equals 0, β equals to 1<<(BitDepth−1), where BitDepth represents the bit-depth of chroma samples.

Figure 15:
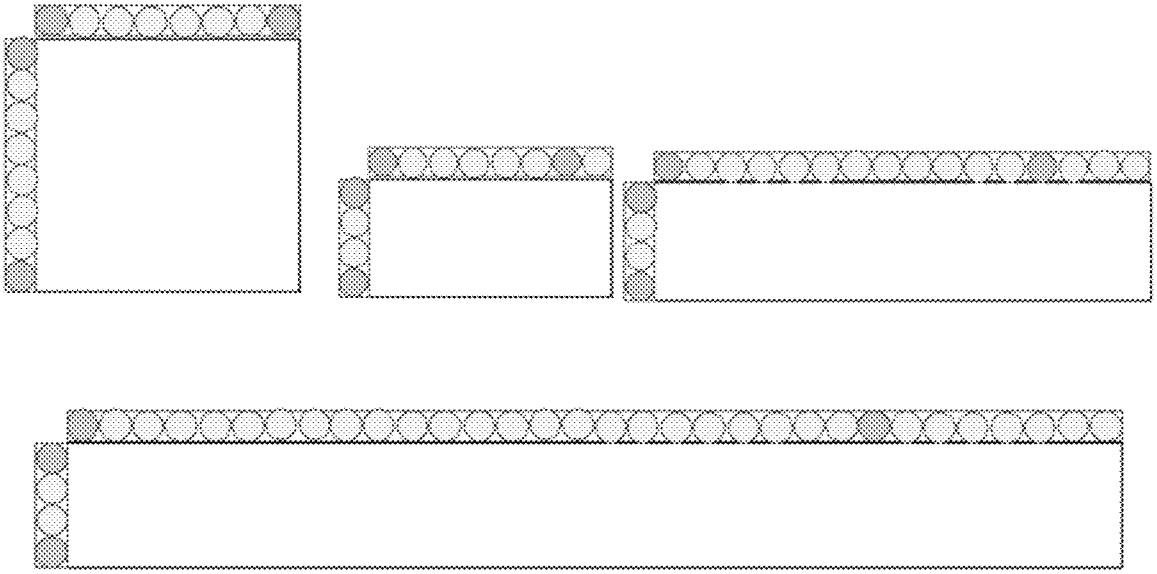
FIG. 15 shows examples of four neighboring samples when both left and above neighboring reference samples are available.

3.2 Exemplary Methods with Up to Four Samples (1) The ratio r of width and height is calculated as Eq. 18.
(2) If the above and the left blocks are both available, 4 samples locating at the first and posA of the first above line, the first and posL of the first left line are selected. The derivation of posA and posL is illustrated in Eq. 19. FIG. 15 shows some examples of different width and height ratio (1, 2, 4 and 8, respectively). The selected samples are shaded.
(3) If the above block is available while the left block is not available, the first and the posA points of the above line are selected, as shown in FIG. 13.
(4) If the left block is available while the above block is not available, the first and the posL points of the left line are selected, as shown in FIG. 14.
(5) If neither of the left and above blocks are available, a default prediction model is used, with α equals 0, β equals to 1<<(BitDepth−1), where BitDepth represents the bit-depth of chroma samples.

3.3 Exemplary Methods that Use Lookup Tables in LM Derivation

FIG. 16 shows an example of lookup tables with 128, 64 and 32 entries and each entry is represented by 16 bits. The 2-point LM derivation process is simplified as shown in Table 1 and FIG. 17 with 64 entries. It should be noted that the first entry may not be stored into the table.

It should also be noted that although each entry in the exemplary tables are designed to be with 16 bits, it can be easily transformed to a number with less bits (such as 8 bits or 12 bits). For example, a table of entries with 8 bits can be attained as:

g_aiLMDivTableHighSimp_64_8[i]=(g_aiLMDivTableHighSimp_64[i]+128)>>8.

For example, a table of entries with 12 bits can be attained as:

g_aiLMDivTableHighSimp_64_12[i]=(g_aiLMDivTableHighSimp_64[i]+8)>>4.

TABLE 1

Simplified LM derivation process

```
int iDeltaLuma = maxLuma − minLuma;
const int TABLE_PRECISION = 16; // It may be 8 or 12.
const int BIT_DEPTH = 10; // Bit depth for samples.
int shift = TABLE_PRECISION;
if( iDeltaLuma > 64) {
    int depthshift = BIT_DEPTH − 6; // 64 is equal to 2ˆ6.
  iDeltaLuma = ( iDeltaLuma + (1<<(depthshift-1)))>> depthshift;
  shift -= depthshift;
}
a = (((maxChroma − minChroma)*g_aiLMDivTableHighSimp_64[iDeltaLuma-1] + (1<<(shift-1)))>>shift;
```

It should be noted that maxLuma and minLuma may indicate the maximum and minimum luma samples values of selected positions. Alternatively, they may indicate a function of maximum and minimum luma samples values of selected positions, such as averaging. When there are only 4 positions selected, they may also indicate the average of two larger luma values and average of two smaller luma values. Further note that in FIG. 17, maxChroma and minChroma represents the chroma values corresponding to maxLuma and minLuma.

3.3 Method #4 with Up to Four Samples

Suppose the block width and height of current chroma block is W and H, respectively. And the top-left coordinate of current chroma block is [0, 0].

If the above and the left blocks are both available and current mode is the normal LM mode (excluding LM-A, and LM-L), 2 chroma samples locating at above row, and 2 chroma samples located left column are selected.

The two above samples' coordinates are [floor(W/4), −1] and [floor (3*W/4), −1].

The two left samples' coordinates are [−1, floor(H/4)] and [−1, floor (3*H/4)].

Figure 31A:
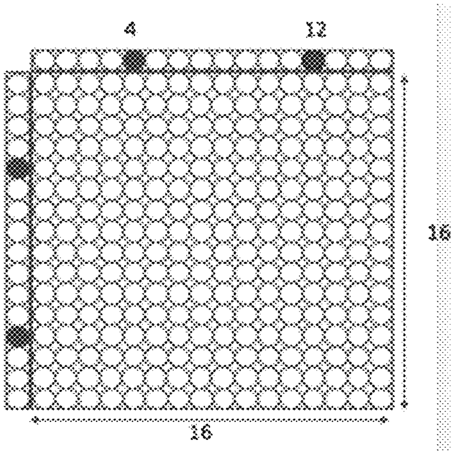
FIGS. 31A and 31B show examples of LM parameter derivation process with four entries.

The selected samples are painted in red as depicted in FIG. 31A.

Subsequently, the 4 samples are sorted according to luma sample intensity and classified into 2 group. The two larger samples and two smaller samples are respectively averaged. Cross component prediction model is derived with the 2 averaged points. Alternatively, the maximum and minimum value of the four samples are used to derive the LM parameters.

If the above block is available while the left block is not available, four chroma samples from above block are selected when W>2 and 2 chroma samples are selected when W=2.

The four selected above samples' coordinates are [W/8, −1], [W/8+W/4, −1], [W/8+2*W/4, −1], and [W/8+3*W/4, −1].

Figure 31B:
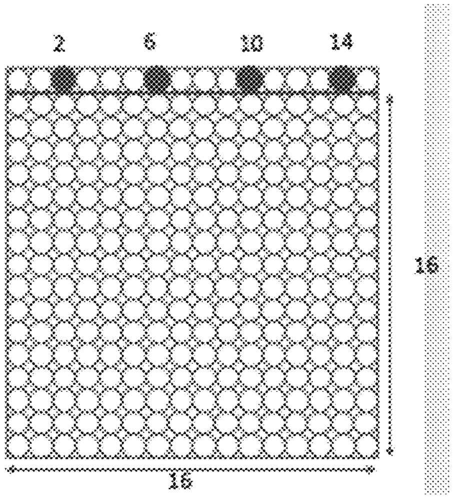

The selected samples are painted in red as depicted in FIG. 31B

If the left block is available while the above block is not available, four chroma samples from left block are selected when H>2 and 2 chroma samples are selected when H=2.

The four selected left samples' coordinates are [−1, H/8], [−1, H/8+H/4], [−1, H/8+2*H/4, −1], and [−1, H/8+3*H/4].

If neither of the left and above blocks are available, a default prediction is used. with $\alpha$ equals 0, $\beta$ equals to 1<<(BitDepth−1), where BitDepth represents the bit-depth of chroma samples.

If the current mode is the LM-A mode, four chroma samples from above block are selected when W'>2 and 2 chroma samples are selected when W'=2. W' is the available number of above neighbouring samples, which can be 2*W.

The four selected above samples' coordinates are [W'/8, −1], [W'/8+W'/4, −1], [W'/8+2*W'/4, −1], and [W'/8+3*W'/4, −1].

If the current mode is the LM-L mode, four chroma samples from left block are selected when H'>2 and 2 chroma samples are selected when H'=2. H' is the available number of left neighbouring samples, which can be 2*H.

The four selected left samples' coordinates are [−1, H'/8], [−1, H'/8+H'/4], [−1, H'/8+2*H'/4, −1], and [−1, H'/8+3*H'/4].

3.5 Example Embodiment for Modifying Current VVC Standard for Use of CCLM Prediction 8.3.4.2.8 Specification of INTRA_LT_CCLM, INTRA_L_CCLM and INTRA_T_CCLM Intra Prediction Mode The equations are described in this section using the equation numbers corresponding to those in the current draft of the VVC standard.

Inputs to this process are:

the intra prediction mode predModeIntra, a sample location (xTbC, yTbC) of the top-left sample of the current transform block relative to the top-left sample of the current picture, a variable nTbW specifying the transform block width, a variable nTbH specifying the transform block height, chroma neighbouring samples p[x][y], with x=−1, y=0 . . . 2*nTbH−1 and x=0 . . . 2*nTbW−1, y=−1.

Output of this process are predicted samples predSamples [x][y], with x=0 . . . nTbW−1, y=0 . . . nTbH−1.

The current luma location (xTbY, yTbY) is derived as follows:

(xTbY,yTbY)=(xTbC<<1,yTbC<<1) (8-155)

The variables availL, availT and availTL are derived as follows:

. . . .

If predModeIntra is equal to INTRA_LT_CCLM, the following applies:

numSampT=availT?nTbW:0 (8-156)

numSampL=availL?nTbH:0 (8-157)

Otherwise, the following applies:

numSampT=(availT&& predModeIntra==INTRA_T_CCLM)?(nTbW+ numTopRight):0 (8-158)

numSampL=(availL&& predModeIntra==INTRA_L_CCLM)?(nTbH+ numLeftBelow):0 (8-159)

The variable bCTUboundary is derived as follows:

bCTUboundary=(yTbC&(1<<(Ctb Log 2SizeY−1)− 1)==0)?TRUE:FALSE. (8-160)

The prediction samples predSamples[x][y] with x=0 . . . nTbW−1, y=0 . . . nTbH−1 are derived as follows:

If both numSampL and numSampT are equal to 0, the following applies:

predSamples[x][y]=1<<($BitDepth_C$−1) (8-161)

Otherwise, the following ordered steps apply:

1 . . . . [no changes to current specification]

2. . . . .

3. . . . .

4. . . . .

5. . . . .

6. . . . [no changes to current specification]

7. The variables minY, maxY, minC and maxC are derived as follows:

The variable minY is set equal to 1<<($BitDepth_Y$)+1 and the variable maxY is set equal to −1.

If availL is equal to TRUE and predModeIntra is equal to INTRA_LT_CCLM, the variable aboveIs4 is set equal to 0; Otherwise, it is set equal to 1.

If availT is equal to TRUE and predModeIntra is equal to INTRA_LT_CCLM, the variable LeftIs4 is set equal to 0; Otherwise, it is set equal to 1.

The variable arrays startPos[ ] and pickStep[ ] are derived as follows:

startPos[0]=actualTopTemplateSampNum>>(2+ aboveIs4);

pickStep[0]=std::max(1,actualTopTemplateSampNum>>(1+aboveIs4));

startPos[1]=actualLeftTemplateSampNum>>(2+leftIs4);

pickStep[1]=std::max(1,actualLeftTemplateSampNum>>(1+leftIs4));

The variable cnt is set equal to 0.

If predModeIntra is equal to INTRA_LT_CCLM, the variable nSX is set equal to nTbW, nSY is set equal to nTbH; Otherwise, nSX is set equal to numSampLT and nSY is set equal to numSampL.

If availT is equal to TRUE and predModeIntra is not equal to INTRA_L_CCLM, the variables selectLumaPix, selectChromaPix are derived as follows:

While startPos[0]+cnt*pickStep[0]<nSX and cnt<4, the following applies:

selectLumaPix[cnt]=pTopDsY[startPos[0]+ cnt*pickStep[0]];

selectChromaPix[cnt]=p[startPos[0]+cnt*pickStep[0]] [−1];

cnt++;

If availL is equal to TRUE and predModeIntra is not equal to INTRA_T_CCLM, the variables selectLumaPix, selectChromaPix are derived as follows:

While startPos[1]+cnt*pickStep[1]<nSY and cnt<4, the following applies:

selectLumaPix[cnt]=pLeftDsY[startPos[1]+ cnt*pickStep[1]];

selectChromaPix[cnt]=p[−1][startPos[1]+ cnt*pickStep[1]];

cnt++;

If cnt is equal to 2, the following applies:

If selectLumaPix[0]>selectLumaPix[1], minY is set equal to selectLumaPix[1], minC is set equal to selectChromaPix[1], maxY is set equal to selectLumaPix[0] and maxC is set equal to selectChromaPix[0]; Otherwise, maxY is set equal to selectLumaPix[1], maxC is set equal to selectChromaPix[1], minY is set equal to selectLumaPix[0] and minC is set equal to selectChromaPix[0]

Otherwise, if cnt is equal to 4, the following applies:

The variable arrays minGrpIdx and maxGrpIdx are initialized as:

minGrpIdx[0]=0, minGrpIdx[1]=1, maxGrpIdx[0]=2, maxGrpIdx[1]=3;

The following applies

If selectLumaPix[minGrpIdx[0]]>selectLumaPix[minGrpIdx[1]], swap minGrpIdx[0] and minGrpIdx[1];

If selectLumaPix[maxGrpIdx[0]]>selectLumaPix[maxGrpIdx[1]], swap maxGrpIdx[0] and maxGrpIdx[1];

If selectLumaPix[minGrpIdx[0]]>selectLumaPix[maxGrpIdx[1]], swap minGrpIdx and maxGrpIdx;

If selectLumaPix[minGrpIdx[1]]>selectLumaPix[maxGrpIdx[0]], swap minGrpIdx[1] and maxGrpIdx[0];

maxY, maxC, minY and minC are derived as follows:

maxY=(selectLumaPix[maxGrpIdx[0]]+selectLumaPix[maxGrpIdx[1]]+1)>>1;

maxC=(selectChromaPix[maxGrpIdx[0]]+selectChromaPix[maxGrpIdx[1]]+1)>1;

maxY=(selectLumaPix[minGrpIdx[0]]+selectLumaPix[minGrpIdx[1]]+1)>>1;

maxC=(selectChromaPix[minGrpIdx[0]]+selectChromaPix[minGrpIdx[1]]+1)>>1;

8. The variables a, b, and k are derived as follows:
[end ofchanges]

3.6 Another Exemplary Working Draft on Proposed CCLM Prediction

In this section, another exemplary embodiment that shows modifications that can be made to the current working draft of the VVC standard is described. The equation numbers here refer to the corresponding equation numbers in the VVC standard.

Specification of INTRA_LT_CCLM, INTRA_L_CCLM and INTRA_T_CCLM intra prediction mode.

[add to the current VVC working draft as below]

The number of available neighbouring chroma samples on the top and top-right numTopSamp and the number of available neighbouring chroma samples on the left and left-below nLeftSamp are derived as follows:

If predModeIntra is equal to INTRA_LT_CCLM, the following applies:

numSampT=availT?nTbW:0 (8-157)

numSampL=availL?nTbH:0 (8-158)

Otherwise, the following applies:

numSampT=(availT&&predModeIntra==INTRA_T_CCLM)?(nTbW+Min(numTopRight,nTbH)):0 (8-159)

numSampL=(availL&&predModeIntra==INTRA_L_CCLM)?(nTbH+Min(numLeftBelow,nTbW)):0 (8-160)

The variable bCTUboundary is derived as follows:

bCTUboundary=(yTbC&(1<<(CtbLog 2SizeY-1)-1)==0)?TRUE:FALSE. (8-161)

The variable cntN and array pickPosN[ ] with N being replaced by L and T, are derived as follows:

The variable numIs4N is set equal to ((availN && predModeIntra==INTRA_LT_CCLM)?0:1).

The variable startPosN is set equal to numSampN>>(2+numIs4N).

The variable pickStepN is set equal to Max(1, numSampN>>(1+numIs4N)).

If availN is equal to TRUE and predModeIntra is equal to INTRA_LT_CCLM or INTRA_N_CCLM, cntN is set equal to (1+numIs4N)<<1, and pickPosN[pos] is set equal to (startPosN+pos*pickStepN), with pos=0 . . . (cntN−1).

Otherwise, cntN is set equal to 0.

The prediction samples predSamples[x][y] with x=0 . . . nTbW−1, y=0 . . . nTbH−1 are derived as follows:

If both numSampL and numSampT are equal to 0, the following applies:

predSamples[x][y]=1<<(BitDepth$_C$−1) (8-162)

Otherwise, the following ordered steps apply:

1. The collocated luma samples pY[x][y] with x=0 . . . nTbW*2−1, y=0 . . . nTbH*2−1 are set equal to the reconstructed luma samples prior to the deblocking filter process at the locations (xTbY+x, yTbY+y).

2. The neighbouring luma samples samples pY[x][y] are derived as follows:

When numSampL is greater than 0, the neighbouring left luma samples pY[x][y] with x=−1 . . . −3, y=0 . . . 2*numSampL−1, are set equal to the reconstructed luma samples prior to the deblocking filter process at the locations (xTbY+x, yTbY+y).

When numSampT is greater than 0, the neighbouring top luma samples pY[x][y] with x=0 . . . 2*numSampT−1, y=−1, −2, are set equal to the reconstructed luma samples prior to the deblocking filter process at the locations (xTbY+x, yTbY+y).

When availTL is equal to TRUE, the neighbouring top-left luma samples pY[x][y] with x=−1, y=−1, −2, are set equal to the reconstructed luma samples prior to the deblocking filter process at the locations (xTbY+x, yTbY+y).

3. The down-sampled collocated luma samples pDsY[x][y] with x=0 . . . nTbW−1, y=0 . . . nTbH−1 are derived as follows:

If sps_cclm_colocated_chroma_flag is equal to 1, the following applies:

pDsY[x][y] with x=1 . . . nTbW−1, y=1 . . . nTbH−1 is derived as follows:

pDsY[x][y]=(pY[2*x][2*y−1]+pY[2*x−1][2*y]+4*pY[2*x][2*y]+pY[2*x+1][2*y]+pY[2*x][2*y+1]+4)>>3 (8-163)

If availL is equal to TRUE, pDsY[0][y] with y=1 . . . nTbH−1 is derived as follows:

pDsY[0][y]=(pY[0][2*y−1]+pY[−1][2*y]+4*pY[0][2*y]+pY[1][2*y]+pY[0][2*y+1]+4)>>3 (8-164)

Otherwise, pDsY[0][y] with y=1 . . . nTbH−1 is derived as follows:

pDsY[0][y]=(pY[0][2*y−1]+2*pY[0][2*y]+pY[0][2*y+1]+2)>>2 (8-165)

If availT is equal to TRUE, pDsY[x][0] with x=1 . . . nTbW−1 is derived as follows:

pDsY[x][0]=(pY[2*x][−1]+pY[2*x−1][0]+4*pY[2*x][0]+pY[2*x+1][0]+pY[2*x][1]+4)>>3 (8-166)

Otherwise, pDsY[x][0] with x=1 . . . nTbW−1 is derived as follows:

pDsY[x][0]=(pY[2*x−1][0]+2*pY[2*x][0]+pY[2*x+1][0]+2)>>2 (8-167)

If availL is equal to TRUE and availT is equal to TRUE, pDsY[0][0] is derived as follows:

pDsY[0][0]=(pY[0][−1]+pY[−1][0]+4*pY[0][0]+pY[1][0]+pY[0][1]+4)>>3 (8-168)

Otherwise if availL is equal to TRUE and availT is equal to FALSE, pDsY[0][0] is derived as follows:

pDsY[0][0]=(pY[−1][0]+2*pY[0][0]+pY[1][0]+2)>>2 (8-169)

Otherwise if availL is equal to FALSE and availT is equal to TRUE, pDsY[0][0] is derived as follows:

pDsY[0][0]=(pY[0][−1]+2*pY[0][0]+pY[0][1]+2)>>2 (8-170)

Otherwise (availL is equal to FALSE and availT is equal to FALSE), pDsY[0][0] is derived as follows:

pDsY[0][0]=pY[0][0] (8-171)

Otherwise, the following applies:

pDsY[x][y] with x=1 . . . nTbW−1, y=0 . . . nTbH−1 is derived as follows:

pDsY[x][y]=(pY[2*x−1][2*y]+pY[2*x−1][2*y+1]+2*pY[2*x][2*y]+2*pY[2*x][2*y+1]+pY[2*x+1][2*y]+pY[2*x+1][2*y+1]+4)>>3 (8-172)

If availL is equal to TRUE, pDsY[0][y] with y=0 . . . nTbH−1 is derived as follows:

$$pDsY[0][y]=(pY[-1][2*y]+pY[-1][2*y+1]+2*pY[0][2*y]+2*pY[0][2*y+1]+pY[1][2*y]+pY[1][2*y+1]+4)>>3 \quad (8\text{-}173)$$

Otherwise, pDsY[0][y] with y=0 . . . nTbH−1 is derived as follows:

$$pDsY[0][y]=(pY[0][2*y]+pY[0][2*y+1]+1)>>1 \quad (8\text{-}174)$$

4. When numSampL is greater than 0, the sleeted neighbouring left chroma samples pSelC[idx] are set equal to p[−1][pickPosL[idx]] with idx=0 . . . (cntL−1), and the selected down-sampled neighbouring left luma samples pSelDsY[idx] with idx=0 . . . (cntL−1) are derived as follows:

The variable y is set equal to pickPosL[idx].

If sps_cclm_colocated_chroma_flag is equal to 1, the following applies:

If y>0|| availTL==TRUE, $$pSelDsY[idx]=(pY[-2][2*y-1]+pY[-3][2*y]+4*pY[-2][2*y]+pY[-1][2*y]+pY[-2][2*y+1]+4)>>3 \quad (8\text{-}175)$$

Otherwise, $$pSelDsY[idx]=(pY[-3][0]+2*pY[-2][0]+pY[-1][0]+2)>>2 \quad (8\text{-}177)$$

Otherwise, the following applies:

$$pSelDsY[idx]=(pY[-1][2*y]+pY[-1][2*y+1]+2*pY[-2][2*y]+2*pY[-2][2*y+1]+pY[-3][2*y]+pY[-3][2*y+1]+4)>>3 (8\text{-}178)$$

5. When numSampT is greater than 0, the selected neighbouring top chroma samples pSelC[idx] are set equal to p[pickPosT[idx]][−1] with idx=0 . . . (cntT−1), and the down-sampled neighbouring top luma samples pSelDsY[idx] with idx=cntL . . . (cntL+cntT−1) are specified as follows:

The variable x is set equal to pickPosT[idx−cntL].

If sps_cclm_colocated_chroma_flag is equal to 1, the following applies:

If x>0:

If bCTUboundary is equal to FALSE, the following applies:

$$pSelDsY[idx]=(pY[2*x][-3]+pY[2*x-1][-2]+4*pY[2*x][-2]+pY[2*x+1][-2]+pY[2*x][-1]+4)>>3 \quad (8\text{-}179)$$

Otherwise (bCTUboundary is equal to TRUE), the following applies:

$$pSelDsY[idx]=(pY[2*x-1][-1]+2*pY[2*x][-1]+pY[2*x+1][-1]+2)>>2 \quad (8\text{-}180)$$

Otherwise:

If availTL is equal to TRUE and bCTUboundary is equal to FALSE, the following applies:

$$pSelDsY[idx]=(pY[0][-3]+pY[-1][-2]+4*pY[0][-2]+pY[1][-2]+pY[0][-1]+4)>>3 \quad (8\text{-}181)$$

Otherwise if availTL is equal to TRUE and bCTUboundary is equal to TRUE, the following applies:

$$pSelDsY[idx]=(pY[-1][-1]+2*pY[0][-1]+pY[1][-1]+2)>>2 \quad (8\text{-}182)$$

Otherwise if availTL is equal to FALSE and bCTUboundary is equal to FALSE, the following applies:

$$pSelDsY[idx]=(pY[0][-3]+2*pY[0][-2]+pY[0][-1]+2)>>2 \quad (8\text{-}183)$$

Otherwise (availTL is equal to FALSE and bCTUboundary is equal to TRUE), the following applies:

$$pSelDsY[idx]=pY[0][-1] \quad (8\text{-}184)$$

Otherwise, the following applies:

If x>0:

If bCTUboundary is equal to FALSE, the following applies:

$$pSelDsY[idx]=(pY[2*x-1][-2]+pY[2*x-1][-1]+2*pY[2*x][-2]+2*pY[2*x][-1]+pY[2*x+1][-2]+pY[2*x+1][-1]+4)>>3 \quad (8\text{-}185)$$

Otherwise (bCTUboundary is equal to TRUE), the following applies:

$$pSelDsY[idx]=(pY[2*x-1][-1]+2*pY[2*x][-1]+pY[2*x+1][-1]+2)>>2 \quad (8\text{-}186)$$

Otherwise:

If availTL is equal to TRUE and bCTUboundary is equal to FALSE, the following applies:

$$pSelDsY[idx]=(pY[-1][-2]+pY[-1][-1]+2*pY[0][-2]+2*pY[0][-1]+pY[1][-2]+pY[1][-1]+4)>>3 \quad (8\text{-}187)$$

Otherwise if availTL is equal to TRUE and bCTUboundary is equal to TRUE, the following applies:

$$pSelDsY[idx]=(pY[-1][-1]+2*pY[0][-1]+pY[1][-1]+2)>>2 \quad (8\text{-}188)$$

Otherwise if availTL is equal to FALSE and bCTUboundary is equal to FALSE, the following applies:

$$pSelDsY[idx]=(pY[0][-2]+pY[0][-1]+1)>>1 \quad (8\text{-}189)$$

Otherwise (availTL is equal to FALSE and bCTUboundary is equal to TRUE), the following applies:

$$pSelDsY[idx]=pY[0][-1] \quad (8\text{-}190)$$

6. The variables minY, maxY, minC and maxC are derived as follows:

When cntT+cntL is equal to 2, set pSelC[idx+2]=pSelC[idx] and pSelDsY[idx+2]=pSelDsY[idx], with idx=0 and 1.

The arrays minGrpIdx[ ] and maxGrpIdx[ ] are set as: minGrpIdx[0]=0, minGrpIdx[1]=1, maxGrpIdx[0]=2, maxGrpIdx[1]=3.

If pSelDsY[minGrpIdx[0]]>pSelDsY[minGrpIdx[1]], Swap(minGrpIdx[0], minGrpIdx[1]).

If pSelDsY[maxGrpIdx[0]]>pSelDsY[maxGrpIdx[1]], Swap(maxGrpIdx[0], maxGrpIdx[1]).

If pSelDsY[minGrpIdx[0]]>pSelDsY[maxGrpIdx[1]], Swap(minGrpIdx, maxGrpIdx).

If pSelDsY[minGrpIdx[1]]>pSelDsY[maxGrpIdx[0]], Swap(minGrpIdx[1], maxGrpIdx[0]).

$$maxY=(pSelDsY[maxGrpIdx[0]]+pSelDsY[maxGrpIdx[1]]+1)>>1.$$

$$maxC=(pSelC[maxGrpIdx[0]]+pSelC[maxGrpIdx[1]]+1)>>1.$$

$$minY=(pSelDsY[minGrpIdx[0]]+pSelDsY[minGrpIdx[1]]+1)>>1.$$

$$minC=(pSelC[minGrpIdx[0]]+pSelC[minGrpIdx[1]]+1)>>1.$$

7. The variables a, b, and k are derived as follows:

If numSampL is equal to 0, and numSampT is equal to 0, the following applies:

$$k=0 \quad (8\text{-}208)$$

$$a=0 \quad (8\text{-}209)$$

$$b=1<<(\mathrm{BitDepth}_C-1) \quad (8\text{-}210)$$

Otherwise, the following applies:

$$\mathrm{diff}=\max Y-\min Y \quad (8\text{-}211)$$

If diff is not equal to 0, the following applies:

$$\mathrm{diff}C=\max C-\min C \quad (8\text{-}212)$$

$$x=\mathrm{Floor}(\mathrm{Log}\ 2(\mathrm{diff})) \quad (8\text{-}213)$$

$$\mathrm{normDiff}=((\mathrm{diff}<<4)>>x)\&15 \quad (8\text{-}214)$$

$$x+=(\mathrm{normDiff}!=0)?1:0 \quad (8\text{-}215)$$

$$y=\mathrm{Floor}(\mathrm{Log}\ 2(\mathrm{Abs}(\mathrm{diff}C)))+1 \quad (8\text{-}216)$$

$$a=(\mathrm{diff}C*(\mathrm{divSigTable}[\mathrm{normDiff}]|8)+2^{y-1})>>y \quad (8\text{-}217)$$

$$k=((3+x-y)<1)?1:3+x-y \quad (8\text{-}218)$$

$$a=((3+x-y)<1)?\mathrm{Sign}(a)*15:a \quad (8\text{-}219)$$

$$b=\min C-((a*\min Y)>>k) \quad (8\text{-}220)$$

where divSigTable[ ] is specified as follows:

$$\mathrm{divSigTable}[\ ]=\{0,7,6,5,5,4,4,3,3,2,2,1,1,1,1,0\} \quad (8\text{-}221)$$

Otherwise (diff is equal to 0), the following applies:

$$k=0 \quad (8\text{-}222)$$

$$\alpha=0 \quad (8\text{-}223)$$

$$b=\min C \quad (8\text{-}224)$$

8. The prediction samples predSamples[x][y] with x=0 . . . nTbW−1, y=0 . . . nTbH−1 are derived as follows:

$$\mathrm{predSamples}[x][y]=\mathrm{Clip1}C(((\mathrm{pDs}Y[x][y]*a)>>k)+b) \quad (8\text{-}225)$$

[End of the embodiment example]

3.7 Another Exemplary Working Draft on Proposed CCLM Prediction

In this section, another exemplary embodiment that shows modifications that can be made to the current working draft of the VVC standard is described. The equation numbers here refer to the corresponding equation numbers in the VVC standard.

Specification of INTRA_LT_CCLM, INTRA_L_CCLM and INTRA_T_CCLM intra prediction mode

. . . .

The number of available neighbouring chroma samples on the top and top-right numTopSamp and the number of available neighbouring chroma samples on the left and left-below nLeftSamp are derived as follows:

If predModeIntra is equal to INTRA_LT_CCLM, the following applies:

$$\mathrm{numSamp}T=\mathrm{avail}T?\mathrm{nTb}W:0 \quad (8\text{-}157)$$

$$\mathrm{numSamp}L=\mathrm{avail}L?\mathrm{nTb}H:0 \quad (8\text{-}158)$$

Otherwise, the following applies:

$$\mathrm{numSamp}T=(\mathrm{avail}T\&\&\mathrm{predModeIntra}==\mathrm{INTRA\_}T\mathrm{\_CCLM})?(\mathrm{nTb}W+\mathrm{Min}(\mathrm{numTopRight},\mathrm{nTb}H)):0 \quad (8\text{-}159)$$

$$\mathrm{numSamp}L=(\mathrm{avail}L\&\&\mathrm{predModeIntra}==\mathrm{INTRA\_}L\mathrm{\_CCLM})?(\mathrm{nTb}H+\mathrm{Min}(\mathrm{numLeftBelow},\mathrm{nTb}W)):0 \quad (8\text{-}160)$$

The variable bCTUboundary is derived as follows:

$$\mathrm{bCTUboundary}=(\mathrm{yTb}C\&(1<<(\mathrm{CtbLog}\ 2\mathrm{Size}Y-1)-1)==0)?\mathrm{TRUE}:\mathrm{FALSE}. \quad (8\text{-}161)$$

The variable cntN and array pickPosN[ ] with N being replaced by L and T, are derived as follows:

The variable numIs4N is set equal to ((availN && predModeIntra==INTRA_LT_CCLM)?0:1).

The variable startPosN is set equal to numSampN>>(2+numIs4N).

The variable pickStepN is set equal to Max(1, numSampN>>(1+numIs4N)).

If availN is equal to TRUE and predModeIntra is equal to INTRA_LT_CCLM or INTRA_N_CCLM, cntN is set equal to Min(numSampN, (1+numIs4N)<<1), and pickPosN[pos] is set equal to (startPosN+pos*pickStepN), with pos=0 . . . (cntN−1).

Otherwise, cntN is set equal to 0.

The prediction samples predSamples[x][y] with x=0 . . . nTbW−1, y=0 . . . nTbH−1 are derived as follows:

If both numSampL and numSampT are equal to 0, the following applies:

$$\mathrm{predSamples}[x][y]=1<<(\mathrm{BitDepth}_C-1) \quad (8\text{-}162)$$

Otherwise, the following ordered steps apply:

1. The collocated luma samples pY[x][y] with x=0 . . . nTbW*2−1, y=0 . . . nTbH*2−1 are set equal to the reconstructed luma samples prior to the deblocking filter process at the locations (xTbY+x, yTbY+y).

2. The neighbouring luma samples samples pY[x][y] are derived as follows:

When numSampL is greater than 0, the neighbouring left luma samples pY[x][y] with x=−1 . . . −3, y=0 . . . 2*numSampL−1, are set equal to the reconstructed luma samples prior to the deblocking filter process at the locations (xTbY+x, yTbY+y).

When numSampT is greater than 0, the neighbouring top luma samples pY[x][y] with x=0 . . . 2*numSampT−1, y=−1, −2, are set equal to the reconstructed luma samples prior to the deblocking filter process at the locations (xTbY+x, yTbY+y).

When availTL is equal to TRUE, the neighbouring top-left luma samples pY[x][y] with x=−1, y=−1, −2, are set equal to the reconstructed luma samples prior to the deblocking filter process at the locations (xTbY+x, yTbY+y).

3. The down-sampled collocated luma samples pDsY[x][y] with x=0 . . . nTbW−1, y=0 . . . nTbH−1 are derived as follows:

If sps_cclm_colocated_chroma_flag is equal to 1, the following applies:

pDsY[x][y] with x=1 . . . nTbW−1, y=1 . . . nTbH−1 is derived as follows:

$$\mathrm{pDs}Y[x][y]=(pY[2*x][2*y-1]+pY[2*x-1][2*y]+4*pY[2*x][2*y]+pY[2*x+1][2*y]+pY[2*x][2*y+1]+4)>>3 \quad (8\text{-}163)$$

If availL is equal to TRUE, pDsY[0][y] with y=1 . . . nTbH−1 is derived as follows:

$$\mathrm{pDs}Y[0][y]=(pY[0][2*y-1]+pY[-1][2*y]+4*pY[0][2*y]+pY[1][2*y]+pY[0][2*y+1]+4)>>3 \quad (8\text{-}164)$$

Otherwise, pDsY[0][y] with y=1 . . . nTbH−1 is derived as follows:

pDsY[0][y]=(pY[0][2*y−1]+2*pY[0][2*y]+pY[0][2*y+1]+2)>>2 (8-165)

If availT is equal to TRUE, pDsY[x][0] with λ=1 . . . nTbW−1 is derived as follows:

pDsY[x][0]=(pY[2*x][−1]+pY[2*x−1][0]+4*pY[2*x][0]+pY[2*x+1][0]+pY[2*x][1]+4)>>3 (8-166)

Otherwise, pDsY[x][0] with x=1 . . . nTbW−1 is derived as follows:

pDsY[x][0]=(pY[2*x−1][0]+2*pY[2*x][0]+pY[2*x+1][0]+2)>>2 (8-167)

If availL is equal to TRUE and availT is equal to TRUE, pDsY[0][0] is derived as follows:

pDsY[0][0]=(pY[0][−1]+pY[−1][0]+4*pY[0][0]+pY[1][0]+pY[0][1]+4)>>3 (8-168)

Otherwise if availL is equal to TRUE and availT is equal to FALSE, pDsY[0][0] is derived as follows:

pDsY[0][0]=(pY[−1][0]+2*pY[0][0]+pY[1][0]+2)>>2 (8-169)

Otherwise if availL is equal to FALSE and availT is equal to TRUE, pDsY[0][0] is derived as follows:

pDsY[0][0]=(pY[0][−1]+2*pY[0][0]+pY[0][1]+2)>>2 (8-170)

Otherwise (availL is equal to FALSE and availT is equal to FALSE), pDsY[0][0] is derived as follows:

pDsY[0][0]=pY[0][0] (8-171)

Otherwise, the following applies:

pDsY[x][y] with x=1 . . . nTbW−1, y=0 . . . nTbH−1 is derived as follows:

pDsY[x][y]=(pY[2*x−1][2*y]+pY[2*x−1][2*y+1]+2*pY[2*x][2*y]+2*pY[2*x][2*y+1]+pY[2*x+1][2*y]+pY[2*x+1][2*y+1]+4)>>3 (8-172)

If availL is equal to TRUE, pDsY[0][y] with y=0 . . . nTbH−1 is derived as follows:

pDsY[0][y]=(pY[−1][2*y]+pY[−1][2*y+1]+2*pY[0][2*y]+2*pY[0][2*y+1]+pY[1][2*y]+pY[1][2*y+1]+4)>>3 (8-173)

Otherwise, pDsY[0][y] with y=0 . . . nTbH−1 is derived as follows:

pDsY[0][y]=(pY[0][2*y]+pY[0][2*y+1]+1)>>1 (8-174)

4. When numSampL is greater than 0, the sleeted neighbouring left chroma samples pSelC[idx] are set equal to p[−1][pickPosL[idx]] with idx=0 . . . (cntL−1), and the selected down-sampled neighbouring left luma samples pSelDsY[idx] with idx=0 . . . (cntL−1) are derived as follows:

The variable y is set equal to pickPosL[idx].

If sps_cclm_colocated_chroma_flag is equal to 1, the following applies:

If y>0|| availTL==TRUE, pSelDsY[idx]=(pY[−2][2*y−1]+pY[−3][2*y]+4*pY[−2][2*y]+pY[−1][2*y]+pY[−2][2*y+1]+4)>>3 (8-175)

Otherwise, pSelDsY[idx]=(pY[−3][0]+2*pY[−2][0]+pY[−1][0]+2)>>2 (8-177)

Otherwise, the following applies:

pSelDsY[idx]=(pY[−1][2*y]+pY[−1][2*y+1]+2*pY[−2][2*y]+2*pY[−2][2*y+1]+pY[−3][2*y]+pY[−3][2*y+1]+4)>>3 (8-178)

5. When numSampT is greater than 0, the selected neighbouring top chroma samples pSelC[idx] are set equal to p[pickPosT[idx]][−1] with idx=0 . . . (cntT−1), and the down-sampled neighbouring top luma samples pSelDsY[idx] with idx=cntL . . . (cntL+cntT−1) are specified as follows:

The variable x is set equal to pickPosT[idx−cntL].

If sps_cclm_colocated_chroma_flag is equal to 1, the following applies:

If x>0:

If bCTUboundary is equal to FALSE, the following applies:

pSelDsY[idx]=(pY[2*x][−3]+pY[2*x−1][−2]+4*pY[2*x][−2]+pY[2*x+1][−2]+pY[2*x][−1]+4)>>3 (8-179)

Otherwise (bCTUboundary is equal to TRUE), the following applies:

pSelDsY[idx]=(pY[2*x−1][−1]+2*pY[2*x][−1]+pY[2*x+1][−1]+2)>>2 (8-180)

Otherwise:

If availTL is equal to TRUE and bCTUboundary is equal to FALSE, the following applies:

pSelDsY[idx]=(pY[0][−3]+pY[−1][−2]+4*pY[0][−2]+pY[1][−2]+pY[0][−1]+4)>>3 (8-181)

Otherwise if availTL is equal to TRUE and bCTUboundary is equal to TRUE, the following applies:

pSelDsY[idx]=(pY[−1][−1]+2*pY[0][−1]+pY[1][−1]+2)>>2 (8-182)

Otherwise if availTL is equal to FALSE and bCTUboundary is equal to FALSE, the following applies:

pSelDsY[idx]=(pY[0][−3]+2*pY[0][−2]+pY[0][−1]+2)>>2 (8-183)

Otherwise (availTL is equal to FALSE and bCTUboundary is equal to TRUE), the following applies:

pSelDsY[idx]=pY[0][−1] (8-184)

Otherwise, the following applies:

If x>0:

If bCTUboundary is equal to FALSE, the following applies:

pSelDsY[idx]=(pY[2*x−1][−2]+pY[2*x−1][−1]+2*pY[2*x][−2]+2*pY[2*x][−1]+pY[2*x+1][−2]+pY[2*x+1][−1]+4)>>3 (8-185)

'Otherwise (bCTUboundary is equal to TRUE), the following applies:

pSelDsY[idx]=(pY[2*x−1][−1]+2*pY[2*x][−1]+pY[2*x+1][−1]+2)>>2 (8-186)

Otherwise:

If availTL is equal to TRUE and bCTUboundary is equal to FALSE, the following applies:

pSelDsY[idx]=(pY[−1][−2]+pY[−1][−1]+2*pY[0][−2]+2*pY[0][−1]+pY[1][−2]+pY[1][−1]+4)>>3 (8-187)

Otherwise if availTL is equal to TRUE and bCTUboundary is equal to TRUE, the following applies:

pSelDsY[idx]=(pY[−1][−1]+2*pY[0][−1]+pY[1][−1]+2)>>2 (8-188)

Otherwise if availTL is equal to FALSE and bCTUboundary is equal to FALSE, the following applies:

$$pSelDsY[idx]=(pY[0][-2]+pY[0][-1]+1)>>1 \quad (8\text{-}189)$$

Otherwise (availTL is equal to FALSE and bCTUboundary is equal to TRUE), the following applies:

$$pSelDsY[idx]=pY[0][-1] \quad (8\text{-}190)$$

6. When cntT+cntL is not equal to 0, the variables minY, maxY, minC and maxC are derived as follows:
   - When cntT+cntL is equal to 2, set pSelComp[3] equal to pSelComp [0], pSelComp[2] equal to pSelComp[1], pSelComp[0] equal to pSelComp [1], and pSelComp[1] equal to pSelComp[3], with Comp being replaced by DsY and C.
   - The arrays minGrpIdx[ ] and maxGrpIdx[ ] are set as: minGrpIdx[0]=0, minGrpIdx[1]=1, maxGrpIdx[0]=2, maxGrpIdx[1]=3.
   - If pSelDsY[minGrpIdx[0]]>pSelDsY[minGrpIdx [1]], Swap(minGrpIdx[0], minGrpIdx[1]).
   - If pSelDsY[maxGrpIdx[0]]>pSelDsY[maxGrpIdx [1]], Swap(maxGrpIdx[0], maxGrpIdx[1]).
   - If pSelDsY[minGrpIdx[0]]>pSelDsY[maxGrpIdx [1]], Swap(minGrpIdx, maxGrpIdx
   - If pSelDsY[minGrpIdx[1]]>pSelDsY[maxGrpIdx [0]], Swap(minGrpIdx[1], maxGrpIdx[0]).

$$maxY=(pSelDsY[maxGrpIdx[0]]+pSelDsY[maxGrpIdx[1]]+1)>>1.$$

$$maxC=(pSelC[maxGrpIdx[0]]+pSelC[maxGrpIdx[1]]+1)>>1.$$

$$minY=(pSelDsY[minGrpIdx[0]]+pSelDsY[minGrpIdx[1]]+1)>>1.$$

$$minC=(pSelC[minGrpIdx[0]]+pSelC[minGrpIdx[1]]+1)>>1.$$

7. The variables a, b, and k are derived as follows:
   - If numSampL is equal to 0, and numSampT is equal to 0, the following applies:

$$k=0 \quad (8\text{-}208)$$

$$a=0 \quad (8\text{-}209)$$

$$b=1<<(BitDepth_C-1) \quad (8\text{-}210)$$

Otherwise, the following applies:

$$diff=maxY-minY \quad (8\text{-}211)$$

If diff is not equal to 0, the following applies:

$$diffC=maxC-minC \quad (8\text{-}212)$$

$$x=Floor(Log\ 2(diff)) \quad (8\text{-}213)$$

$$normDiff=((diff<<4)>>x)\&15 \quad (8\text{-}214)$$

$$x+=(normDiff!=0)?1:0 \quad (8\text{-}215)$$

$$y=Floor(Log\ 2(Abs(diffC)))+1 \quad (8\text{-}216)$$

$$a=(diffC*(divSigTable[normDiff]|8)+2^{y-1})>>y \quad (8\text{-}217)$$

$$k=((3+x-y)<1)?1:3+x-y \quad (8\text{-}218)$$

$$a=((3+x-y)<1)?Sign(a)*15:a \quad (8\text{-}219)$$

$$b=minC-((a*minY)>>k) \quad (8\text{-}220)$$

where divSigTable[ ] is specified as follows:

$$divSigTable[\ ]=\{0,7,6,5,5,4,4,3,3,2,2,1,1,1,1,0\} \quad (8\text{-}221)$$

Otherwise (diff is equal to 0), the following applies:

$$k=0 \quad (8\text{-}222)$$

$$a=0 \quad (8\text{-}223)$$

$$b=minC \quad (8\text{-}224)$$

8. The prediction samples predSamples[x][y] with x=0 . . . nTbW−1, y=0 . . . nTbH−1 are derived as follows:

$$predSamples[x][y]=Clip1C(((pDsY[x][y]*a)>>k)+b) \quad (8\text{-}225)$$

3.8 An Alternative Working Draft on Proposed CCLM Prediction

In this section, an alternative exemplary embodiment that shows another modifications that can be made to the current working draft of the VVC standard is described. The equation numbers here refer to the corresponding equation numbers in the VVC standard.

Specification of INTRA_LT_CCLM, INTRA_L_CCLM and INTRA_T_CCLM intra prediction mode.

. . . .

The number of available neighbouring chroma samples on the top and top-right numTopSamp and the number of available neighbouring chroma samples on the left and left-below nLeftSamp are derived as follows:

If predModeIntra is equal to INTRA_LT_CCLM, the following applies:

$$numSampT=availT?nTbW:0 \quad (8\text{-}157)$$

$$numSampL=availL?nTbH:0 \quad (8\text{-}158)$$

Otherwise, the following applies:

$$numSampT=(availT\&\&predModeIntra==INTRA\_T\_CCLM)?(nTbW+Min(numTopRight,nTbH)):0 \quad (8\text{-}159)$$

$$numSampL=(availL\&\&predModeIntra==INTRA\_L\_CCLM)?(nTbH+Min(numLeftBelow,nTbW)):0 \quad (8\text{-}160)$$

The variable bCTUboundary is derived as follows:

$$bCTUboundary=(yTbC\&(1<<(Ctb\ Log\ 2SizeY-1)-1)==0)?TRUE:FALSE. \quad (8\text{-}161)$$

The variable cntN and array pickPosN[ ] with N being replaced by L and T, are derived as follows:

The variable numIs4N is set equal to ((availT && availL && predModeIntra==INTRA_LT_CCLM)? 0:1).

The variable startPosN is set equal to numSampN>>(2+numIs4N).

The variable pickStepN is set equal to Max(1, numSampN>>(1+numIs4N)).

If availN is equal to TRUE and predModeIntra is equal to INTRA_LT_CCLM or INTRA_N_CCLM, cntN is set equal to Min(numSampN, (1+numIs4N)<<1), and pickPosN[pos] is set equal to (startPosN+pos*pickStepN), with pos=0 . . . (cntN−1).

Otherwise, cntN is set equal to 0.

The prediction samples predSamples[x][y] with x=0 . . . nTbW−1, y=0 . . . nTbH−1 are derived as follows:

If both numSampL and numSampT are equal to 0, the following applies:

$$predSamples[x][y]=1<<(BitDepth_C-1) \quad (8\text{-}162)$$

Otherwise, the following ordered steps apply:

1. The collocated luma samples pY[x][y] with x=0 . . . nTbW*2−1, y=0 . . . nTbH*2−1 are set equal to the reconstructed luma samples prior to the deblocking filter process at the locations (xTbY+x, yTbY+y).
2. The neighbouring luma samples samples pY[x][y] are derived as follows:
   When numSampL is greater than 0, the neighbouring left luma samples pY[x][y] with x=−1 . . . −3, y=0 . . . 2*numSampL−1, are set equal to the reconstructed luma samples prior to the deblocking filter process at the locations (xTbY+x, yTbY+y).
   When numSampT is greater than 0, the neighbouring top luma samples pY[x][y] with x=0 . . . 2*numSampT−1, y=−1, −2, are set equal to the reconstructed luma samples prior to the deblocking filter process at the locations (xTbY+x, yTbY+y).
   When availTL is equal to TRUE, the neighbouring top-left luma samples pY[x][y] with x=−1, y=−1, −2, are set equal to the reconstructed luma samples prior to the deblocking filter process at the locations (xTbY+x, yTbY+y).
3. The down-sampled collocated luma samples pDsY[x][y] with x=0 . . . nTbW−1, y=0 . . . nTbH−1 are derived as follows:
   If sps_cclm_colocated_chroma_flag is equal to 1, the following applies:
   pDsY[x][y] with x=1 . . . nTbW−1, y=1 . . . nTbH−1 is derived as follows:

$$pDsY[x][y]=(pY[2*x][2*y-1]+pY[2*x-1][2*y]+4*pY[2*x][2*y]+pY[2*x+1][2*y]+pY[2*x][2*y+1]+4)>>3 \quad (8\text{-}163)$$

If availL is equal to TRUE, pDsY[0][y] with y=1 . . . nTbH−1 is derived as follows:

$$pDsY[0][y]=(pY[0][2*y-1]+pY[-1][2*y]+4*pY[0][2*y]+pY[1][2*y]+pY[0][2*y+1]+4)>>3 \quad (8\text{-}164)$$

Otherwise, pDsY[0][y] with y=1 . . . nTbH−1 is derived as follows:

$$pDsY[0][y]=(pY[0][2*y-1]+2*pY[0][2*y]+pY[0][2*y+1]+2)>>2 \quad (8\text{-}165)$$

If availT is equal to TRUE, pDsY[x][0] with x=1 . . . nTbW−1 is derived as follows:

$$pDsY[x][0]=(pY[2*x][-1]+pY[2*x-1][0]+4*pY[2*x][0]+pY[2*x+1][0]+pY[2*x][1]+4)>>3 \quad (8\text{-}166)$$

Otherwise, pDsY[x][0] with x=1 . . . nTbW−1 is derived as follows:

$$pDsY[x][0]=(pY[2*x-1][0]+2*pY[2*x][0]+pY[2*x+1][0]+2)>>2 \quad (8\text{-}167)$$

If availL is equal to TRUE and availT is equal to TRUE, pDsY[0][0] is derived as follows:

$$pDsY[0][0]=(pY[0][-1]+pY[-1][0]+4*pY[0][0]+pY[1][0]+pY[0][1]+4)>>3 \quad (8\text{-}168)$$

Otherwise if availL is equal to TRUE and availT is equal to FALSE, pDsY[0][0] is derived as follows:

$$pDsY[0][0]=(pY[-1][0]+2*pY[0][0]+pY[1][0]+2)>>2 \quad (8\text{-}169)$$

Otherwise if availL is equal to FALSE and availT is equal to TRUE, pDsY[0][0] is derived as follows:

$$pDsY[0][0]=(pY[0][-1]+2*pY[0][0]+pY[0][1]+2)>>2 \quad (8\text{-}170)$$

Otherwise (availL is equal to FALSE and availT is equal to FALSE), pDsY[0][0] is derived as follows:

$$pDsY[0][0]=pY[0][0] \quad (8\text{-}171)$$

Otherwise, the following applies:
pDsY[x][y] with x=1 . . . nTbW−1, y=0 . . . nTbH−1 is derived as follows:

$$pDsY[x][y]=(pY[2*x-1][2*y]+pY[2*x-1][2*y+1]+2*pY[2*x][2*y]+2*pY[2*x][2*y+1]+pY[2*x+1][2*y]+pY[2*x+1][2*y+1]+4)>>3 \quad (8\text{-}172)$$

If availL is equal to TRUE, pDsY[0][y] with y=0 . . . nTbH−1 is derived as follows:

$$pDsY[0][y]=(pY[-1][2*y]+pY[-1][2*y+1]+2*pY[0][2*y]+2*pY[0][2*y+1]+pY[1][2*y]+pY[1][2*y+1]+4)>>3 \quad (8\text{-}173)$$

Otherwise, pDsY[0][y] with y=0 . . . nTbH−1 is derived as follows:

$$pDsY[0][y]=(pY[0][2*y]+pY[0][2*y+1]+1)>>1 \quad (8\text{-}174)$$

4. When numSampL is greater than 0, the selected neighbouring left chroma samples pSelC[idx] are set equal to p[−1][pickPosL[idx]] with idx=0 . . . (cntL−1), and the selected down-sampled neighbouring left luma samples pSelDsY[idx] with idx=0 . . . (cntL−1) are derived as follows:
   The variable y is set equal to pickPosL[idx].
   If sps_cclm_colocated_chroma_flag is equal to 1, the following applies:
   If y>0||availTL==TRUE, $$pSelDsY[idx]=(pY[-2][2*y-1]+pY[-3][2*y]+4*pY[-2][2*y]+pY[-1][2*y]+pY[-2][2*y+1]+4)>>3 \quad (8\text{-}175)$$

Otherwise, $$pSelDsY[idx]=(pY[-3][0]+2*pY[-2][0]+pY[-1][0]+2)>>2 \quad (8\text{-}177)$$

Otherwise, the following applies:

$$pSelDsY[idx]=(pY[-1][2*y]+pY[-1][2*y+1]+2*pY[-2][2*y]+2*pY[-2][2*y+1]+pY[-3][2*y]+pY[-3][2*y+1]+4)>>3 \quad (8\text{-}178)$$

5. When numSampT is greater than 0, the selected neighbouring top chroma samples pSelC[idx] are set equal to p[pickPosT[idx−cntL]][−1] with idx=cntL . . . (cntL+cntT−1), and the down-sampled neighbouring top luma samples pSelDsY[idx] with idx=cntL . . . (cntL+cntT−1) are specified as follows:
   The variable x is set equal to pickPosT[idx−cntL].
   If sps_cclm_colocated_chroma_flag is equal to 1, the following applies:
   If x>0:
   If bCTUboundary is equal to FALSE, the following applies:

$$pSelDsY[idx]=(pY[2*x][-3]+pY[2*x-1][-2]+4*pY[2*x][-2]+pY[2*x+1][-2]+pY[2*x][-1]+4)>>3 \quad (8\text{-}179)$$

Otherwise (bCTUboundary is equal to TRUE), the following applies:

$$pSelDsY[idx]=(pY[2*x-1][-1]+2*pY[2*x][-1]+pY[2*x+1][-1]+2)>>2 \quad (8\text{-}180)$$

Otherwise:
If availTL is equal to TRUE and bCTUboundary is equal to FALSE, the following applies:

$$pSelDsY[idx]=(pY[0][-3]+pY[-1][-2]+4*pY[0][-2]+pY[1][-2]+pY[0][-1]+4)>>3 \quad (8\text{-}181)$$

Otherwise if availTL is equal to TRUE and bCTUboundary is equal to TRUE, the following applies:

$$\text{pSelDs}Y[idx]=(pY[-1][-1]+2*pY[0][-1]+pY[1][-1]+2)>>2 \quad (8\text{-}182)$$

Otherwise if availTL is equal to FALSE and bCTUboundary is equal to FALSE, the following applies:

$$\text{pSelDs}Y[idx]=(pY[0][-3]+2*pY[0][-2]+pY[0][-1]+2)>>2 \quad (8\text{-}183)$$

Otherwise (availTL is equal to FALSE and bCTUboundary is equal to TRUE), the following applies:

$$\text{pSelDs}Y[idx]=pY[0][-1] \quad (8\text{-}184)$$

Otherwise, the following applies:

If x>0:

If bCTUboundary is equal to FALSE, the following applies:

$$\text{pSelDs}Y[idx]=(pY[2*x-1][-2]+pY[2*x-1][-1]+2*pY[2*x][-2]+2*pY[2*x][-1]+pY[2*x+1][-2]+pY[2*x+1][-1]+4)>>3 \quad (8\text{-}185)$$

Otherwise (bCTUboundary is equal to TRUE), the following applies:

$$\text{pSelDs}Y[idx]=(pY[2*x-1][-1]+2*pY[2*x][-1]+pY[2*x+1][-1]+2)>>2 \quad (8\text{-}186)$$

Otherwise:

If availTL is equal to TRUE and bCTUboundary is equal to FALSE, the following applies:

$$\text{pSelDs}Y[idx]=(pY[-1][-2]+pY[-1][-1]+2*pY[0][-2]+2*pY[0][-1]+pY[1][-2]+pY[1][-1]+4)>>3 \quad (8\text{-}187)$$

Otherwise if availTL is equal to TRUE and bCTUboundary is equal to TRUE, the following applies:

$$\text{pSelDs}Y[idx]=(pY[-1][-1]+2*pY[0][-1]+pY[1][-1]+2)>>2 \quad (8\text{-}188)$$

Otherwise if availTL is equal to FALSE and bCTUboundary is equal to FALSE, the following applies:

$$\text{pSelDs}Y[idx]=(pY[0][-2]+pY[0][-1]+1)>>1 \quad (8\text{-}189)$$

Otherwise (availTL is equal to FALSE and bCTUboundary is equal to TRUE), the following applies:

$$\text{pSelDs}Y[idx]=pY[0][-1] \quad (8\text{-}190)$$

6. When cntT+cntL is not equal to 0, the variables minY, maxY, minC and maxC are derived as follows:

When cntT+cntL is equal to 2, set pSelComp[3] equal to pSelComp [0], pSelComp[2] equal to pSelComp[1], pSelComp[0] equal to pSelComp [1], and pSelComp[1] equal to pSelComp[3], with Comp being replaced by DsY and C.

The arrays minGrpIdx[ ] and maxGrpIdx[ ] are set as: minGrpIdx[0]=0, minGrpIdx[1]=2, maxGrpIdx[0]=1, maxGrpIdx[1]=3.

If pSelDsY[minGrpIdx[0]]>pSelDsY[minGrpIdx [1]], Swap(minGrpIdx[0], minGrpIdx[1]).

If pSelDsY[maxGrpIdx[0]]>pSelDsY[maxGrpIdx [1]], Swap(maxGrpIdx[0], maxGrpIdx[1]).

If pSelDsY[minGrpIdx[0]]>pSelDsY[maxGrpIdx [1]], Swap(minGrpIdx, maxGrpIdx

If pSelDsY[minGrpIdx[1]]>pSelDsY[maxGrpIdx [0]], Swap(minGrpIdx[1], maxGrpIdx[0]).

$$\text{max}Y=(\text{pSelDs}Y[\text{maxGrpIdx}[0]]+\text{pSelDs}Y[\text{maxGrpIdx}[1]]+1)>>1.$$

$$\text{max}C=(\text{pSel}C[\text{maxGrpIdx}[0]]+\text{pSel}C[\text{maxGrpIdx}[1]]+1)>>1.$$

$$\text{min}Y=(\text{pSelDs}Y[\text{minGrpIdx}[0]]+\text{pSelDs}Y[\text{minGrpIdx}[1]]+1)>>1.$$

$$\text{min}C=(\text{pSel}C[\text{minGrpIdx}[0]]+\text{pSel}C[\text{minGrpIdx}[1]]+1)>>1.$$

7. The variables a, b, and k are derived as follows:

If numSampL is equal to 0, and numSampT is equal to 0, the following applies:

$$k=0 \quad (8\text{-}208)$$

$$a=0 \quad (8\text{-}209)$$

$$b=1<<(\text{BitDepth}_C-1) \quad (8\text{-}210)$$

Otherwise, the following applies:

$$\text{diff}=\text{max}Y-\text{min}Y \quad (8\text{-}211)$$

If diff is not equal to 0, the following applies:

$$\text{diff}C=\text{max}C-\text{min}C \quad (8\text{-}212)$$

$$x=\text{Floor}(\text{Log }2(\text{diff})) \quad (8\text{-}213)$$

$$\text{normDiff}=((\text{diff}<<4)>>x)\&15 \quad (8\text{-}214)$$

$$x+=(\text{normDiff}!=0)?1:0 \quad (8\text{-}215)$$

$$y=\text{Floor}(\text{Log }2(\text{Abs}(\text{diff}C)))+1 \quad (8\text{-}216)$$

$$a=(\text{diff}C*(\text{divSigTable}[\text{normDiff}]|8)+2^{y-1})>>y \quad (8\text{-}217)$$

$$k=((3+x-y)<1)?1:3+x-y \quad (8\text{-}218)$$

$$a=((3+x-y)<1)?\text{Sign}(a)*15:a \quad (8\text{-}219)$$

$$b=\text{minC}-((a*\text{minY})>>k) \quad (8\text{-}220)$$

where divSigTable[ ] is specified as follows:

$$\text{divSigTable}[\ ]=\{0,7,6,5,5,4,4,3,3,2,2,1,1,1,1,0\} \quad (8\text{-}221)$$

Otherwise (diff is equal to 0), the following applies:

$$k=0 \quad (8\text{-}222)$$

$$a=0 \quad (8\text{-}223)$$

$$b=\text{minC} \quad (8\text{-}224)$$

8. The prediction samples predSamples[x][y] with x=0 . . . nTbW−1, y=0 . . . nTbH−1 are derived as follows:

$$\text{predSamples}[x][y]=\text{Clip1}C(((\text{pDsY}[x][y]*a)>>k)+b) \quad (8\text{-}225)$$

The examples described above may be incorporated in the context of the methods described below, e.g., methods 1800, 1900 and 2000, which may be implemented at a video encoder and/or decoder.

Figure 18:
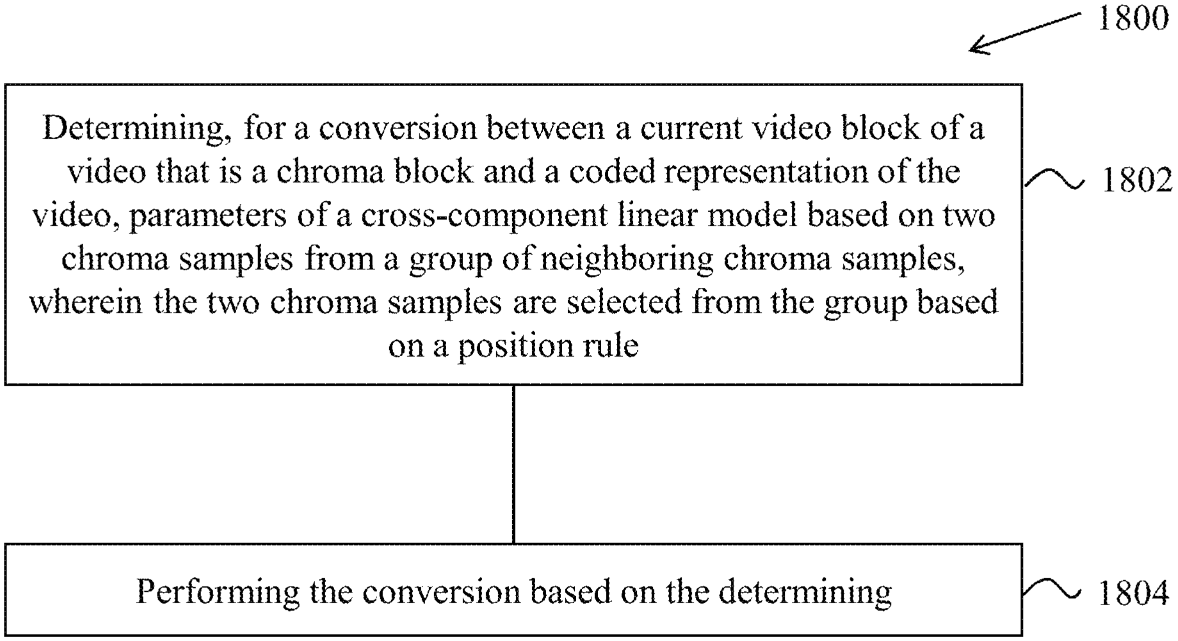
FIG. 18 shows a flowchart of an example method for video processing based on some implementations of the disclosed technology.

FIG. 18 shows a flowchart of an exemplary method for video processing. The method 1800 includes, at step 1802, determining, for a conversion between a current video block of a video that is a chroma block and a coded representation of the video, parameters of a cross-component linear model based on two chroma samples from a group of neighboring chroma samples, wherein the two chroma samples are selected from the group based on a position rule. The method 1800 further includes, at step 1804, performing the conversion based on the determining.

Figure 19A:
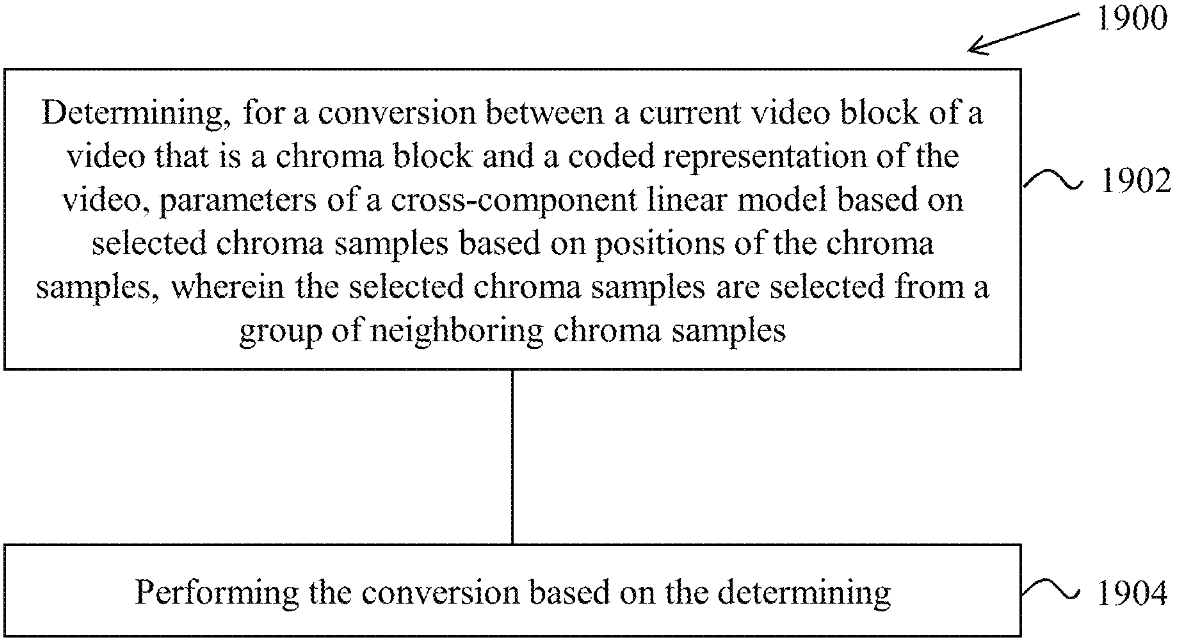
FIGS. 19A and 19B show flowcharts of example methods for video processing based on some implementations of the disclosed technology.

FIG. 19A shows a flowchart of an exemplary method for video processing. The method 1900 includes, at step 1902, determining, for a conversion between a current video block of a video that is a chroma block and a coded representation of the video, parameters of a cross-component linear model based on selected chroma samples based on positions of the chroma samples, wherein the selected chroma samples are selected from a group of neighboring chroma samples. The method 1900 further includes, at step 1804, performing the conversion based on the determining.

Figure 19B:
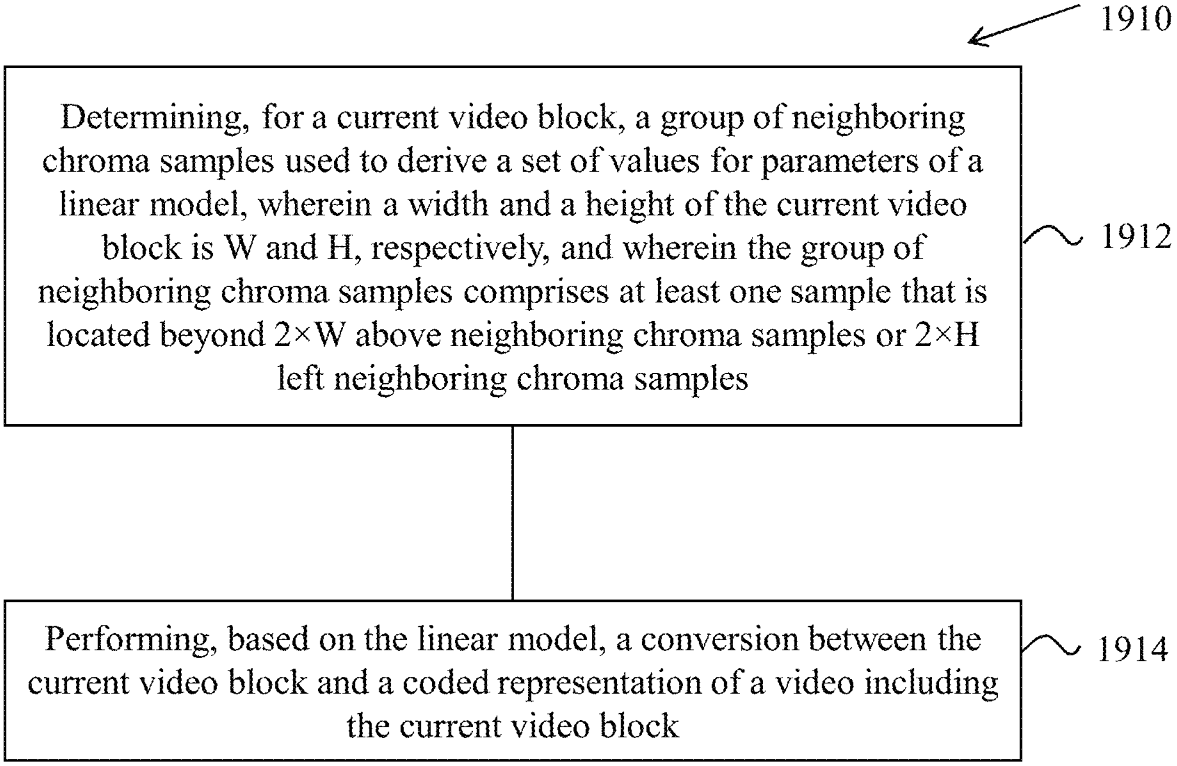

FIG. 19B shows a flowchart of an exemplary method for video processing. The method 1910 includes, at step 1912, determining, for a current video block, a group of neighboring chroma samples used to derive a set of values for parameters of a linear model, wherein a width and a height of the current video block is W and H, respectively, and wherein the group of neighboring chroma samples comprises at least one sample that is located beyond 2×W above neighboring chroma samples or 2×H left neighboring chroma samples. The method 1910 further includes, at step 1914, performing, based on the linear model, a conversion between the current video block and a coded representation of a video including the current video block.

Figure 20A:
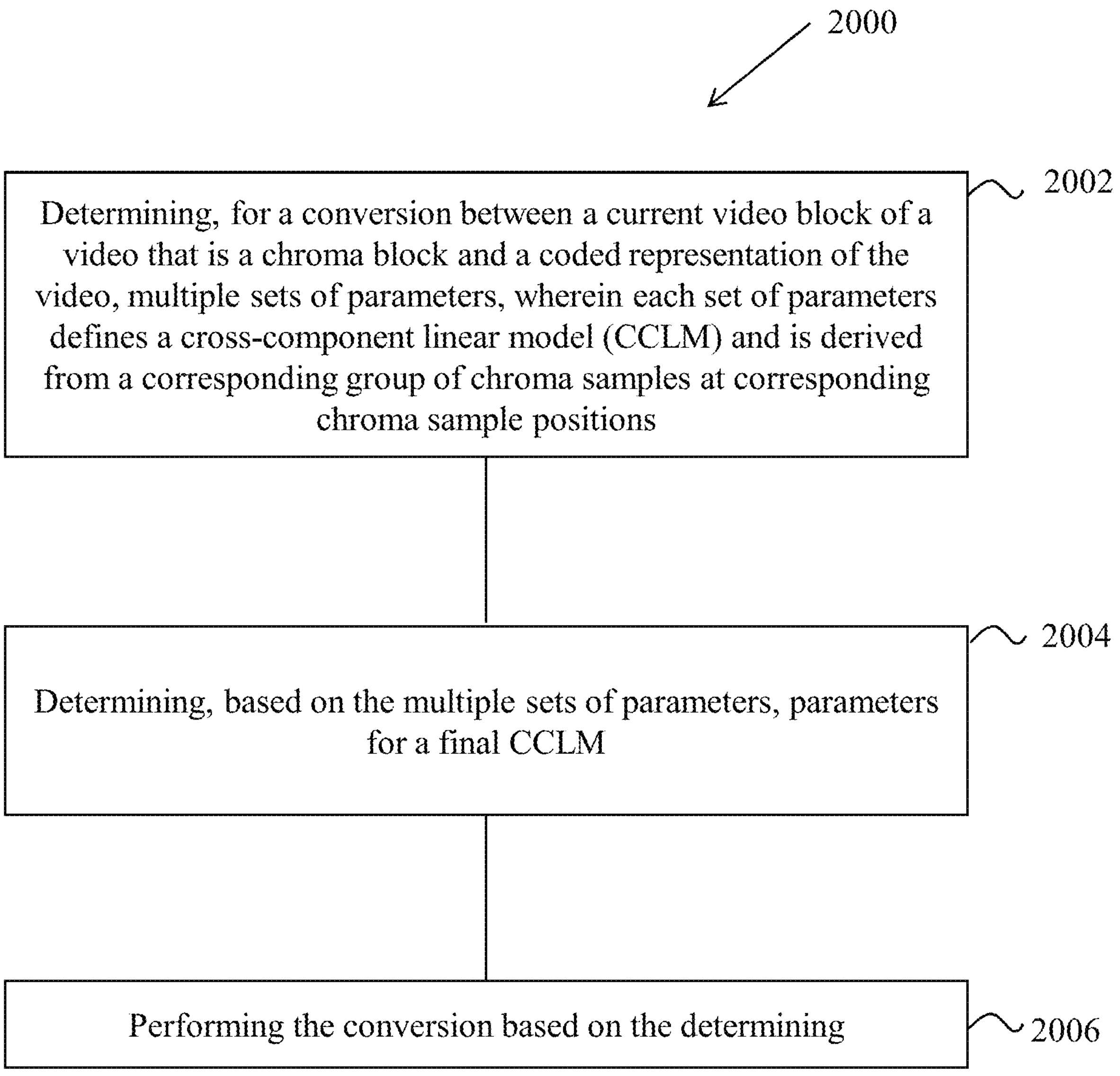
FIGS. 20A and 20B show flowcharts of another example methods for video processing based on some implementations of the disclosed technology.

FIG. 20A shows a flowchart of an exemplary method for video processing. The method 2000 includes, at step 2002, determining, for a conversion between a current video block of a video that is a chroma block and a coded representation of the video, multiple sets of parameters, wherein each set of parameters defines a cross-component linear model (CCLM) and is derived from a corresponding group of chroma samples at corresponding chroma sample positions. The method 2000 further includes, at step 2004, determining, based on the multiple sets of parameters, parameters for a final CCLM. The method 2000 further includes, at step 2006, performing the conversion based on the final CCLM.

Figure 20B:
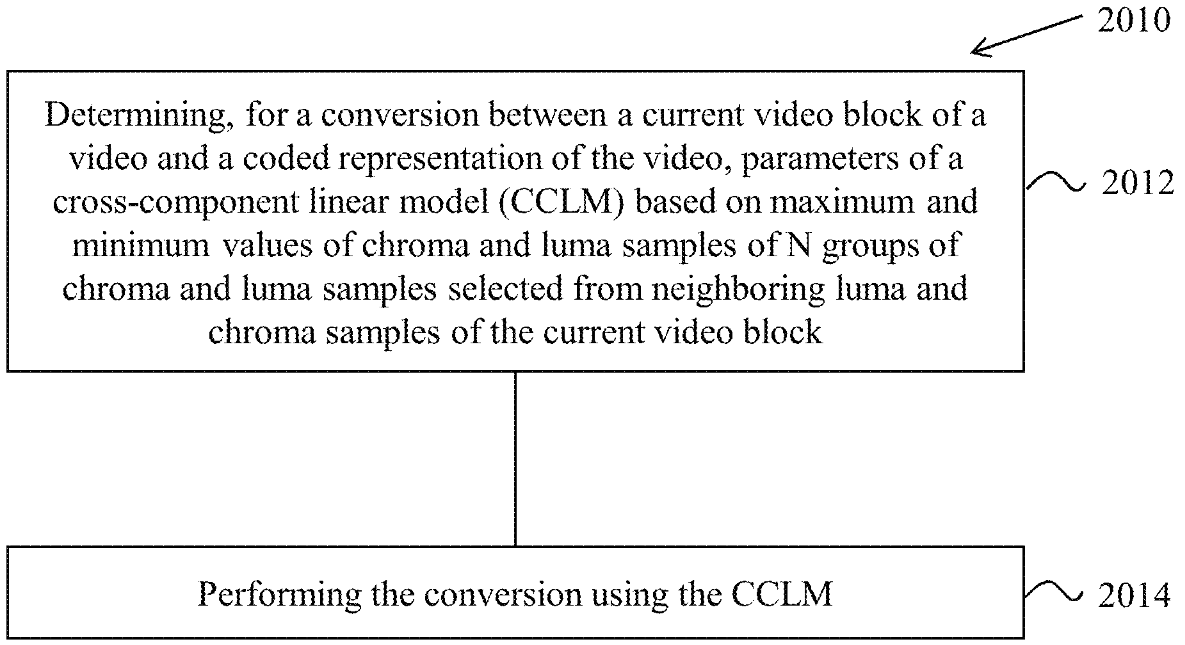

FIG. 20B shows a flowchart of an exemplary method for video processing. The method 2010 includes, at step 2012, determining, for a conversion between a current video block of a video and a coded representation of the video, parameters of a cross-component linear model (CCLM) based on maximum and minimum values of chroma and luma samples of N groups of chroma and luma samples selected from neighboring luma and chroma samples of the current video block. The method 2010 further includes, at step 2014, performing the conversion using the CCLM.

Figure 21:
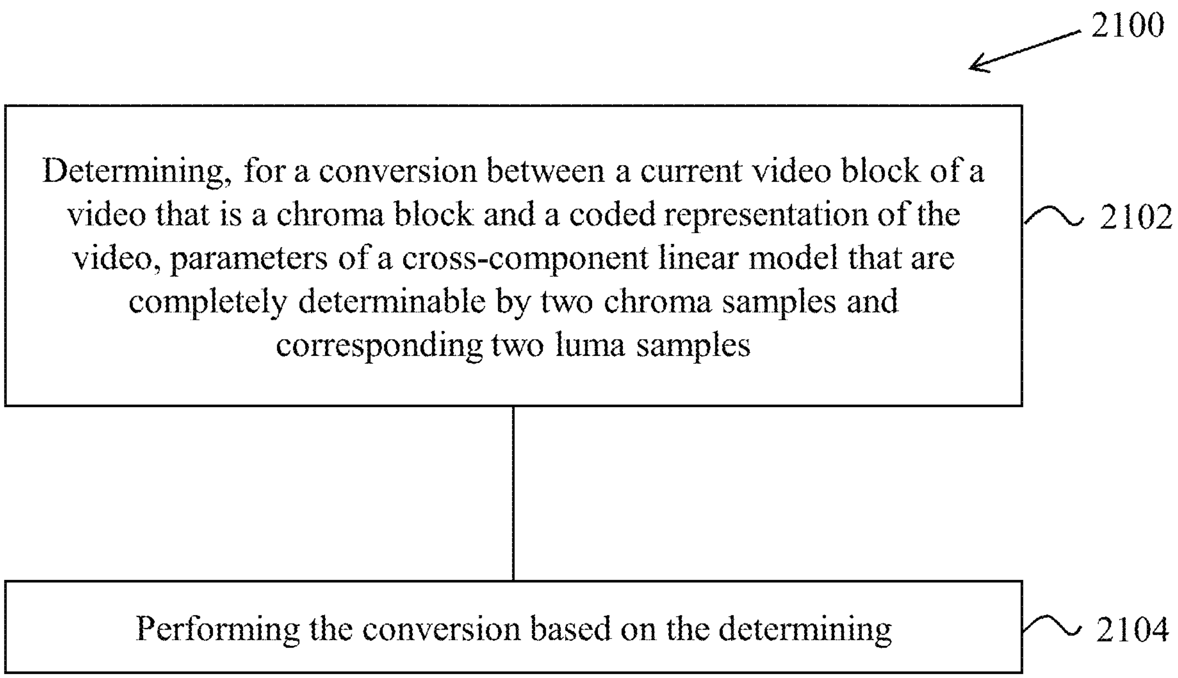
FIG. 21 shows a flowchart of another example method for video processing based on some implementations of the disclosed technology.

FIG. 21 shows a flowchart of an exemplary method for video processing. The method 2100 includes, at step 2102, determining, for a conversion between a current video block of a video that is a chroma block and a coded representation of the video, parameters of a cross-component linear model that are completely determinable by two chroma samples and corresponding two luma samples. The method 2100 further includes, at step 2104, performing the conversion based on the determining.

Figure 22:
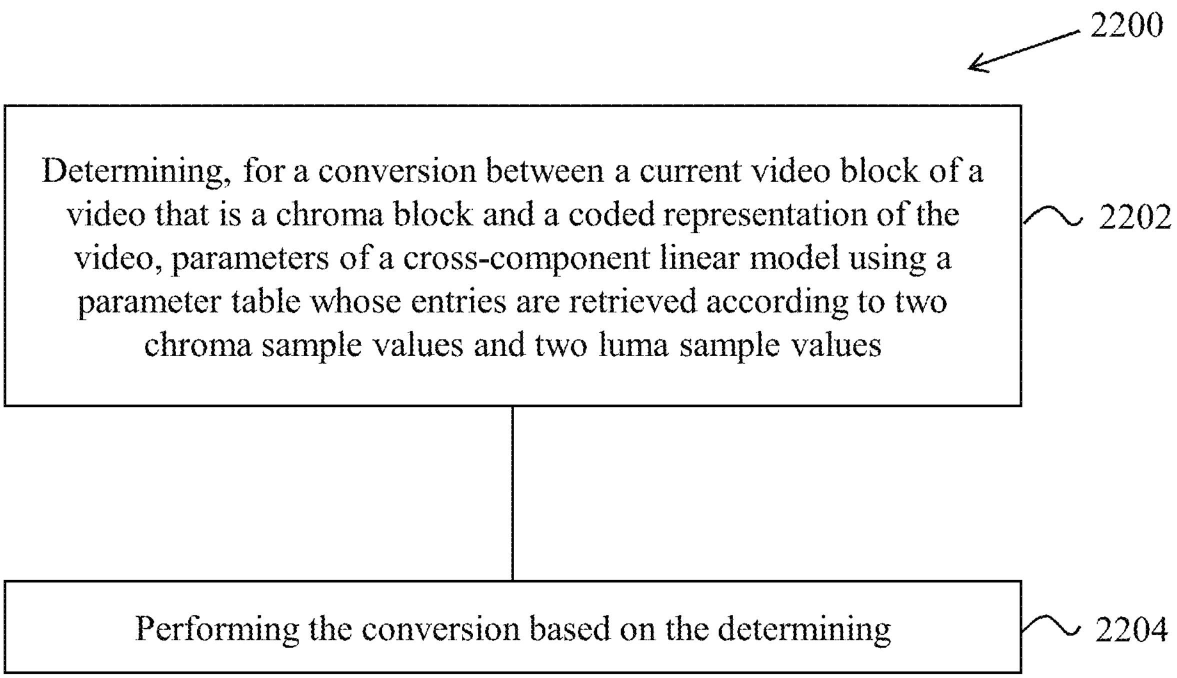
FIG. 22 shows a flowchart of an example method for video processing based on some implementations of the disclosed technology.

FIG. 22 shows a flowchart of an exemplary method for video processing. The method 2200 includes, at step 2202, determining, for a conversion between a current video block of a video that is a chroma block and a coded representation of the video, parameters of a cross-component linear model using a parameter table whose entries are retrieved according to two chroma sample values and two luma sample values. The method 220 further includes, at step 2204, performing the conversion based on the determining.

Figure 23A:
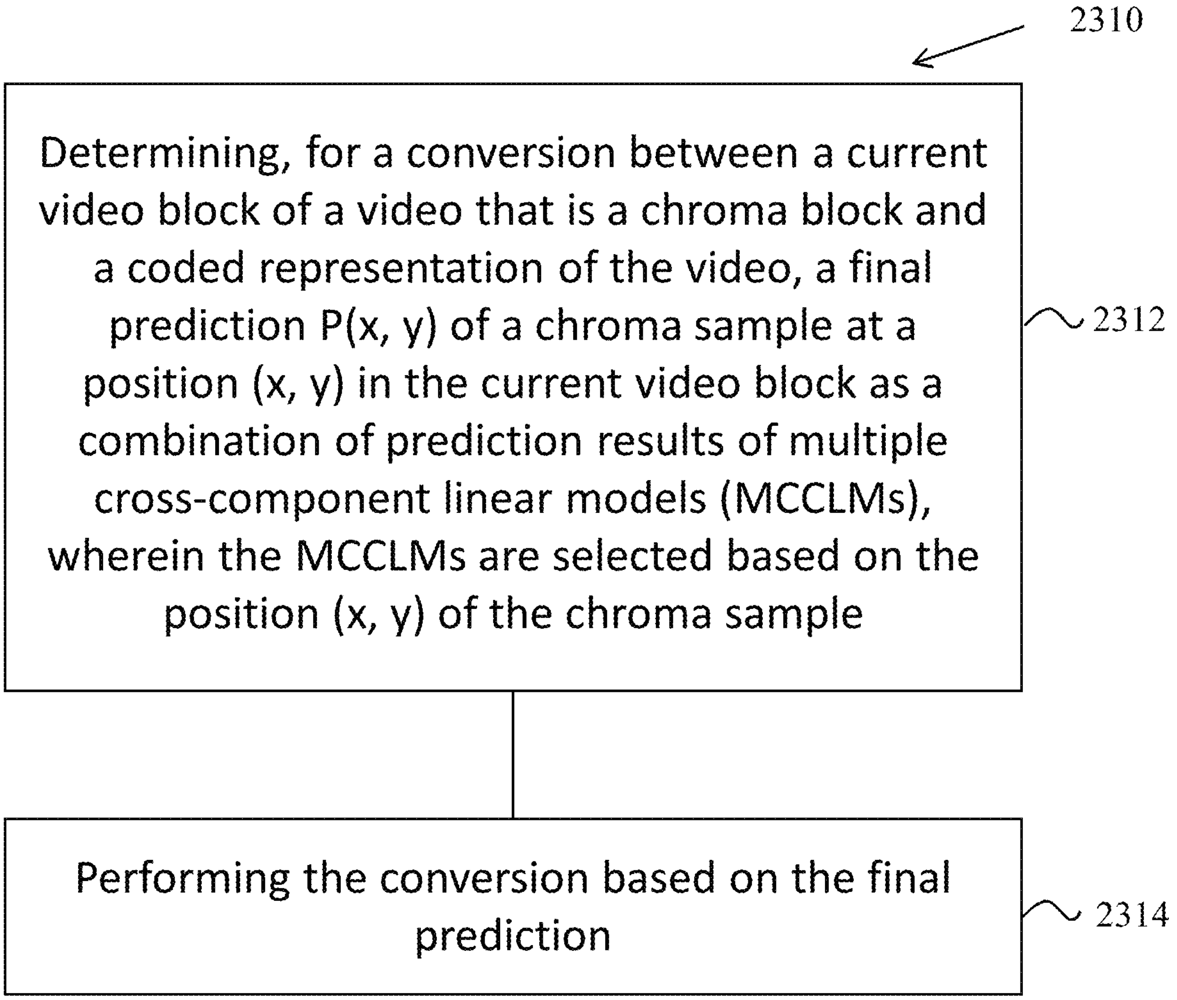
FIGS. 23A and 23B show flowcharts of example methods for video processing based on some implementations of the disclosed technology.

FIG. 23A shows a flowchart of an exemplary method for video processing. The method 2310 includes, at step 2312, determining, for a conversion between a current video block of a video that is a chroma block and a coded representation of the video, a final prediction P(x, y) of a chroma sample at a position (x, y) in the current video block as a combination of prediction results of multiple cross-component linear models (MCCLMs), wherein the MCCLMs are selected based on the position (x, y) of the chroma sample. The method 2310 further includes, at step 2314, performing the conversion based on the final prediction.

Figure 23B:
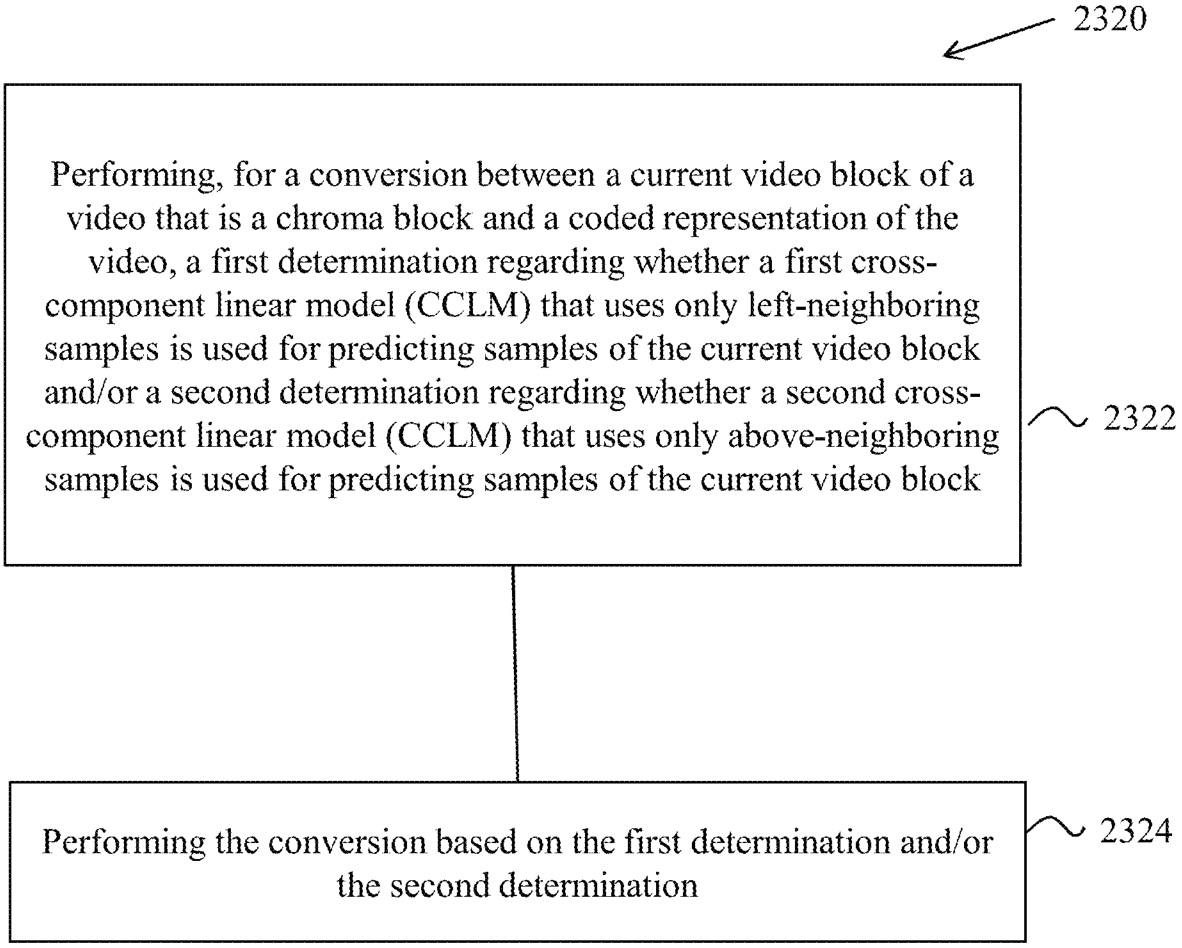

FIG. 23B shows a flowchart of an exemplary method for video processing. The method 2320 includes, at step 2322, performing, for a conversion between a current video block of a video that is a chroma block and a coded representation of the video, a first determination regarding whether a first cross-component linear model (CCLM) that uses only left-neighboring samples is used for predicting samples of the current video block and/or a second determination regarding whether a second cross-component linear model (CCLM) that uses only above-neighboring samples is used for predicting samples of the current video block. The method 2320 further includes, at step 2324, performing the conversion based on the first determination and/or the second determination.

Figure 24A:
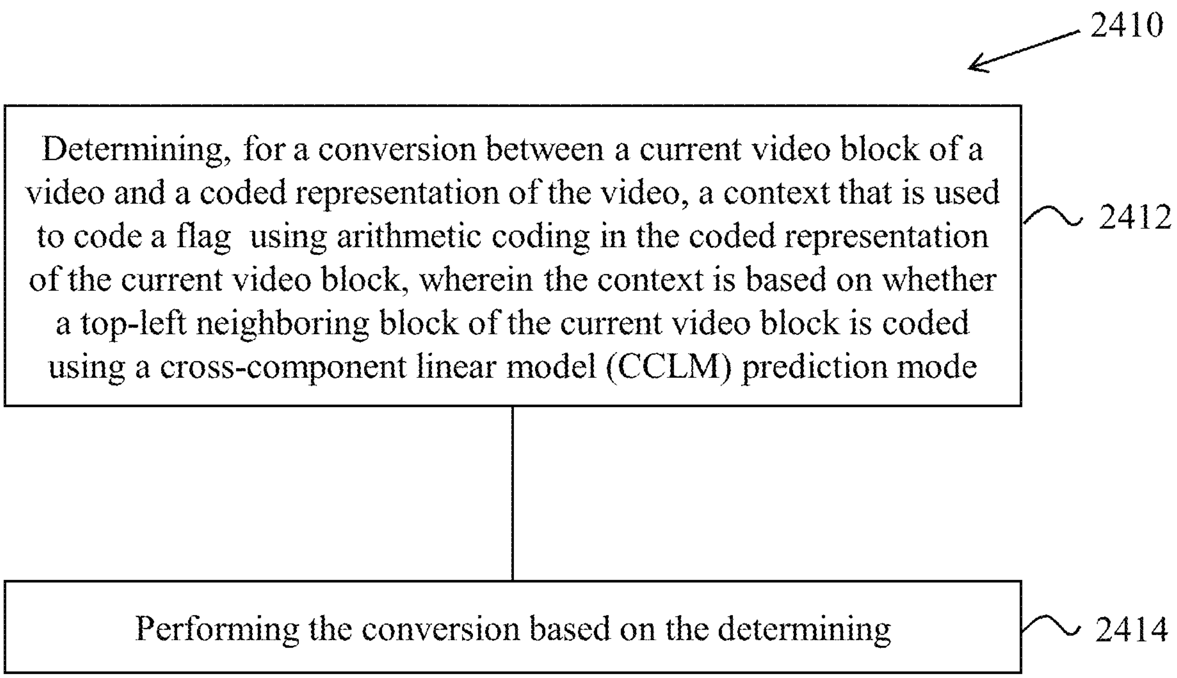
FIGS. 24A-24E show flowcharts of example methods for video processing based on some implementations of the disclosed technology.

FIG. 24A shows a flowchart of an exemplary method for video processing. The method 2410 includes, at step 2412, determining, for a conversion between a current video block of a video and a coded representation of the video, a context that is used to code a flag using arithmetic coding in the coded representation of the current video block, wherein the context is based on whether a top-left neighboring block of the current video block is coded using a cross-component linear model (CCLM) prediction mode. The method 2410 includes, at step 2414, performing the conversion based on the determining.

Figure 24B:
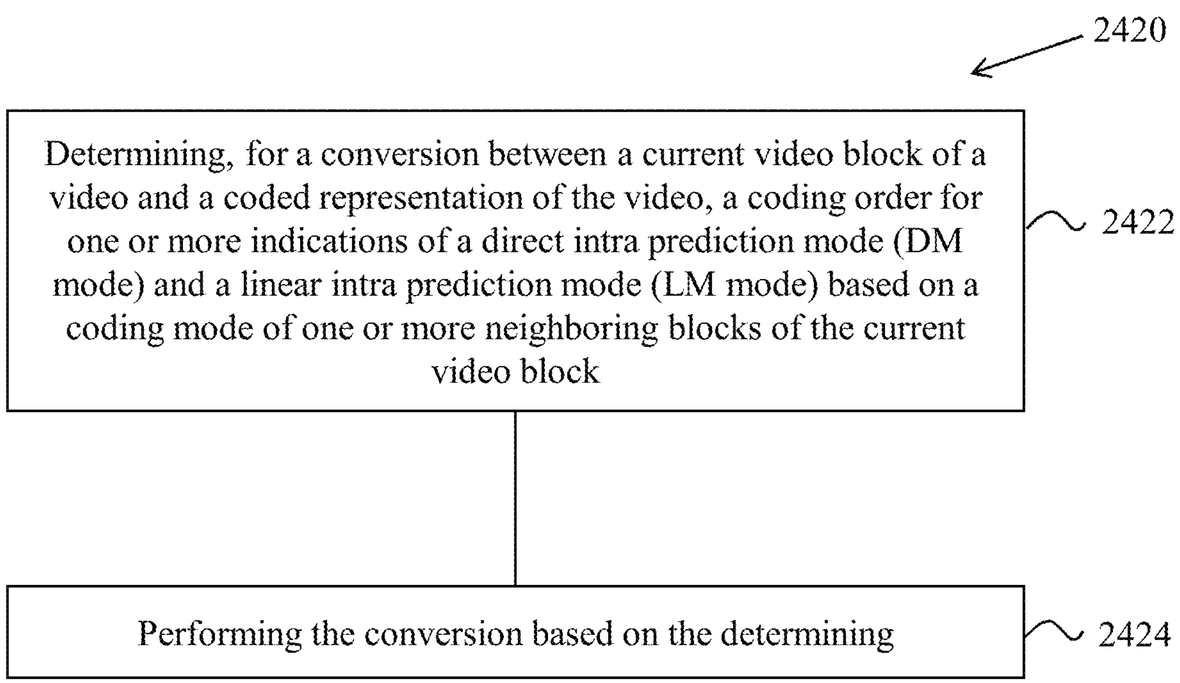

FIG. 24B shows a flowchart of an exemplary method for video processing. The method 2420 includes, at step 2422, determining, for a conversion between a current video block of a video and a coded representation of the video, a coding order for one or more indications of a direct intra prediction mode (DM mode) and a linear intra prediction mode (LM mode) based on a coding mode of one or more neighboring blocks of the current video block. The method 2420 includes, at step 2424, performing the conversion based on the determining.

Figure 24C:
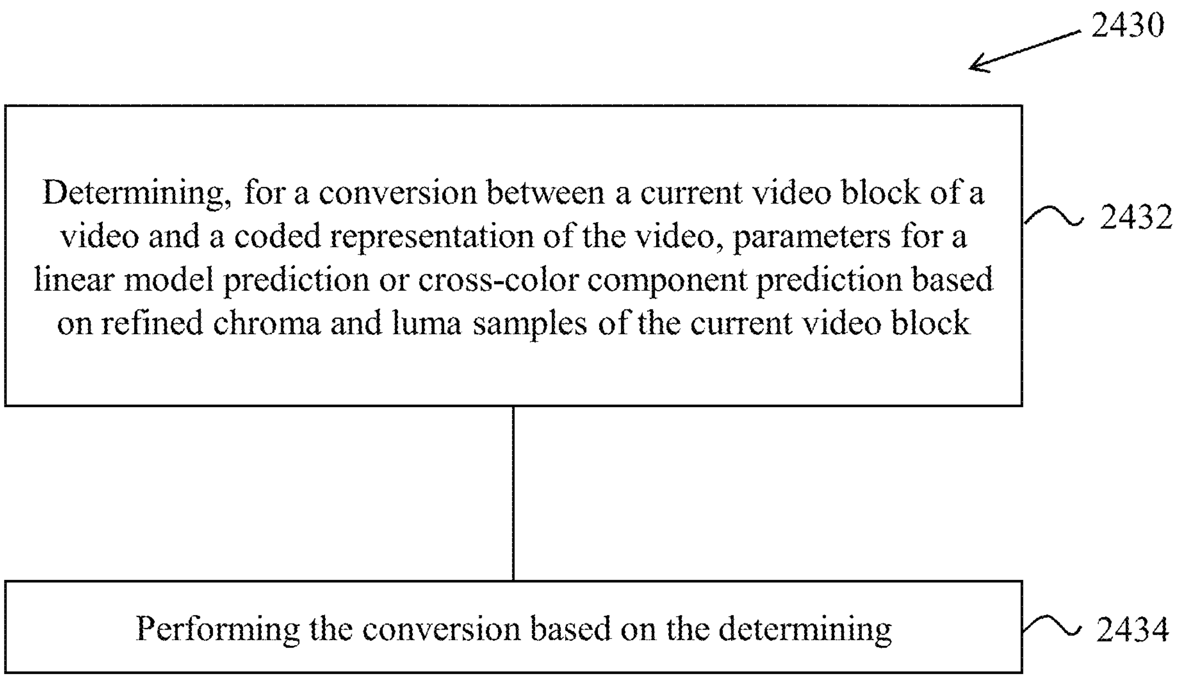

FIG. 24C shows a flowchart of an exemplary method for video processing. The method 2430 includes, at step 2432, determining, for a conversion between a current video block of a video and a coded representation of the video, parameters for a linear model prediction or cross-color component prediction based on refined chroma and luma samples of the current video block. The method 2430 includes, at step 2434, performing the conversion based on the determining.

Figure 24D:
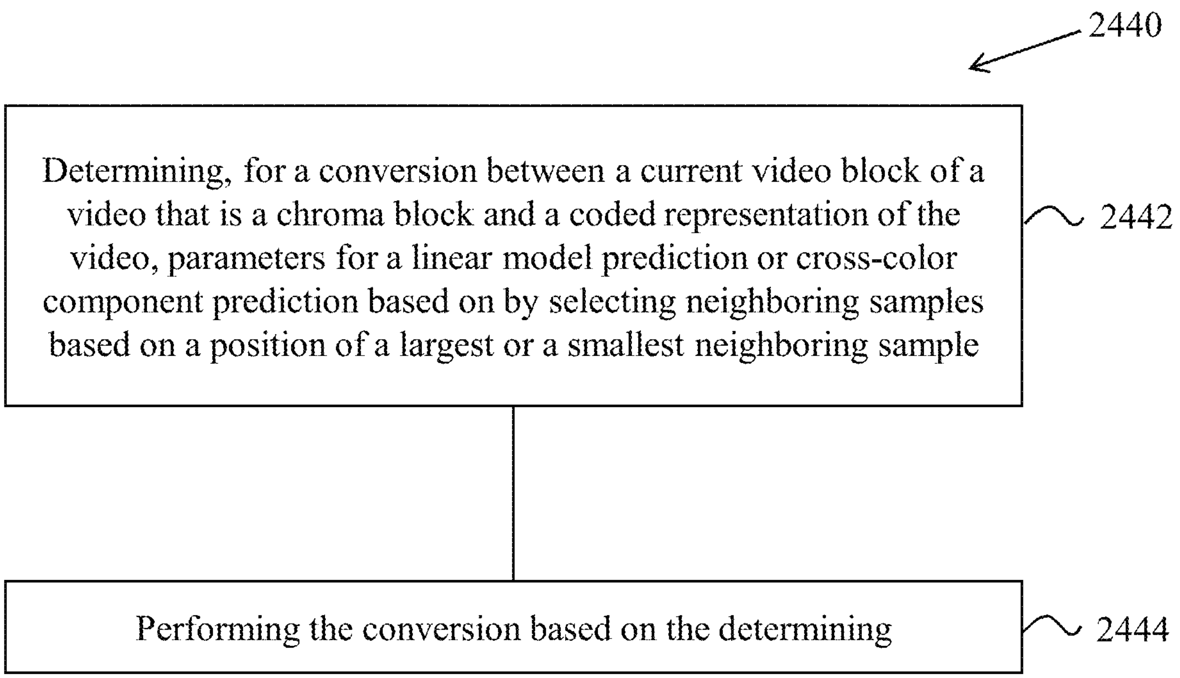

FIG. 24D shows a flowchart of an exemplary method for video processing. The method 2440 includes, at step 2442, determining, for a conversion between a current video block of a video that is a chroma block and a coded representation of the video, parameters for a linear model prediction or cross-color component prediction based on by selecting neighboring samples based on a position of a largest or a smallest neighboring sample. The method 2440 further includes, at step 2444, performing the conversion based on the determining.

Figure 24E:
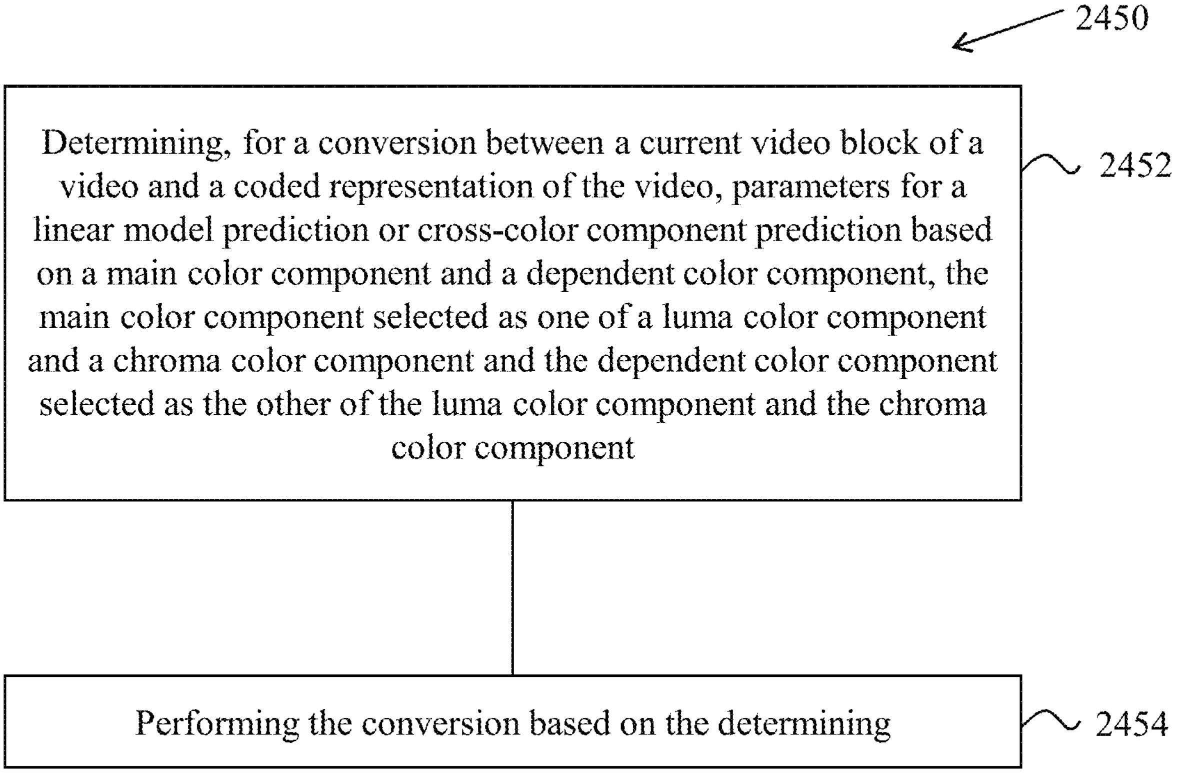

FIG. 24E shows a flowchart of an exemplary method for video processing. The method 2450 includes, at step 2452, determining, for a conversion between a current video block of a video and a coded representation of the video, parameters for a linear model prediction or cross-color component prediction based on a main color component and a dependent color component, the main color component selected as one of a luma color component and a chroma color component and the dependent color component selected as the other of the luma color component and the chroma color component. The method 2450 further includes, at step 2454, performing the conversion based on the determining.

Figure 25A:
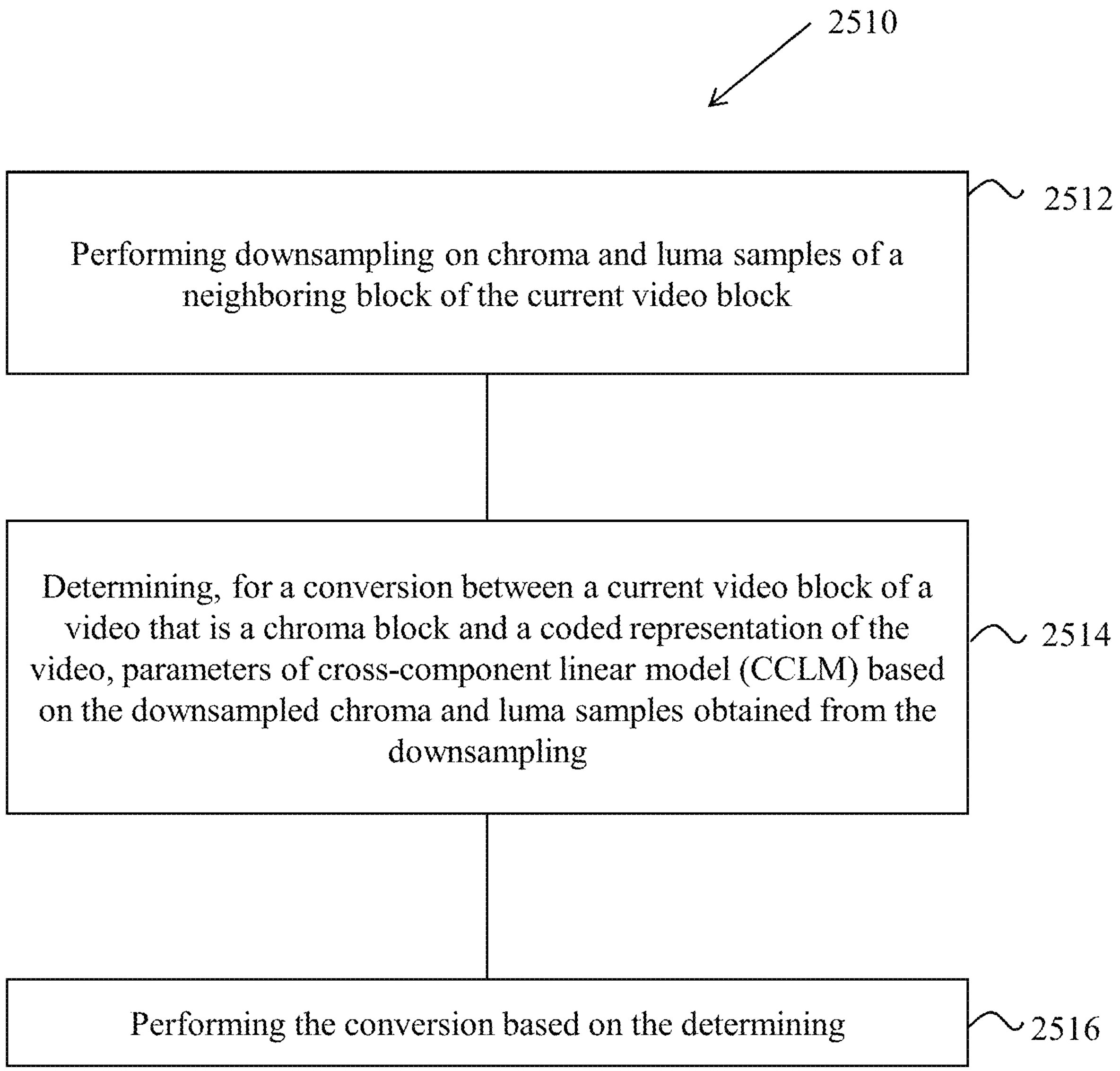
FIGS. 25A and 25B show flowcharts of example methods for video processing based on some implementations of the disclosed technology.

FIG. 25A shows a flowchart of an exemplary method for video processing. The method 2510 includes, at step 2512, performing downsampling on chroma and luma samples of a neighboring block of the current video block. The method 2510 further includes, at step 2514, determining, for a conversion between a current video block of a video that is a chroma block and a coded representation of the video, parameters of cross-component linear model (CCLM) based on the downsampled chroma and luma samples obtained from the downsampling. The method 2510 further includes, at step 2516, performing the conversion based on the determining.

Figure 25B:
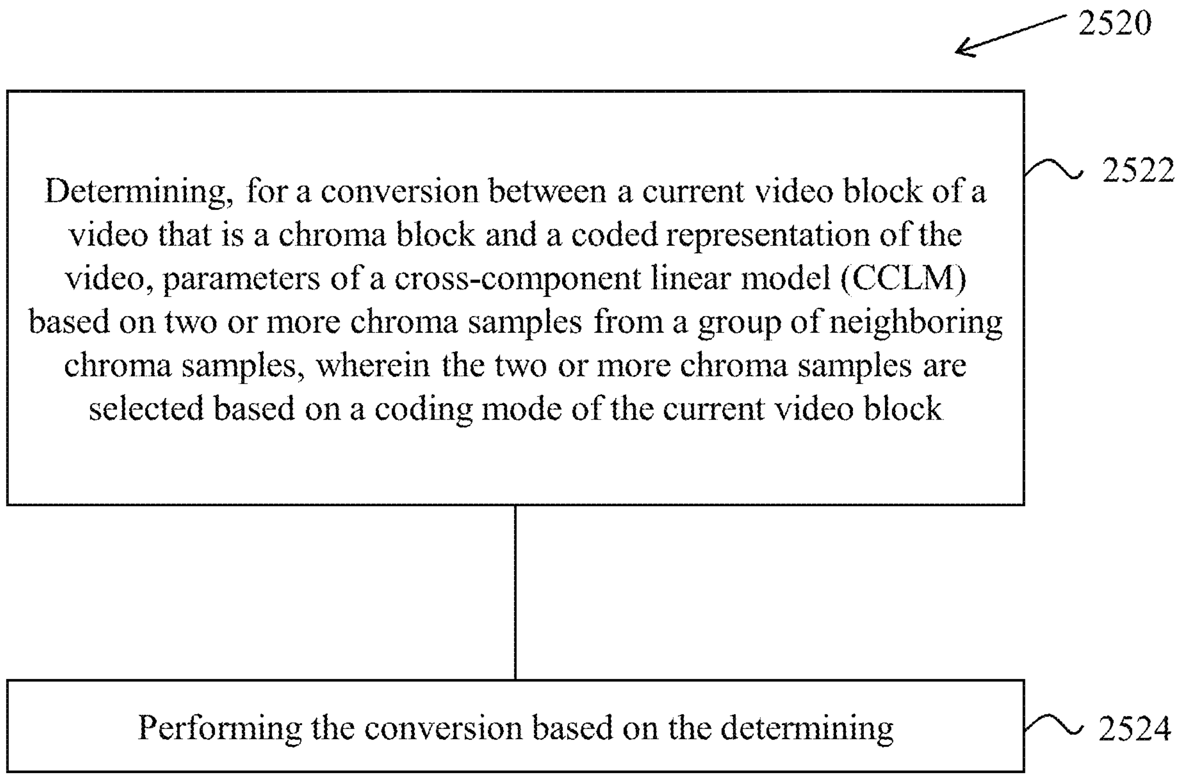

FIG. 25B shows a flowchart of an exemplary method for video processing. The method 2520 includes, at step 2522, determining, for a conversion between a current video block of a video that is a chroma block and a coded representation of the video, parameters of a cross-component linear model (CCLM) based on two or more chroma samples from a group of neighboring chroma samples, wherein the two or more chroma samples are selected based on a coding mode of the current video block. The method 2520 further includes, at step 2524, performing the conversion based on the determining.

Figure 26A:
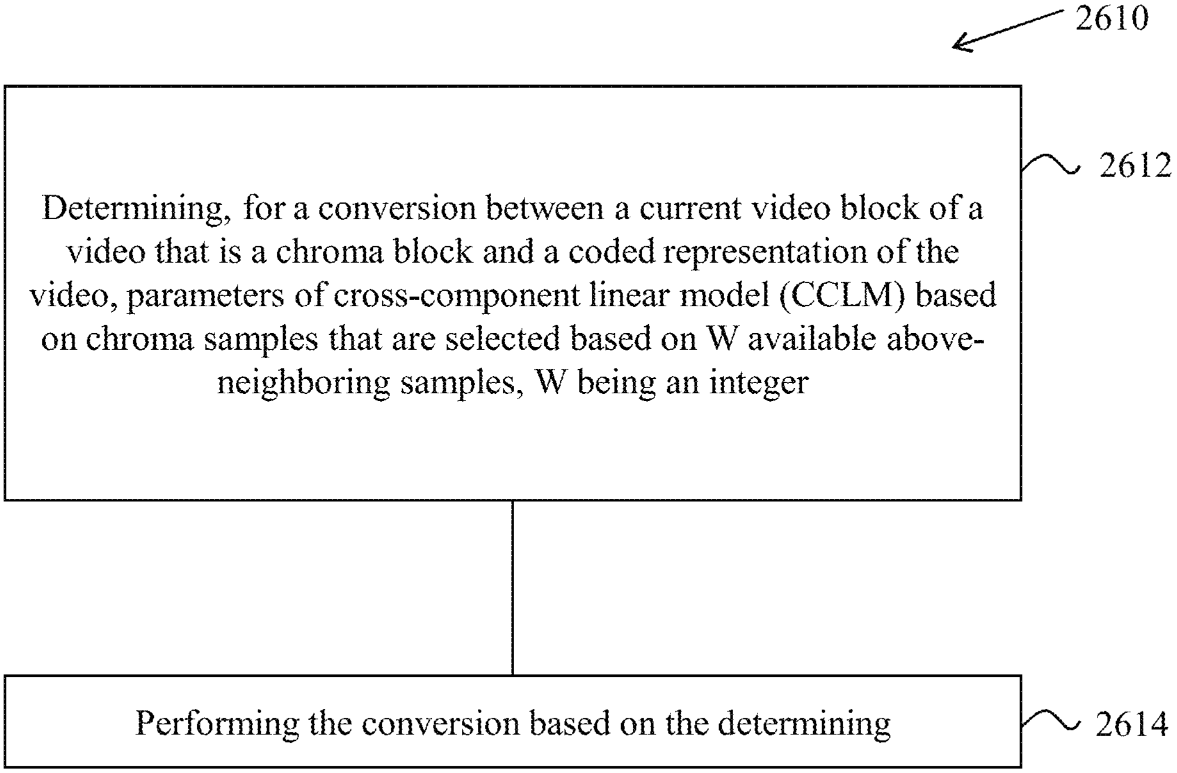
FIGS. 26A and 26B show flowcharts of example methods for video processing based on some implementations of the disclosed technology.

FIG. 26A shows a flowchart of an exemplary method for video processing. The method 2610 includes, at step 2612, determining, for a conversion between a current video block of a video that is a chroma block and a coded representation of the video, parameters of cross-component linear model (CCLM) based on chroma samples that are selected based on W available above-neighboring samples, W being an integer. The method 2610 further includes, at step 2614, performing the conversion based on the determining.

Figure 26B:
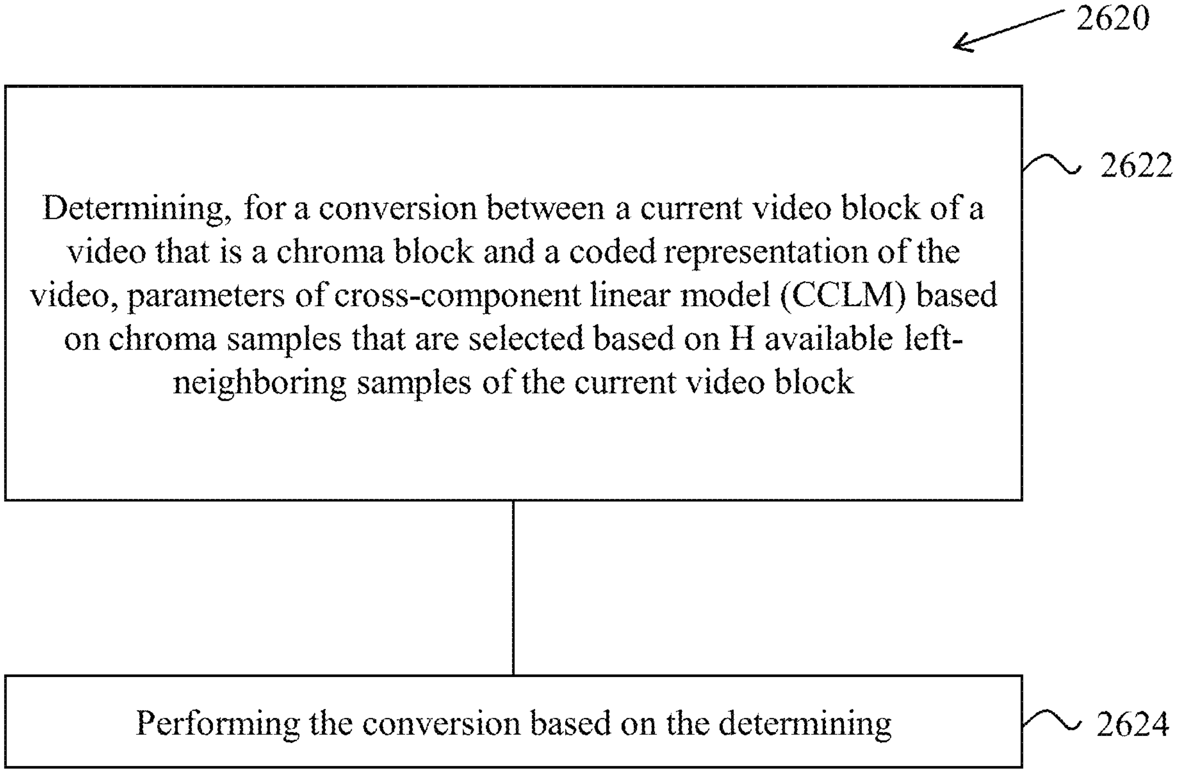

FIG. 26B shows a flowchart of an exemplary method for video processing. The method 2620 includes, at step 2622, determining, for a conversion between a current video block of a video that is a chroma block and a coded representation of the video, parameters of cross-component linear model (CCLM) based on chroma samples that are selected based on H available left-neighboring samples of the current video block. The method 2620 further includes, at step 2622, performing the conversion based on the determining.

Figure 27A:
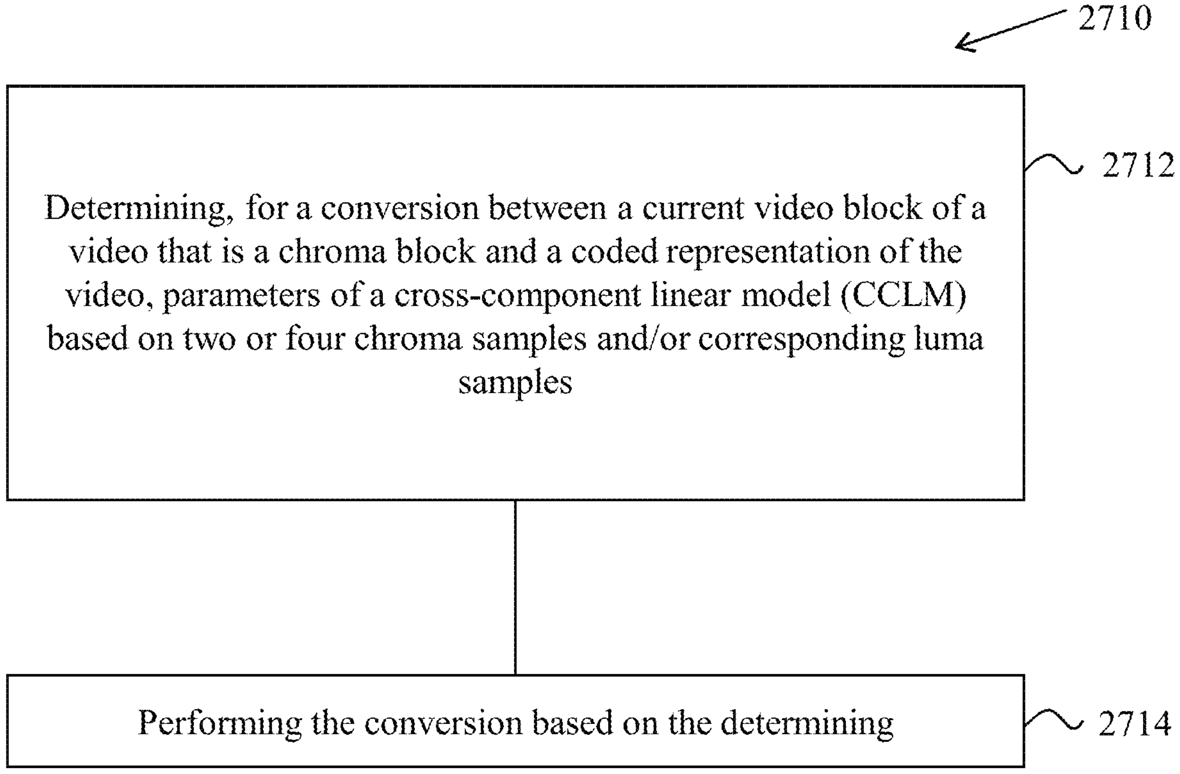
FIGS. 27A and 27B show flowcharts of example methods for video processing based on some implementations of the disclosed technology.

FIG. 27A shows a flowchart of an exemplary method for video processing. The method 2710 includes, at step 2712, determining, for a conversion between a current video block of a video that is a chroma block and a coded representation of the video, parameters of a cross-component linear model (CCLM) based on two or four chroma samples and/or corresponding luma samples. The method 2710 further includes, at step 2714, performing the conversion based on the determining.

Figure 27B:
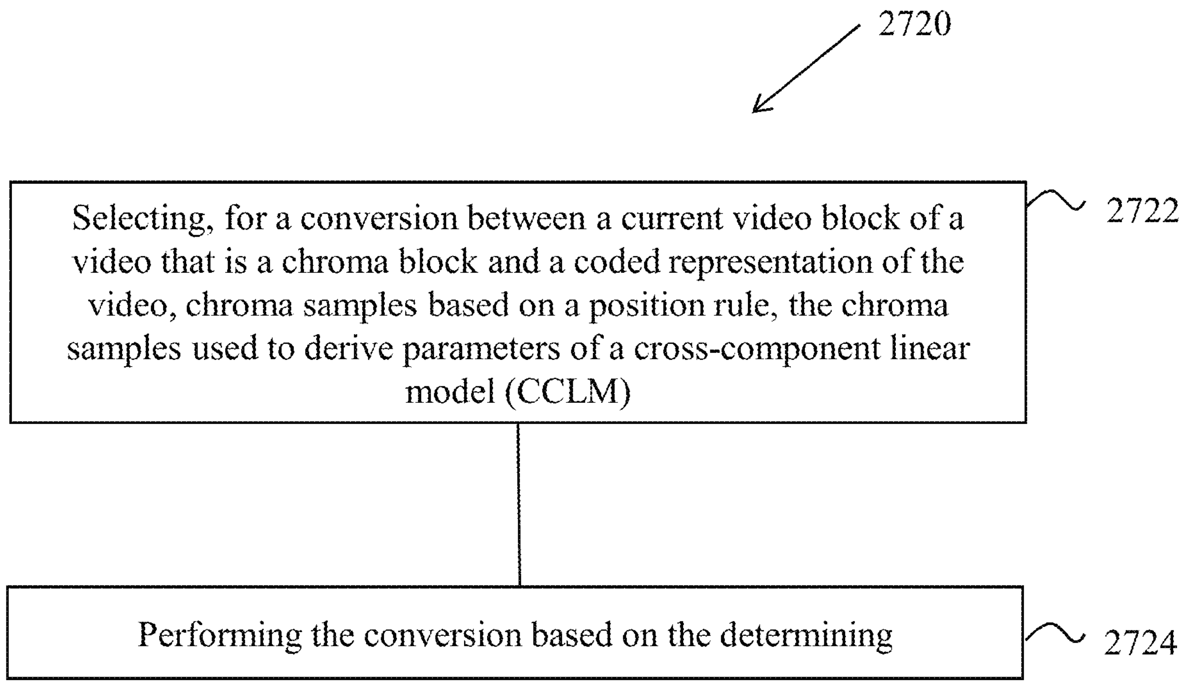

FIG. 27B shows a flowchart of an exemplary method for video processing. The method 2720 includes, at step 2722, selecting, for a conversion between a current video block of a video that is a chroma block and a coded representation of the video, chroma samples based on a position rule, the chroma samples used to derive parameters of a cross-component linear model (CCLM). The method 2720 further includes, at step 2724, performing the conversion based on the determining. In the example, the position rule specifies to select the chroma samples that are located within an above row and/or a left column of the current video block.

FIG. 28A shows a flowchart of an exemplary method for video processing. The method 2810 includes, at step 2812, determining, for a conversion between a current video block of a video that is a chroma block and a coded representation of the video, positions at which luma samples are downsampled, wherein the downsampled luma samples are used to determine parameters of a cross-component linear model (CCLM) based on chroma samples and downsampled luma samples, wherein the downsampled luma samples are at positions corresponding to positions of the chroma samples that are used to derive the parameters of the CCLM. The method 2810 further includes, at step 2814, performing the conversion based on the determining.

Figure 28B:
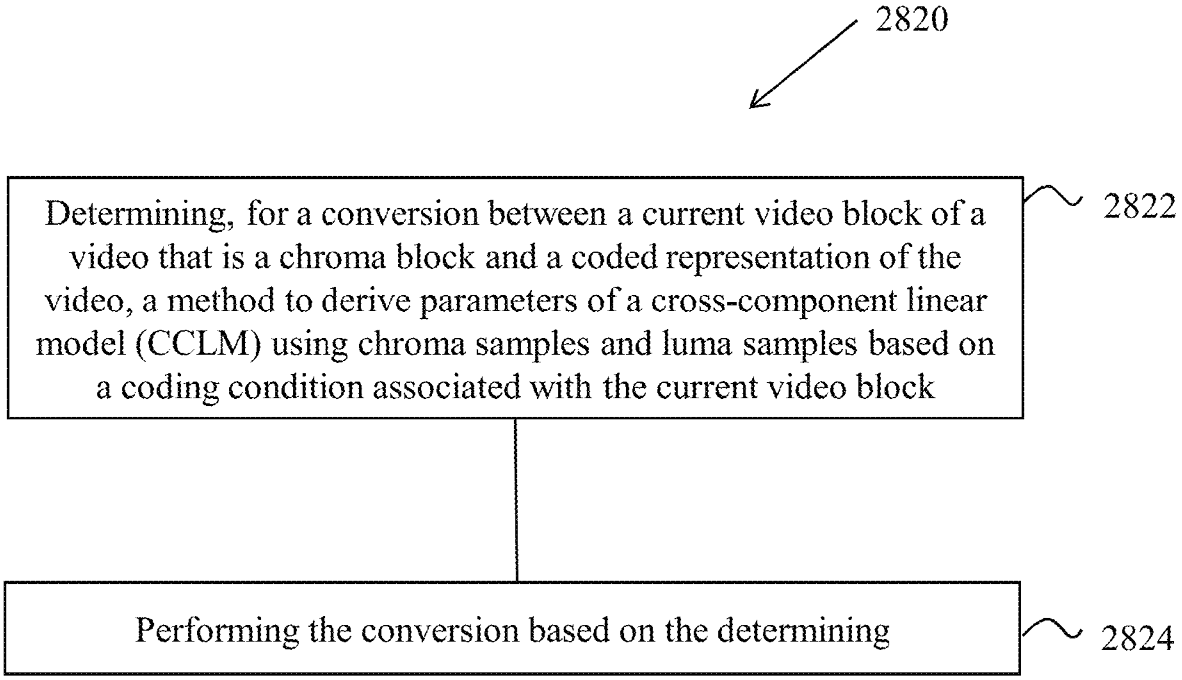

FIG. 28B shows a flowchart of an exemplary method for video processing. The method 2820 includes, at step 2822, determining, for a conversion between a current video block of a video that is a chroma block and a coded representation of the video, a method to derive parameters of a cross-component linear model (CCLM) using chroma samples and luma samples based on a coding condition associated with the current video block. The method 2820 further includes, at step 2824, performing the conversion based on the determining.

Figure 28C:
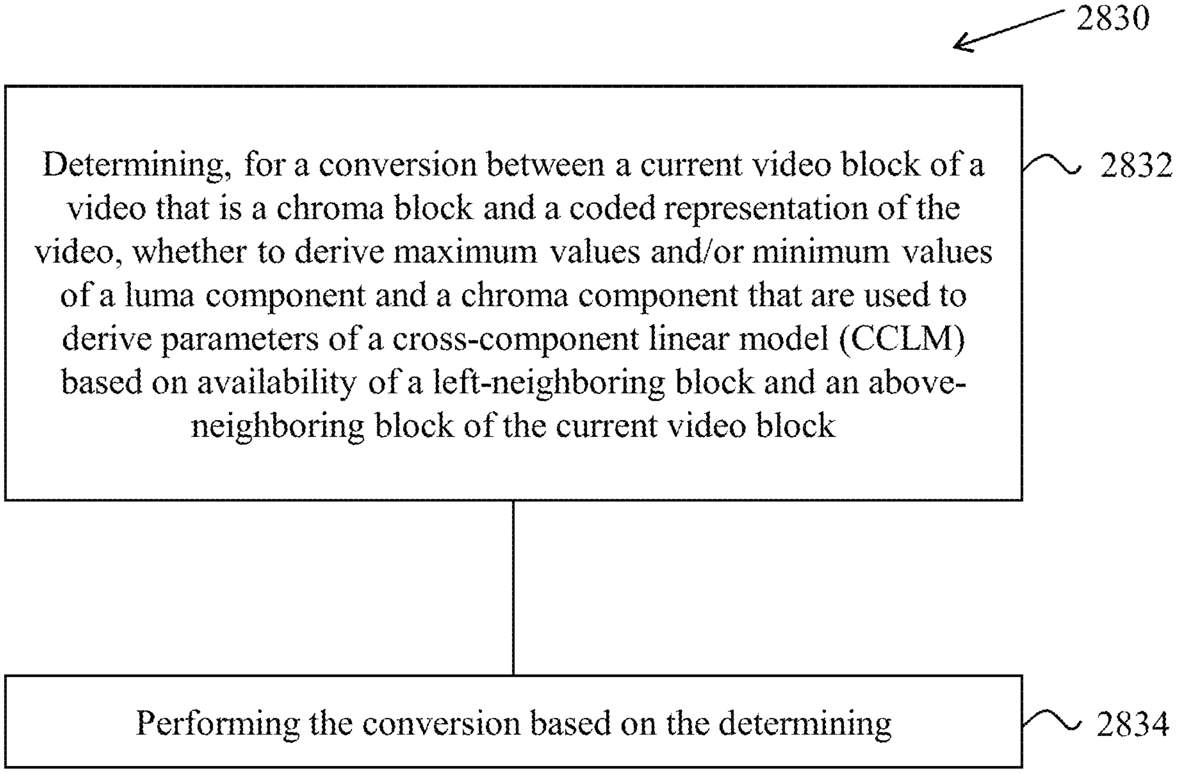

FIG. 28C shows a flowchart of an exemplary method for video processing. The method 2830 includes, at step 2832, determining, for a conversion between a current video block of a video that is a chroma block and a coded representation of the video, whether to derive maximum values and/or minimum values of a luma component and a chroma component that are used to derive parameters of a cross-component linear model (CCLM) based on availability of a left-neighboring block and an above-neighboring block of the current video block. The method 2830 further includes, at step 2834, performing the conversion based on the determining.

Figure 29A:
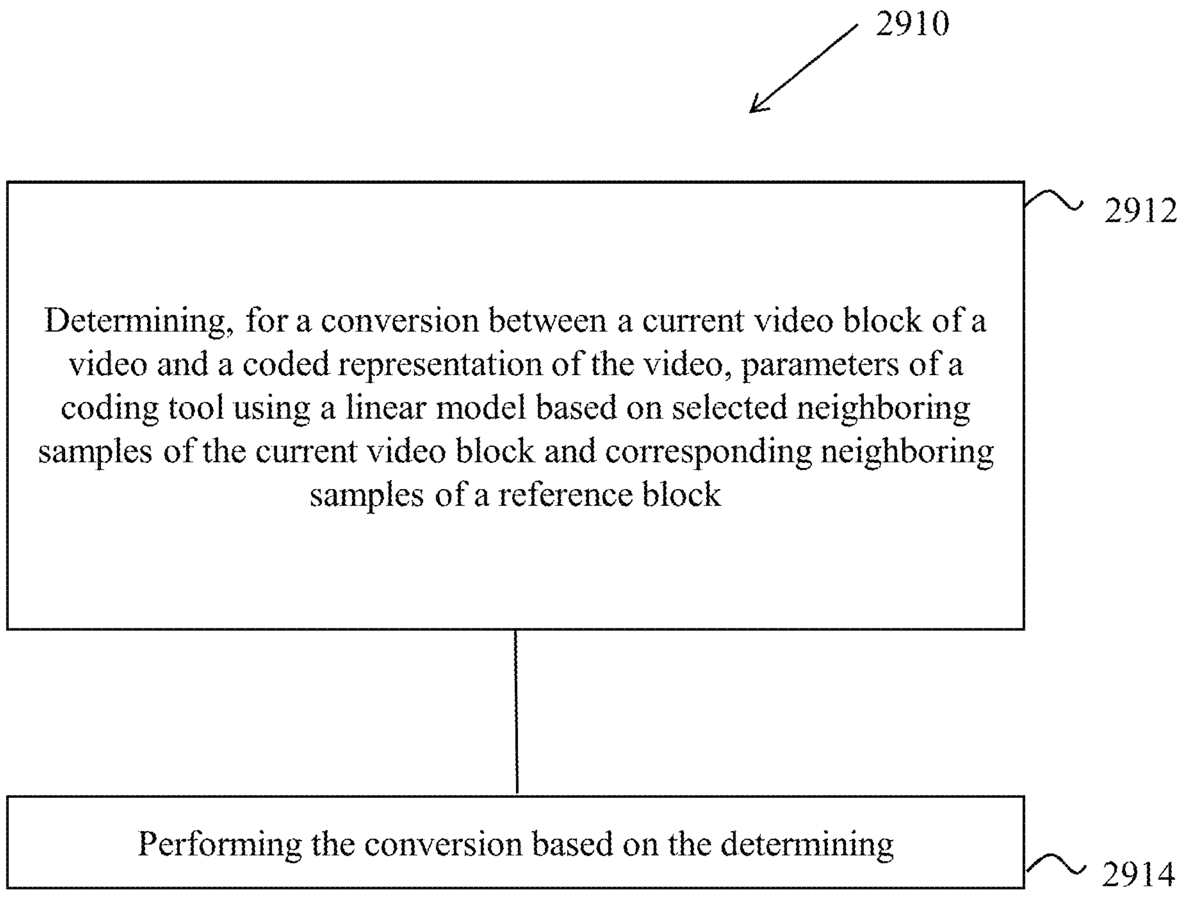
FIGS. 29A-29C show flowcharts of example methods for video processing based on some implementations of the disclosed technology.

FIG. 29A shows a flowchart of an exemplary method for video processing. The method 2910 includes, at step 2912, determining, for a conversion between a current video block of a video and a coded representation of the video, parameters of a coding tool using a linear model based on selected neighboring samples of the current video block and corresponding neighboring samples of a reference block. The method 2910 further includes, at step 2914, performing the conversion based on the determining.

Figure 29B:
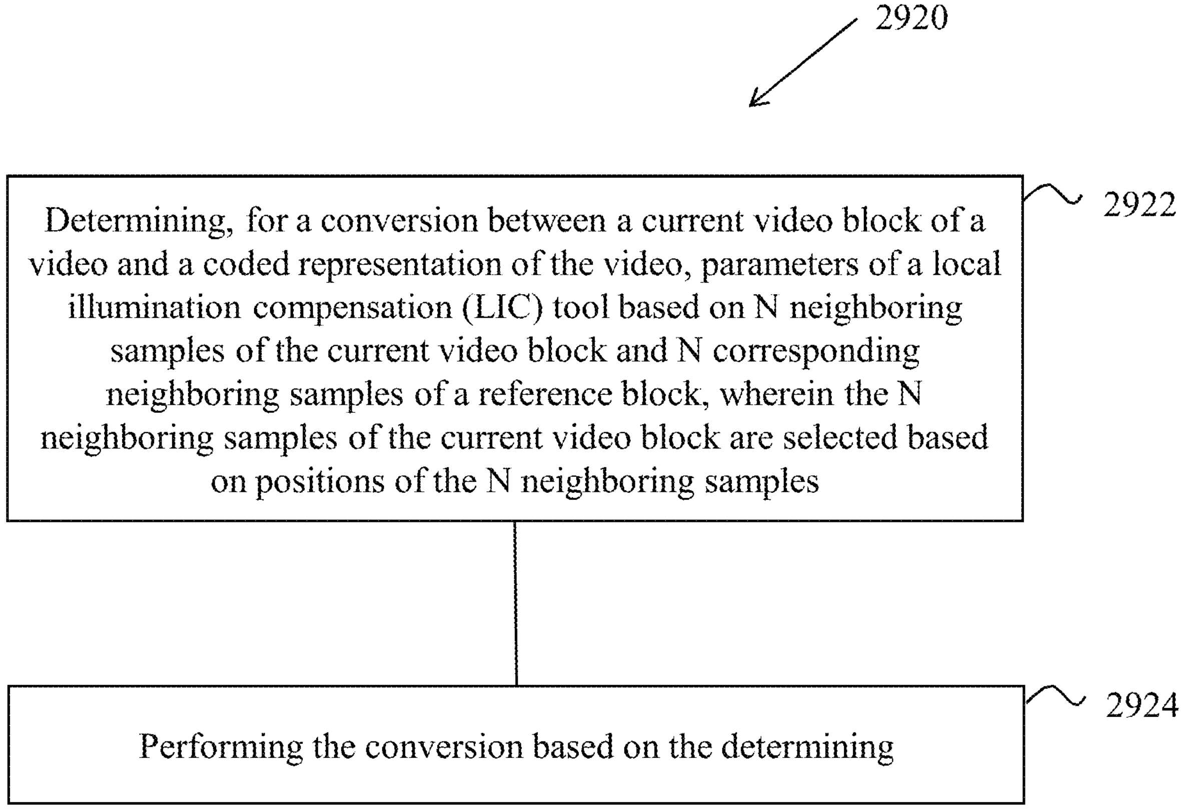

FIG. 29B shows a flowchart of an exemplary method for video processing. The method 2920 includes, at step 2922, determining, for a conversion between a current video block of a video and a coded representation of the video, parameters of a local illumination compensation (LIC) tool based on N neighboring samples of the current video block and N corresponding neighboring samples of a reference block, wherein the N neighboring samples of the current video block are selected based on positions of the N neighboring samples. The method 2920 further includes, at step 2924, performing the conversion based on the determining. The LIC tool uses a linear model of illumination changes in the current video block during the conversion.

Figure 29C:
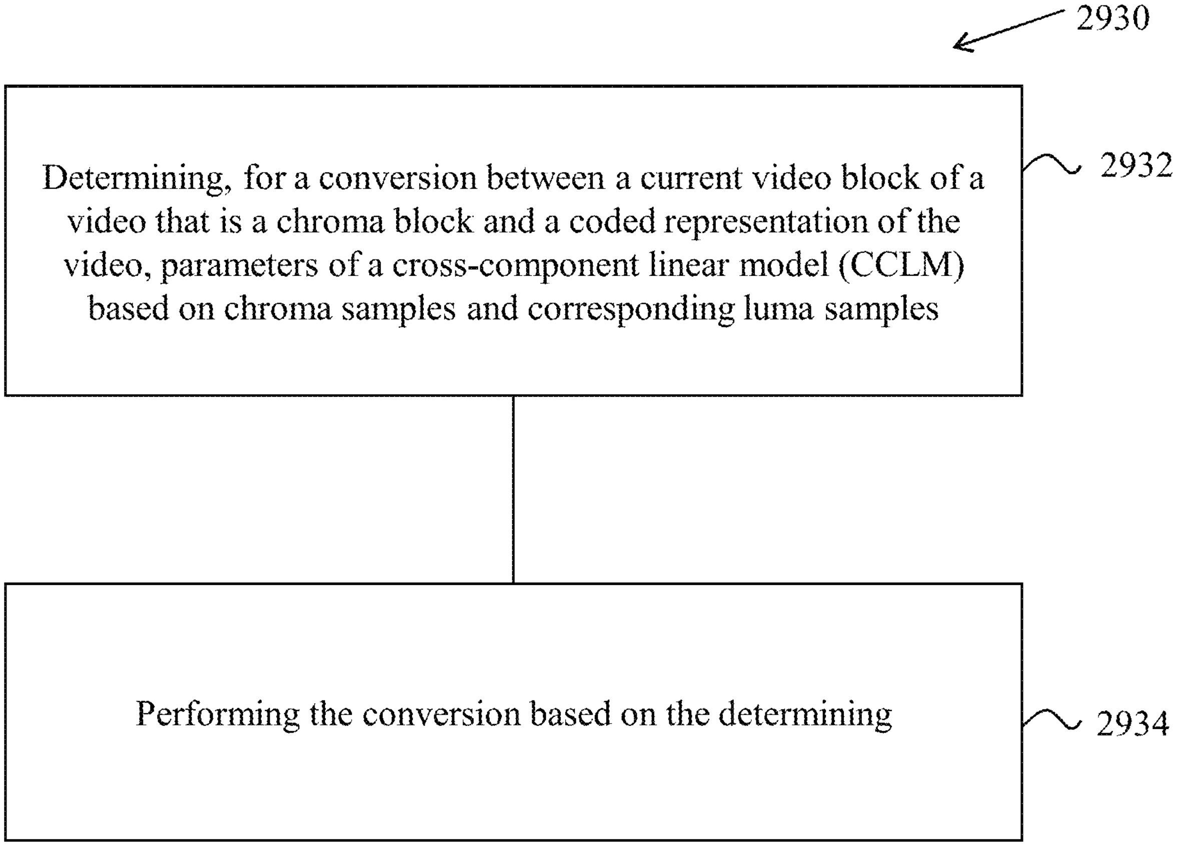

FIG. 29C shows a flowchart of an exemplary method for video processing. The method 2930 includes, at step 2932, determining, for a conversion between a current video block of a video that is a chroma block and a coded representation of the video, parameters of a cross-component linear model (CCLM) based on chroma samples and corresponding luma samples. The method 2930 further includes, at step 2934, performing the conversion based on the determining. In the example, some of the chroma samples are obtained by a padding operation and the chroma samples and the corresponding luma samples are grouped into two arrays G0 and G1, each array including two chroma samples and corresponding luma samples.

4 Example Implementations of the Disclosed Technology

Figure 30A:
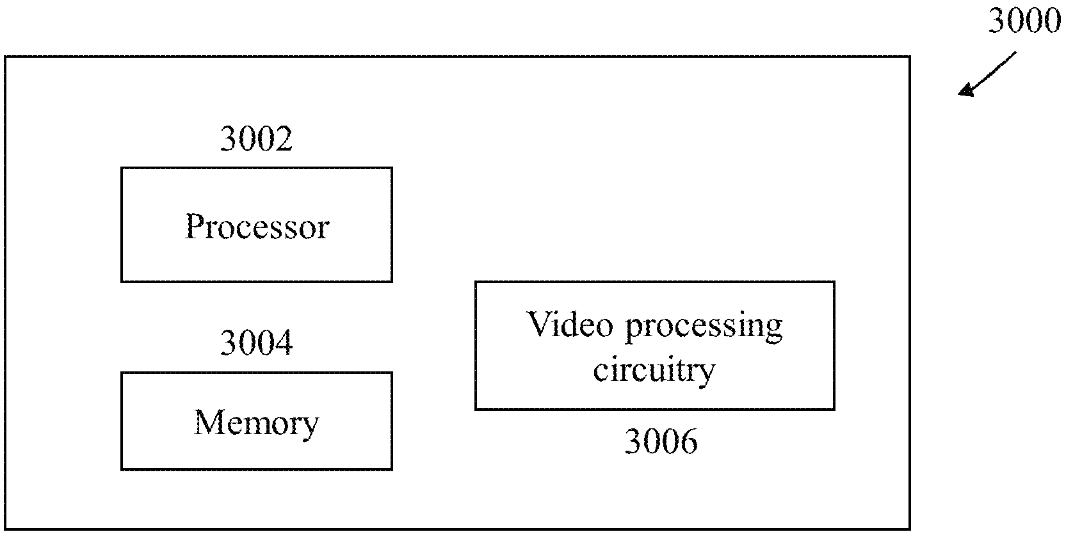
FIGS. 30A and 30B are block diagrams of examples of hardware platforms for implementing a visual media decoding or a visual media encoding technique described in the present document.

FIG. 30A is a block diagram of a video processing apparatus 3000. The apparatus 3000 may be used to implement one or more of the methods described herein. The apparatus 3000 may be embodied in a smartphone, tablet, computer, Internet of Things (IoT) receiver, and so on. The apparatus 3000 may include one or more processors 3002, one or more memories 3004 and video processing hardware 3006. The processor(s) 3002 may be configured to implement one or more methods (including, but not limited to, methods as shown FIGS. 18 to 29C) described in the present document. The memory (memories) 3004 may be used for storing data and code used for implementing the methods and techniques described herein. The video processing hardware 3006 may be used to implement, in hardware circuitry, some techniques described in the present document.

Figure 30B:
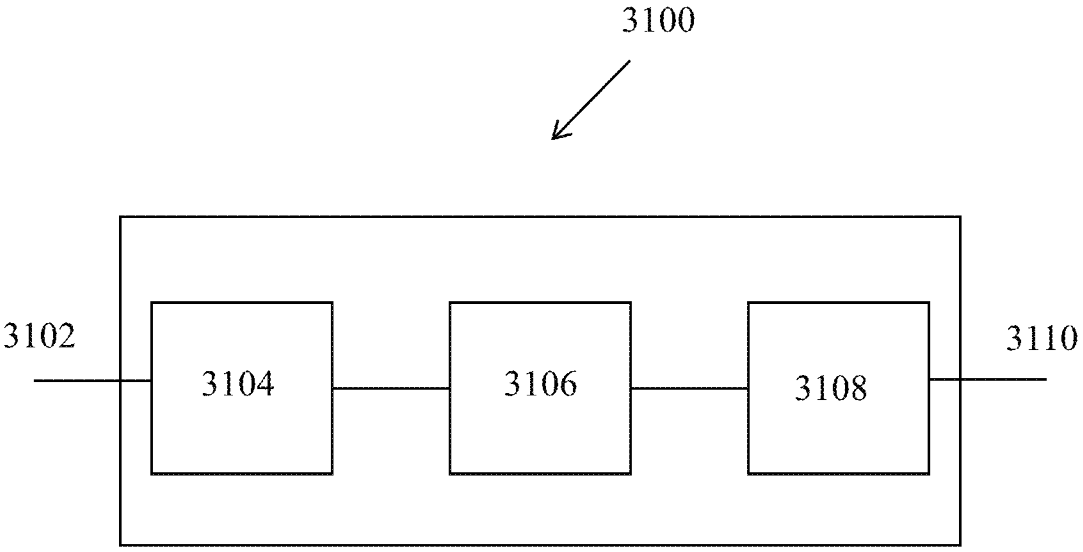

FIG. 30B is another example of a block diagram of a video processing system in which disclosed techniques may be implemented. FIG. 30B is a block diagram showing an example video processing system 3100 in which various techniques disclosed herein may be implemented. Various implementations may include some or all of the components of the system 3100. The system 3100 may include input 3102 for receiving video content. The video content may be received in a raw or uncompressed format, e.g., 8 or 10 bit multi-component pixel values, or may be in a compressed or encoded format. The input 3102 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 3100 may include a coding component 3104 that may implement the various coding or encoding methods described in the present document. The coding component 3104 may reduce the average bitrate of video from the input 3102 to the output of the coding component 3104 to produce a coded representation of the video. The coding techniques are therefore sometimes called video compression or video transcoding techniques. The output of the coding component 3104 may be either stored, or transmitted via a communication connected, as represented by the component 3106. The stored or communicated bitstream (or coded) representation of the video received at the input 3102 may be used by the component 3108 for generating pixel values or displayable video that is sent to a display interface 3110. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

In some embodiments, the video coding methods may be implemented using an apparatus that is implemented on a hardware platform as described with respect to FIG. 30A or 30B.

Various techniques preferably incorporated within some embodiments may be described using the following clause-based format.

The first set of clauses describe certain features and aspects of the disclosed techniques listed in the previous section, including, for example, Example 1.a-d and j.

1. A method of video processing, comprising: determining, for a conversion between a current video block of a video that is a chroma block and a coded representation of the video, parameters of a cross-component linear model based on two chroma samples from a group of neighboring chroma samples, wherein the two chroma samples are selected from the group based on a position rule; and performing the conversion based on the determining.

2. The method of clause 1, wherein the parameters have values that are determined based on luma samples of the two chroma samples.

3. The method of clause 2, wherein the luma samples are downsampled used to derive the parameters of the cross-component linear model.

4. The method of clause 1, wherein the parameters have values that are determined based on chroma samples at $2^S$ positions, S being an integer.

5. The method of clause 1, wherein a top-left sample of the chroma block is (x, y), wherein a width and a height of the chroma block is W and H, respectively, and wherein the group of neighboring chroma samples comprises: sample A with coordinates (x−1, y), sample B with coordinates (x−1, y+H/2−1), sample C with coordinates (x−1, y+H/2), sample D with coordinates (x−1, y+H−1), sample E with coordinates (x−1, y+H), sample F with coordinates (x−1, y+H+H/2−1), sample G with coordinates (x−1, y+H+H/2), sample I with coordinates (x−1, y+H+H−1), sample J with coordinates (x, y−1), sample K with coordinates (x+W/2−1, y−1), sample L with coordinates (x+W/2, y−1), sample M with coordinates (x+W−1, y−1), sample N with coordinates (x+W, y−1), sample O with coordinates (x+W+W/2−1, y−1), sample P with coordinates (x+W+W/2, y−1), and sample Q with coordinates (x+W+W−1, y−1).

6. The method of clause 5, wherein the position rule specifies that the two chroma samples are selected from the samples A, D, J and M.

7. The method of clause 5, wherein the position rule specifies that the two chroma samples are selected from the samples A, B, C, D, J, K, L and M.

8. The method of clause 5, wherein the position rule specifies that the two chroma samples are selected from the samples A, I, J and Q.

9. The method of clause 5, wherein the position rule specifies that the two chroma samples are selected from the samples A, B, D, I, J, K, M and Q.

10. The method of clause 5, wherein the position rule specifies that the two chroma samples are selected from the samples A, B, D, F, J, K, M and O.

11. The method of clause 5, wherein the position rule specifies that the two chroma samples are selected from the samples A, C, G, I, J, L, P and Q.

12. The method of clause 5, wherein the position rule specifies that the two chroma samples are selected from the samples A, C, E, G, J, L, N and P.

13. The method of clause 5, wherein the position rule specifies that the two chroma samples are selected from the samples J, K, L and M.

14. The method of clause 5, wherein the position rule specifies that the two chroma samples are selected from the samples J, L, N and Q.

15. The method of clause 5, wherein the position rule specifies that the two chroma samples are selected from the samples J, K, L, M, N, O, P and Q.

16. The method of clause 5, wherein the position rule specifies that the two chroma samples are selected from the samples A, B, C, D, E, F, G, and I.

17. The method of clause 5, wherein the position rule specifies that the two chroma samples are selected from the samples J, K, L, M, N, O, P, and Q.

18. The method of clause 5, wherein the position rule specifies that one of the two chroma samples are selected from the samples A, B, C, D, E, F, G, and I and the other of the two chroma samples are selected from the samples J, K, L, M, N, O, P, and Q.

19. The method of any of clauses 5-18, wherein the two chroma samples have identical corresponding luma values, the method further includes checking an additional chroma sample.

20. The method of clause 1, wherein chroma samples in the group of neighboring chroma samples are searched to find the two chroma samples with minimum and maximum corresponding luma values to determine a first set of values for the parameters.

21. The method of clause 1, wherein an above neighboring sample with coordinates (x, y) is in the group only if x % K=0, K being 2, 4, 6 or 8 and % being a modulo operator.

22. The method of clause 1, wherein a left neighboring sample with coordinates (x, y) is in the group only if y % K=0, K being 2, 4, 6 or 8 and % being a modulo operator.

23. The method of clause 1, wherein the two chroma samples are selected based on availabilities of neighboring blocks.

24. The method of any of clauses 1-23, wherein the performing of the conversion includes generating the coded representation from the current block.

25. The method of any of clauses 1-23, wherein the performing of the conversion includes generating the current block from the coded representation.

26. An apparatus in a video system comprising a processor and a non-transitory memory with instructions thereon, wherein the instructions upon execution by the processor, cause the processor to implement the method in any one of clauses 1 to 25.

27. A computer program product stored on a non-transitory computer readable media, the computer program product including program code for carrying out the method in any one of clauses 1 to 25.

The second set of clauses describe certain features and aspects of the disclosed techniques listed in the previous section, including, for example, Example 1.e-i and Example 9.

1. A method for video processing, comprising: determining, for a conversion between a current video block of a video that is a chroma block and a coded representation of the video, parameters of a cross-component linear model based on selected chroma samples based on positions of the chroma samples, wherein the selected chroma samples are selected from a group of neighboring chroma samples; and performing the conversion based on the determining.

2. The method of clause 1, wherein at least one neighboring chroma sample does not belong to the selected chroma samples.

3. The method of clause 1, wherein all of the selected chroma neighboring samples are left to the current block in a case that a prediction mode of the current video block is a first linear mode that uses left-neighboring samples only.

4. The method of clause 1, wherein all of the selected chroma neighboring samples are above to the current block in a case that a prediction mode of the current video block is a second linear uses above-neighboring samples only.

5. The method of any of clauses 1-4, wherein positions of the chroma samples are selected based on the width or the height of the chroma block.

6. The method of clauses 1, wherein the positions of the chroma samples correspond to a signaling in a video parameter set (VPS), a sequence parameter set (SPS), a picture parameter set (PPS), a slice header, a tile group header, a tile, a coding unit (CU), a coding tree unit (CTU) or a prediction unit (PU).

7. The method of clause 1, wherein determining of the parameters is further based on a least mean squares method.

8. The method of clause 1, wherein the determining of the parameters is further based on a two-point method.

9. A method for video processing, comprising: determining, for a current video block, a group of neighboring chroma samples used to derive a set of values for parameters of a linear model, wherein a width and a height of the current video block is W and H, respectively, and wherein the group of neighboring chroma samples comprises at least one sample that is located beyond 2×W above neighboring chroma samples or 2×H left neighboring chroma samples; and performing, based on the linear model, a conversion between the current video block and a coded representation of a video including the current video block.

10. The method of clause 8, wherein the current video block is coded using a linear intra prediction mode, wherein a top-left sample of the current video block is (x, y), wherein the at least one sample is (x−1, y+d), wherein d is an integer in a range [T, S], and wherein T and S are integers.

11. The method of clause 9, wherein T<0 and S>(2×H−1).

12. The method of clause 9, wherein T=−4 and S=3×H.

13. The method of clause 9, wherein T=0 and S=max(2×W, W+H).

14. The method of claim 9, wherein T=0 and S=4×H.

15. The method of clause 8, wherein the current video block is coded using a linear intra prediction mode, wherein a top-left sample of the current video block is (x, y), wherein the at least one sample is (x+d, y−1), wherein d is an integer in a range [T, S], and wherein T and S are integers.

16. The method of clause 15, wherein T<0 and S>(2×W−1).

17. The method of clause 15, wherein T=−4 and S=3×W.

18. The method of clause 15, wherein T=0 and S=max (2×W, W+H).

19. The method of clause 15, wherein T=0 and S=4×W.

20. The method of any of clauses 1-19, wherein the performing of the conversion includes generating the coded representation from the current block.

21. The method of any of clauses 1-19, wherein the performing of the conversion includes generating the current block from the coded representation.

22. An apparatus in a video system comprising a processor and a non-transitory memory with instructions thereon, wherein the instructions upon execution by the processor, cause the processor to implement the method in any one of clauses 1 to 21.

23. A computer program product stored on a non-transitory computer readable media, the computer program product including program code for carrying out the method in any one of clauses 1 to 21.

The third set of clauses describe certain features and aspects of the disclosed techniques listed in the previous section, including, for example, Example 2 and Example 5.

1. A method for video processing, comprising: determining, for a conversion between a current video block of a video that is a chroma block and a coded representation of the video, multiple sets of parameters, wherein each set of parameters defines a cross-component linear model (CCLM) and is derived from a corresponding group of chroma samples at corresponding chroma sample positions; determining, based on the multiple sets of parameters, parameters for a final CCLM; and performing the conversion based on the final CCLM.

2. The method of clause 1, wherein the parameters for the final CCLM are determined as an average of corresponding parameters in the multiple sets of parameters.

3. The method of clause 1, wherein the multiple sets of parameters include a first set of ($\alpha1$, $\beta1$) and a second set of ($\alpha2$, $\beta2$) and a chroma prediction is calculated based on parameters of $\alpha1$, $\beta1$, $\alpha2$, $\beta2$.

4. The method of clause 1, wherein the multiple sets of parameters are shifted and combined to form the final CCLM.

5. The method of clause 1, wherein the multiple sets of parameters include a first set of ($\alpha1$, $\beta1$) that is derived from a first group of chroma samples and a second set of ($\alpha2$, $\beta2$) that is derived from a second group of chroma samples, the first group and the second group corresponding to different chroma sample positions from each other.

6. The method of clause 5, wherein a top-left sample of the chroma block is (x, y) and a width and a height of the chroma block is W and H, respectively, and wherein the group of chroma samples comprises at least one of:

sample A with coordinates (x−1, y),
sample B with coordinates (x−1, y+H/2−1),
sample C with coordinates (x−1, y+H/2),
sample D with coordinates (x−1, y+H−1),
sample E with coordinates (x−1, y+H),
sample F with coordinates (x−1, y+H+H/2−1),
sample G with coordinates (x−1, y+H+H/2),
sample I with coordinates (x−1, y+H+H−1),
sample J with coordinates (x, y−1),
sample K with coordinates (x+W/2−1, y−1),
sample L with coordinates (x+W/2, y−1),
sample M with coordinates (x+W−1, y−1),
sample N with coordinates (x+W, y−1),
sample O with coordinates (x+W+W/2−1, y−1),
sample P with coordinates (x+W+W/2, y−1), or
sample Q with coordinates (x+W+W−1, y−1).

7. The method of clause 6, wherein the first group includes Samples A and D and the second group includes Samples J and M or Samples E and I.

8. The method of clause 6, wherein the first group includes Samples A and I and the second group includes Samples J and Q.

9. The method of clause 6, wherein the first group includes Samples A and B and the second group includes Samples C and D.

10. The method of clause 6, wherein the first group includes J and M and the second group includes N and Q.

11. The method of clause 6, wherein the first group includes J and K and the second group includes L and M.

12. A method of video processing, comprising: determining, for a conversion between a current video block of a video and a coded representation of the video, parameters of a cross-component linear model (CCLM) based on maximum and minimum values of chroma and luma samples of N groups of chroma and luma samples selected from neighboring luma and chroma samples of the current video block; and performing the conversion using the CCLM.

13. The method of clause 12, wherein the N groups of chroma and luma samples comprise $S_0$, $S_1$, . . . , $S_m$ and wherein 1≤m≤N−1, wherein m and N are non-negative integers, wherein a maximum luma value is calculated as $\text{maxL}=f1(\text{maxL}_{S0}, \text{maxL}_{S1}, \ldots, \text{maxL}_{Sm})$, wherein $f1$ is a first function and $\text{maxL}_{Si}$ is a maximum luma value of a group $S_i$ of the plurality of groups, wherein a maximum chroma value is calculated as $\text{maxC}=f2(\text{maxC}_{S0}, \text{maxC}_{S1}, \ldots, \text{maxC}_{Sm})$, wherein $f2$ is a second function and $\text{maxC}_{Si}$ is a chroma value of the group $S_i$ corresponding to $\text{maxL}_{Si}$, wherein a minimum luma value is calculated as $\text{minL}=f3(\text{minL}_{S0}, \text{minL}_{S1}, \ldots, \text{minL}_{Sm})$, wherein $f3$ is a third function and $\text{minL}_{Si}$ is a minimum luma value of the group $S_i$, wherein a minimum chroma value is calculated as $\text{minC}=f4(\text{minC}_{S0}, \text{minC}_{S1}, \ldots, \text{minC}_{Sm})$, wherein $f4$ is a fourth function and $\text{minC}_{Si}$ is a chroma value of the group $S_i$, corresponding to $\text{minL}_{Si}$ and wherein the parameters of the linear model comprise $\alpha$ and $\beta$ that are calculated as $\alpha=(\text{maxC}-\text{minC})/(\text{maxL}-\text{minL})$ and $\beta=\text{minC}-\alpha\times\text{minL}$.

14. The method of clause 13, wherein $f1$, $f2$, $f3$ and $f4$ are averaging functions.

15. The method of clause 13 or 14, wherein m=N−1.

16. The method of clause 13 or 14, wherein m=1, and wherein $S_1=S_{N-1}$.

17. The method of clause 13 or 14, wherein m=0.

18. The method of clause 13 or 14, wherein $S_0$ comprises samples from an above row of the current video block, and wherein S1 comprises samples from a left row of the current video block.

19. The method of clause 13 or 14, wherein samples from an above row of the current video block have coordinates (x, y), wherein $S_0$ comprises a first portion of the samples, wherein each sample of the first portion satisfies x % P=Q, wherein $S_1$ comprises a second portion of the samples, wherein each sample of the second portion satisfies x % P≠Q, and wherein % is a modulo operator and P and Q are non-negative integers.

20. The method of clause 13 or 14, wherein samples from a left row of the current video block have coordinates (x, y), wherein $S_0$ comprises a first portion of the samples, wherein each sample of the first portion satisfies y % P=Q, wherein $S_1$ comprises a second portion of the samples, wherein each sample of the second portion satisfies y % P≠Q, and wherein % is a modulo operator and P and Q are non-negative integers.

21. The method of clause 19 or 20, wherein P=2 and Q=1, or P=2 and Q=0, or P=4 and Q=0.

22. The method of any of clauses 12 to 14, wherein the chroma and luma samples comprise only a portion of the chroma and luma samples of the neighboring block.

23. The method of any of clauses 13 to 22, wherein N is predetermined.

24. The method of any of clauses 13 to 23, wherein N is signaled in a sequence parameter set (SPS), a video parameter set (VPS), a picture parameter set (PPS), a picture header, a slice header, a tile group header, one or more largest coding units or one or more coding units.

25. The method of clause 12, wherein the chroma and luma samples for each group are selected based on an availability of the neighboring block of the current video block.

26. The method of clause 12, wherein the chroma and luma samples for each group are selected based on a width and a height of the current video block.

27. The method of clause 12, wherein the chroma and luma samples for each group are selected based on values of the chroma and luma samples.

28. The method of any of clauses 1-27, wherein the performing of the conversion includes generating the coded representation from the current block.

29. The method of any of clauses 1-27, wherein the performing of the conversion includes generating the current block from the coded representation.

30. An apparatus in a video system comprising a processor and a non-transitory memory with instructions thereon, wherein the instructions upon execution by the processor, cause the processor to implement the method in any one of clauses 1 to 29.

31. A computer program product stored on a non-transitory computer readable media, the computer program product including program code for carrying out the method in any one of clauses 1 to 29.

The fourth set of clauses describe certain features and aspects of the disclosed techniques listed in the previous section, including, for example, Example 3.a-b and 3.d.

1. A method of video processing, comprising: determining, for a conversion between a current video block of a video that is a chroma block and a coded representation of the video, parameters of a cross-component linear model that are completely determinable by two chroma samples and corresponding two luma samples; and performing the conversion based on the determining.

2. The method of clause 1, wherein the two chroma samples are denoted as C0 and C1, the corresponding luma samples are denoted as L0 and L1, the parameters of the cross-component linear model are denoted $\alpha$ and $\beta$, and $\alpha$ and $\beta$ are defined by equations: $a=(C1-C0)/(L1-L0)$ and $\beta=C0-\alpha\times L0$.

3. The method of clause 2, wherein if L1 is equal to L0, then $\alpha=0$.

4. The method of clause 2, wherein if L1 is equal to L0, other intra prediction mode than the cross-component linear model mode is used.

5. The method of clause 2, wherein a is determined by excluding a division operation.

6. The method of clause 2, wherein a is determined using an operation without a look up table, the operation excluding a division operation.

7. The method of clause 2, wherein the parameters of the cross-component linear model have values that are determined based on a value of (L1−L0).

8. The method of clause 2, wherein $\alpha=\text{Shift}(C1-C0, \text{Floor}(\log_2(L1-L0)))$, wherein $\text{Shift}(x, s)=(x+\text{off})>>s$ and off is an integer, wherein Floor(x) is a floor function that outputs an integer portion of x.

9. The method of clause 2, wherein $\alpha=\text{Shift}(C1-C0, \text{Ceiling}(\log_2(L1-L0)))$, wherein $\text{Shift}(x, s)=(x+\text{off})>>s$ and off is an integer, wherein Ceiling(x) is a ceiling function that outputs the least integer greater than or equal to x.

10. The method of clause 8 or 9, wherein an operation for obtaining a value of log 2(x) is performed by checking a position of a most significant digit of x.

11. The method of clause 1, wherein the determining of the parameters is performed within K bits, K being 8, 10, 12, 16, 24 or 32.

12. The method of clause 11, wherein an intermediate variable is clipped or right shifted to be within the K bits.

13. The method of any of clauses 1-12, wherein the performing of the conversion includes generating the coded representation from the current block.

14. The method of any of clauses 1-12, wherein the performing of the conversion includes generating the current block from the coded representation.

15. An apparatus in a video system comprising a processor and a non-transitory memory with instructions thereon, wherein the instructions upon execution by the processor, cause the processor to implement the method in any one of clauses 1 to 14.

16. A computer program product stored on a non-transitory computer readable media, the computer program product including program code for carrying out the method in any one of clauses 1 to 14.

The fifth set of clauses describe certain features and aspects of the disclosed techniques listed in the previous section, including, for example, Example 3.c.

1. A method of video processing, comprising: determining, for a conversion between a current video block of a video that is a chroma block and a coded representation of the video, parameters of a cross-component linear model using a parameter table whose entries are retrieved according to two chroma sample values and two luma sample values; and performing the conversion based on the determining.

2. The method of clause 1, wherein the parameter table has a size of V that is less than $2^P$, P being an integer.

3. The method of clause 1, wherein the parameter table has entries, each entry storing an F-bit integer number and F being 8 or 16.

4. The method of clause 1, wherein the parameter table M[k] satisfies $M[k-Z]=((1<<S)+\text{Off})/k$, S being an integer defining a precision, Off indicating an offset, Z being a first value of the parameter table.

5. The method of clause 1, wherein the two chroma samples are denoted as C0 and C1, the luma samples are denoted as L0 and L1, the parameters of the cross-component linear model are denoted $\alpha$ and $\beta$, and $\alpha$ and $\beta$ are defined by equations: $\alpha=(C1-C0)/(L1-L0)$ and $\beta=C0-\alpha\times L0$.

6. The method of clause 5, wherein $k=\text{Shift}(L1-L0, W)$ and k is used to inquire an entry in the parameter table, and wherein $\text{Shift}(x, s)\ (x+\text{off})>>s$, off is an integer, and W is an width of the current video block.

7. The method of clause 6, wherein $\alpha$ is zero when $k-Z<0$ or $k-Z\geq V$, V indicating a size of the parameter table and Z indicating a first value of the parameter table.

8. The method of clause 5, wherein $\alpha=\text{Shift}((C1-C0)\times M[k-Z],D)$ or $\alpha=\text{SignShift}((C1-C0)\times M[k-Z], D)$, and wherein $\text{Shift}(x, s)=(x+\text{off})>>s$ and $\text{SignShift}(x, s)=(x+\text{off})>>s$, if $x\geq 0$, or $-(-x+\text{off})>>s$, if $x<0$, off is an integer, and k indicating an index to inquire an entry in the parameter table.

9. The method of clause 8, wherein k is derived based on a value of (L1−L0) and not based on a value of (C1−C0).

10. The method of clause 8, wherein k is derived based on both values of (L1−L0) and (C1−C0).

11. The method of clause 6, wherein k is valid within a range between kMin and kMax.

12. The method of clause 8, wherein $k=\text{Shift}(L1-L0, W)$ and k is an index to inquire an entry in the parameter table, and wherein Shift(x, s) (x+off)>>s, off is an integer, and W is an width of the current video block.

13. The method of clause 8, wherein k is valid within a range between kMin and kMax, and k=L1−L0, if (L1−L0)<kMax and k=Shift (L1−L0, W) if (L1=L0)>kMax.

14. The method of clause 8, wherein k is valid within a range between kMin and kMax, and k=Min (kMax, L1−L0) or k=Max (kMin, Min (kMax, L1−L0)).

15. The method of clause 5, wherein (L1−L0)<0 and the determining is performed to derive a value of '−α' instead of α.

16. The method of clause 5, wherein (L1−L0)=0 and α is set to a default value that is 0 or 1.

17. The method of clause 5, wherein (L1−L0)=$2^E$, E≥0, α=Shift((C1−C0), E) or Singshift((C1−C0), E), and wherein Shift(x, s)=(x+off)>>s and SignShift (x, s)=(x+off)>>s, if x≥0, or −(−x+off)>>s, if x<0.

18. The method of any of clauses 1-17, wherein the performing of the conversion includes generating the coded representation from the current block.

19. The method of any of clauses 1-17, wherein the performing of the conversion includes generating the current block from the coded representation.

20. An apparatus in a video system comprising a processor and a non-transitory memory with instructions thereon, wherein the instructions upon execution by the processor, cause the processor to implement the method in any one of clauses 1 to 19.

21. A computer program product stored on a non-transitory computer readable media, the computer program product including program code for carrying out the method in any one of clauses 1 to 19.

The sixth set of clauses describe certain features and aspects of the disclosed techniques listed in the previous section, including, for example, Example 4 and Example 6.

1. A method of video processing, comprising: determining, for a conversion between a current video block of a video that is a chroma block and a coded representation of the video, a final prediction P(x, y) of a chroma sample at a position (x, y) in the current video block as a combination of prediction results of multiple cross-component linear models (MCCLMs), wherein the MCCLMs are selected based on the position (x, y) of the chroma sample; and performing the conversion based on the final prediction.

2. The method of clause 1, wherein the multiple cross-component linear models include a first linear model whose parameters are derived only from left-neighboring samples and a second linear model whose parameters are derived only from above-neighboring samples.

3. The method of clause 1, wherein some of the chroma samples are predicted based on left-neighboring samples only and some of the chroma samples are predicted based on above-neighboring samples only.

4. The method of clause 2 or 3, wherein the final prediction P (x, y) of the chroma sample is based on a weighted average of a prediction P1 (x, y) by the first linear model and a prediction P2(x, y) by the second linear model.

5. The method of clause 4, wherein P (x, y)=w1×P1(x, y)+w2×P2(x, y), wherein w1 and w2 are weights constrained by w1+w2=1.

6. The method of clause 4, wherein P (x, y)=(w1*P1(x, y)+w2*P2(x, y)+Offset)>>shift, where offset is an integer including 0 or 1<<(shift−1), shift is an integer, and w1 and w2 are weights constrained by w1+w2=1<<shift.

7. The method of clause 4, wherein P (x, y)=(w1*P1(x, y)+((1<<shift)−w1)*P2(x, y)+Offset)>>shift, where offset is an integer including 0 or 1<<(shift−1), shift is an integer, and w1 and w2 are weights.

8. The method of any of clauses 5-7, wherein values of w1 and w2 depend on the position (x, y).

9. The method of any of clauses 5-7, wherein if x>y, then w1<w2, wherein if x<y, then w1>w2, and wherein if x=y, then w1=w2.

10. The method of any of clauses 5-7, wherein, for a case of x<y, a value of (w1−w2) increases if a value of (y−x) increases.

11. The method of any of clauses 5-7, wherein, for a case of x>y, a value of (w2−w1) increases if a value of (x−y) increases.

12. A method of video processing, comprising: performing, for a conversion between a current video block of a video that is a chroma block and a coded representation of the video, a first determination regarding whether a first cross-component linear model (CCLM) that uses only left-neighboring samples is used for predicting samples of the current video block and/or a second determination regarding whether a second cross-component linear model (CCLM) that uses only above-neighboring samples is used for predicting samples of the current video block; and performing the conversion based on the first determination and/or the second determination.

13. The method of clause 12, wherein the first CCLM is not applied for a case that satisfies W>K×H, K being a non-negative integer.

14. The method of clause 12, wherein the second CCLM is not applied for a case that satisfies H>K×W, K being a non-negative integer.

15. The method of clause 12, wherein a flag indicating the application of the first CCLM or the second CCLM is not signaled for a case that one of the first CCLM and the second CCLM is not applied.

16. The method of any of clauses 1-15, wherein the performing of the conversion includes generating the coded representation from the current block.

17. The method of any of clauses 1-15, wherein the performing of the conversion includes generating the current block from the coded representation.

18. An apparatus in a video system comprising a processor and a non-transitory memory with instructions thereon, wherein the instructions upon execution by the processor, cause the processor to implement the method in any one of clauses 1 to 17.

19. A computer program product stored on a non-transitory computer readable media, the computer program product including program code for carrying out the method in any one of clauses 1 to 17.

The seventh set of clauses describe certain features and aspects of the disclosed techniques listed in the previous section, including, for example, Examples 7, 8, 11-13.

1. A method for video processing, comprising: determining, for a conversion between a current video block of a video and a coded representation of the video, a context that is used to code a flag using arithmetic coding in the coded representation of the current video block, wherein the context is based on whether a top-left neighboring block of the current video block is coded using a cross-component linear model (CCLM) prediction mode; and performing the conversion based on the determining.

2. The method of clause 1, wherein the context comprise a first context of the top-left neighboring block uses the CCLM prediction mode and comprises a second context different from the first context if the top-left neighboring block does not use the CCLM prediction mode.

3. The method of clause 1, wherein the top-left neighboring block is unavailable, and wherein the CCLM prediction mode is considered to be enabled.

4. The method of clause 1, wherein the top-left neighboring block is unavailable, and wherein the CCLM prediction mode is considered to be disabled.

5. The method of clause 1, wherein the top-left neighboring block is intra-coded, and wherein the CCLM prediction mode is considered to be enabled.

6. The method of clause 1, wherein the top-left neighboring block is intra-coded, and wherein the CCLM prediction mode is considered to be disabled.

7. A method of video processing, comprising: determining, for a conversion between a current video block of a video and a coded representation of the video, a coding order for one or more indications of a direct intra prediction mode (DM mode) and a linear intra prediction mode (LM mode) based on a coding mode of one or more neighboring blocks of the current video block; and performing the conversion based on the determining.

8. The method of clause 7, wherein a top-left neighboring block of the one or more neighboring blocks is coded with the LM mode, and wherein an indication of the LM mode is coded first.

9. The method of clause 7, wherein a top-left neighboring block of the one or more neighboring blocks is coded with the DM mode, and wherein an indication of the DM mode is coded first.

10. The method of clause 7, wherein a top-left neighboring block of the one or more neighboring blocks is coded with a coding mode that is different from the LM mode, and wherein an indication of the DM mode is coded first.

11. The method of any of clauses 7 to 10, wherein the one or more indications are signaled in a sequence parameter set (SPS), a video parameter set (VPS), a picture parameter set (PPS), a picture header, a slice header, a tile group header, one or more largest coding units or one or more coding units.

12. A method of video processing, comprising: determining, for a conversion between a current video block of a video and a coded representation of the video, parameters for a linear model prediction or cross-color component prediction based on refined chroma and luma samples of the current video block; and performing the conversion based on the determining.

13. The method of clause 12, wherein the chroma and luma samples are downsampled.

14. The method of clause 12, wherein the refinement process comprises a filtering process or a non-linear process.

15. The method of clause 12, wherein the parameters of the linear model prediction are $\alpha$ and $\beta$, wherein $\alpha=(C1-C0)(L1-L0)$ and $\beta=C0-\alpha L0$, wherein C0 and C1 are derived from chroma samples, and wherein L0 and L1 are derived from luma samples.

16. The method of clause 15, wherein the luma samples may be down-sampled before being used to derive L0 and L1.

17. The method of clause 15, wherein C0 and L0 are based on S chroma and luma samples, denoted $\{Cx1, Cx2, \ldots, CxS\}$ and $\{Lx1, Lx2, \ldots, LxS\}$, respectively, wherein C1 and L1 are based on T chroma and luma samples, denoted $\{Cy1, Cy2, \ldots, CyT\}$ and $\{Ly1, Ly2, \ldots, LyT\}$, respectively, wherein $\{Cx1, Cx2, \ldots, CxS\}$ are corresponding to $\{Lx1, Lx2, \ldots, LxS\}$, wherein $\{Cy1, Cy2, \ldots, CyT\}$ are corresponding to $\{Ly1, Ly2, \ldots, LyT\}$, wherein $C0=f0(Cx1, Cx2, \ldots, CxS)$, $L0=f1(Lx1, Lx2, \ldots, LxS)$, $C1=f2(Cy1, Cy2, \ldots, CyT)$ and $L1=f1(Ly1, Ly2, \ldots, LyT)$, and wherein $f0$, $f1$, $f2$ and 3 are functions.

18. The method of clause 17, wherein $f0$ and $f1$ are a first function.

19. The method of clause 17, wherein $f2$ and 3 are a second function.

20. The method of clause 18, wherein $f0$, $f1$, $f2$ and B are a third function.

21. The method of clause 20, wherein the third function is an averaging function.

22. The method of clause 17, wherein S=T.

23. The method of clause 17, wherein $\{Lx1, Lx2, \ldots, LxS\}$ are the smallest samples of a group of luma samples.

24. The method of clause 17, wherein $\{Ly1, Ly2, \ldots, LyT\}$ are the largest samples of a group of luma samples.

25. The method of clause 23 or 24, wherein the group of luma samples comprises all neighboring samples used in VTM-3.0 to derive the parameters of the linear model prediction.

26. The method of clause 23 or 24, wherein the group of luma samples comprises a subset of neighboring samples used in VTM-3.0 to derive the parameters of the linear model prediction, and wherein the subset is not identical to all the neighboring samples.

27. A method of video processing, comprising: determining, for a conversion between a current video block of a video that is a chroma block and a coded representation of the video, parameters for a linear model prediction or cross-color component prediction based on by selecting neighboring samples based on a position of a largest or a smallest neighboring sample; and performing the conversion based on the determining.

28. The method of clause 27, wherein the largest neighboring sample is located at a position (x0, y0), samples in a region (x0−d1, y0), (x0, y0−d2), (x0+d3, y0), (x0, y0+d4) are utilized to select the neighboring samples, and wherein{d1, d2, d3, d4} depend on the position (x0, y0).

29. The method of clause 27, wherein the smallest neighboring sample is located at a position (x1, y1), samples in a region (x1−d1, y1), (x1, y1−d2), (x1+d3, y1), (x1, y1+d4) are utilized to select the neighboring samples, and wherein{d1, d2, d3, d4} depend on the position (x1, y1).

30. The method of any of clauses 27-29, wherein the neighboring samples represent a color component.

31. A method of video processing, comprising: determining, for a conversion between a current video block of a video and a coded representation of the video, parameters for a linear model prediction or cross-color component prediction based on a main color component and a dependent color component, the main color component selected as one of a luma color component and a chroma color component and the dependent color component selected as the other of the luma color component and the chroma color component; and performing the conversion based on the determining.

32. The method of any of clauses 1-31, wherein the performing of the conversion includes generating the coded representation from the current block.

33. The method of any of clauses 1-31, wherein the performing of the conversion includes generating the current block from the coded representation.

34. An apparatus in a video system comprising a processor and a non-transitory memory with instructions thereon, wherein the instructions upon execution by the processor, cause the processor to implement the method in any one of clauses 1 to 33.

35. A computer program product stored on a non-transitory computer readable media, the computer program product including program code for carrying out the method in any one of clauses 1 to 33.

The eight set of clauses describe certain features and aspects of the disclosed techniques listed in the previous section, including, for example, Examples 10 and 14.

1. A method for video processing, comprising: performing downsampling on chroma and luma samples of a neighboring block of the current video block; determining, for a conversion between a current video block of a video that is a chroma block and a coded representation of the video, parameters of cross-component linear model (CCLM) based on the downsampled chroma and luma samples obtained from the downsampling; and performing the conversion based on the determining.

2. The method of clause 1, wherein the current video block has a height (H) and a width (W) and the downsampling is based on the height or the width.

3. The method of clause 1, wherein the downsampled chroma and luma samples are obtained before deriving the parameters of the CCLM including $\alpha$ and $\beta$, and wherein $\alpha$ and $\beta$ are defined by equations: $\alpha=(C1-C0)/(L1-L0)$ and $\beta=C0-\alpha L0$.

4. The method of clause 1, wherein the number of left-neighboring samples used to derive the parameters of CCLM is same as the number of above-neighboring samples used to derive the parameters of CCLM.

5. The method of clause 2, wherein $W<H$ or $W>H$.

6. The method of clause 2, wherein whether to downsample the chroma and luma samples of a left-neighboring block or an above-neighboring block depends on a relative size of W and H.

7. The method of clause 6, wherein the downsampling is performed on the chroma and luma samples of a left-neighboring block in a case of $H>W$.

8. The method of clause 6, wherein the downsampling is performed on the chroma and luma samples of an above-neighboring block in a case of $W>H$.

9. The method of clause 7, wherein a top-left sample of the current video block is R[0, 0], wherein the downsampled chroma samples comprise samples $R[-1, K\times H/W]$, and wherein K is a non-negative integer ranging from 0 to $W-1$.

10. The method of clause 8, wherein a top-left sample of the current video block is R[0, 0], wherein the downsampled chroma samples comprise samples $R[K\times H/W, -1]$, and wherein K is a non-negative integer ranging from 0 to $H-1$.

11. A method of video processing, comprising: determining, for a conversion between a current video block of a video that is a chroma block and a coded representation of the video, parameters of a cross-component linear model (CCLM) based on two or more chroma samples from a group of neighboring chroma samples, wherein the two or more chroma samples are selected based on a coding mode of the current video block; and performing the conversion based on the determining.

12. The method of clause 11, wherein two or more luma samples corresponding to the two or more chroma samples are used to derive the parameters of the cross-component linear model.

13. The method of clause 12, wherein the two or more luma samples are downsampled to derive the parameters of the cross-component linear model.

14. The method of clause 11, wherein the two or more chroma samples are selected based on availabilities of neighboring samples.

15. The method of clause 11, wherein the two or more chroma samples are selected from one or more of a left column, an above row, an above-right row or a below-left column relative to the current video block.

16. The method of clause 11, wherein the two or more chroma samples are selected based on a ratio of a height of the current video block to a width of the current video block.

17. The method of clause 11, wherein the two or more chroma samples are selected based on whether a width or a height of the current video block is equal to K, K being an integer.

18. The method of clause 17, wherein $K=2$.

19. The method of clause 11, wherein the coding mode of the current video block is a first linear mode that is different from a second linear mode that uses only left-neighboring samples and a third linear mode that uses only above-neighboring samples, wherein coordinates of a top-left sample of the current video block are (x, y), and wherein a width and a height of the current video block is W and H, respectively.

20. The method of clause 19, wherein the two or more chroma samples comprise samples with coordinates $(x-1, y)$, $(x, y-1)$, $(x-1, y+H-1)$ and $(x+W-1, y-1)$.

21. The method of clause 19, wherein the two or more chroma samples comprise samples with coordinates $(x-1, y)$, $(x, y-1)$, $(x-1, y+H-H/W-1)$ and $(x+W-1, y-1)$, and wherein $H>W$.

22. The method of clause 19, wherein the two or more chroma samples comprise samples with coordinates $(x-1, y)$, $(x, y-1)$, $(x-1, y+H-1)$ and $(x+W-W/H-1, y-1)$, and wherein $H<W$.

23. The method of clause 19, wherein the two or more chroma samples comprise samples with coordinates $(x-1, y)$, $(x, y-1)$, $(x-1, y+H-\max(1, H/W))$ and $(x+W-\max(1, W/H), y-1)$.

24. The method of clause 19, wherein the two or more chroma samples comprise samples with coordinates $(x, y-1)$, $(x+W/4, y-1)$, $(x+2*W/4, y-1)$ and $(x+3*W/4, y-1)$.

25. The method of clause 19, wherein the two or more chroma samples comprise samples with coordinates $(x, y-1)$, $(x+W/4, y-1)$, $(x+3*W/4, y-1)$ and $(x+W-1, y-1)$.

26. The method of clause 19, wherein the two or more chroma samples comprise samples with coordinates $(x, y-1)$, $(x+(2W)/4, y-1)$, $(x+2*(2W)/4, y-1)$ and $(x+3*(2W)/4, y-1)$.

27. The method of clause 19, wherein the two or more chroma samples comprise samples with coordinates $(x, y-1)$, $(x+(2W)/4, y-1)$, $(x+3*(2W)/4, y-1)$ and $(x+(2W)-1, y-1)$.

28. The method of clause 19, wherein the two or more chroma samples comprise samples with coordinates $(x-1, y)$, $(x-1, y+H/4)$, $(x-1, y+2*H/4)$ and $(x-1, y+3*H/4)$.

29. The method of clause 19, wherein the two or more chroma samples comprise samples with coordinates $(x-1, y)$, $(x-1, y+2*H/4)$, $(x-1, y+3*H/4)$ and $(x-1, y+H-1)$.

30. The method of clause 19, wherein the two or more chroma samples comprise samples with coordinates $(x-1, y)$, $(x-1, y+(2H)/4)$, $(x-1, y+2*(2H)/4)$ and $(x-1, y+3*(2H)/4)$.

31. The method of clause 19, wherein the two or more chroma samples comprise samples with coordinates $(x-1, y)$, $(x-1, y+2*(2H)/4)$, $(x-1, y+3*(2H)/4)$ and $(x-1, y+(2H)-1)$.

32. The method of any of clauses 20 to 31, wherein exactly two samples are selected to determine the parameters of the CCLM.

33. The method of any of clauses 1-32, wherein the performing of the conversion includes generating the coded representation from the current block.

34. The method of any of clauses 1-32, wherein the performing of the conversion includes generating the current block from the coded representation.

35. An apparatus in a video system comprising a processor and a non-transitory memory with instructions thereon, wherein the instructions upon execution by the processor, cause the processor to implement the method in any one of clauses 1 to 34.

36. A computer program product stored on a non-transitory computer readable media, the computer program product including program code for carrying out the method in any one of clauses 1 to 34.

The ninth set of clauses describe certain features and aspects of the disclosed techniques listed in the previous section, including, for example, Examples 16 and 17.

1. A method for video processing, comprising: determining, for a conversion between a current video block of a video that is a chroma block and a coded representation of the video, parameters of cross-component linear model (CCLM) based on chroma samples that are selected based on W available above-neighboring samples, W being an integer; and performing the conversion based on the determining.

2. The method of clause 1, wherein W is set to i) a width of the current video block, ii) L times the width of the current video block, L being an integer, iii) a sum of a height of the current video block and a width of the current video block, or iv) a sum of the width of the current video block and the number of available top-right neighboring samples.

3. The method of clause 1, wherein W depends on an availability of at least one of an above-neighboring block or a left-neighboring block of the current video block.

4. The method of clause 1, wherein W depends on a coding mode of the current video block.

5. The method of clause 2, wherein L has a value depending on an availability of a top-right block or a top left sample that is located adjacent to the current video block.

6. The method of clause 1, wherein the chroma samples are selected based on a first position offset value (F) and a step value (S) that depend on W.

7. The method of clause 6, wherein a top left sample has a coordinate (x0, y0) and the selected chroma samples have coordinates (x0+F+K×S, y0−1), K being an integer between 0 and kMax.

8. The method of clause 6, wherein F=W/P or F=W/P+offset, P being an integer.

9. The method of clause 8, wherein F=W>>(2+numIs4T), wherein numIs4T is equal to 1 in a case that there are four neighboring samples selected within an above neighboring row and otherwise numIs4T is equal to 0.

10. The method of clause 6, wherein S=W/Q, Q being an integer.

11. The method of clause 6, wherein S is not less than 1.

12. The method of clause 10 or 11, wherein S=Max(1, W>>(1+numIs4T)), wherein numIs4T is equal to 1 in a case that there are four neighboring samples selected within an above neighboring row and otherwise numIs4T is equal to 0.

13. The method of clause 9 or 12, wherein numIs4T is equal to 1 in a case that above neighboring samples are available, left neighboring samples are available, and the current video block is coded with a normal CCLM that is different from a first CCLM using only left-neighboring samples, and different from a second CCLM using only above-neighboring samples.

14. The method of clause 6, wherein F=S/R, R being an integer.

15. The method of clause 6, wherein S=F/Z, Z being an integer.

16. The method of any of clauses 7-15, wherein at least one of Kmax, F, S, or offset depends on a prediction mode of the current video block that is one of a first CCLM using only left-neighboring samples, a second CCLM using only above-neighboring samples, a third CCLM using both left-neighboring and above-neighboring samples, or other modes that are different from the first CCLM, the second CCLM, and the third CCLM.

17. The method of any of clauses 7-15, wherein at least one of Kmax, F, S, or offset depends on a width and/or a height of the current video block.

18. The method of any of clauses 7-15, wherein at least one of Kmax, F, S, or offset depends on availabilities of neighboring samples.

19. The method of any of clauses 7-15, wherein at least one of Kmax, F, S, or offset depends on W.

20. A method for video processing, comprising: determining, for a conversion between a current video block of a video that is a chroma block and a coded representation of the video, parameters of cross-component linear model (CCLM) based on chroma samples that are selected based on H available left-neighboring samples of the current video block; and performing the conversion based on the determining.

21. The method of clause 20, wherein H is set to one of i) a height of the current video block, ii) L times the height of the current video block, L being an integer, iii) a sum of a height of the current video block and a width of the current video block, or iv) a sum of the height of the current video block and the number of available left-bottom neighboring samples..

22. The method of claim 20, wherein H depends on an availability of at least one of an above-neighboring block or a left-neighboring block of the current video block.

23. The method of clause 20, wherein H depends on a coding mode of the current video block.

24. The method of clause 21, wherein L has a value depending on an availability of a below-left block or a below-left sample that is located adjacent to the current video block.

25. The method of clause 20, wherein the chroma samples are selected based on a first position offset value (F) and a step value (S) that depend on H.

26. The method of clause 25, wherein a top-left sample has a coordinate (x0, y0) and the selected chroma samples have coordinates (x0−1, y0+F+K×S), K being an integer between 0 and kMax.

27. The method of clause 25, wherein F=H/P or F=H/P+offset, P being an integer.

28. The method of clause 27, wherein F=H>>(2+numIs4L), wherein numIs4L is equal to 1 in a case that there is four neighboring samples selected within the left neighboring column; otherwise it is equal to 0.

29. The method of clause 25, wherein S=H/Q, Q being an integer.

30. The method of clause 25, wherein S is not less than 1.

31. The method of clause 29 or 30, wherein S=Max(1, H>>(1+numIs4L)), wherein numIs4L is equal to 1 in a case that there are four neighboring samples selected within a left neighboring column and otherwise numIs4L is equal to 0.

32. The method of clause 28 or 31, wherein numIs4L is equal to 1 in a case that above neighboring samples are available, left neighboring samples are available, and the current video block is coded with a normal CCLM that is different from a first CCLM using only left-neighboring samples, and different from a second CCLM using only above-neighboring samples.

33. The method of clause 25, wherein F=S/R, R being an integer.

34. The method of clause 25, wherein S=F/Z, Z being an integer.

35. The method of any of clauses 26-34, wherein at least one of Kmax, F, S, or offset depends on a prediction mode of the current video block that is one of a first CCLM using only left-neighboring samples, a second CCLM using only above-neighboring samples, a third CCLM using both left-neighboring and above-neighboring samples, or other modes that are different from the first CCLM, the second CCLM, and the third CCLM.

36. The method of any of clauses 26-34, wherein at least one of Kmax, F, S, or offset depends on a width and/or a height of the current video block.

37. The method of any of clauses 26-34, wherein at least one of Kmax, F, S, or offset depends on H.

38. The method of any of clauses 26-34, wherein at least one of Kmax, F, S, or offset depends on availabilities of neighboring samples.

39. The method of clause 20, wherein H is set to a sum of the height of the current video block and a width of the current video block in a case that an above-right neighboring block of the current video block is available.

40. The method of clause 20, wherein in a case that left neighboring samples are unavailable, the selected chroma samples have the height H regardless of whether the current video block has a first CCLM using only above-neighboring samples or not.

41. The method of clause 1, wherein W is set to a sum of the height of the current video block and a width of the current video block in a case that a below-left neighboring block of the current video block is available.

42. The method of clause 1, wherein in a case that above neighboring samples are unavailable, the selected chroma samples have the number of W regardless of whether the current video block has a first CCLM using only left-neighboring samples or not.

43. The method of any of clauses 1-42, wherein the performing of the conversion includes generating the coded representation from the current block.

44. The method of any of clauses 1-42, wherein the performing of the conversion includes generating the current block from the coded representation.

45. An apparatus in a video system comprising a processor and a non-transitory memory with instructions thereon, wherein the instructions upon execution by the processor, cause the processor to implement the method in any one of clauses 1 to 44.

46. A computer program product stored on a non-transitory computer readable media, the computer program product including program code for carrying out the method in any one of clauses 1 to 44.

The tenth set of clauses describe certain features and aspects of the disclosed techniques listed in the previous section, including, for example, Examples 18 and 19.

1. A method for video processing, comprising: determining, for a conversion between a current video block of a video that is a chroma block and a coded representation of the video, parameters of a cross-component linear model (CCLM) based on two or four chroma samples and/or corresponding luma samples; and performing the conversion based on the determining.

2. The method of clause 1, wherein the corresponding luma samples are obtained by down-sampling.

3. The method of clause 1, wherein the parameters of the CCLM includes maxY/maxC and minY/minC.

4. The method of clause 3, wherein the two chroma samples are selected to derive maxY/maxC and minY/minC, and wherein minY is set to be the smaller luma sample value, minC is its corresponding chroma sample value, maxY is set to be the larger luma sample value, and maxC is its corresponding chroma sample value.

5. The method of clause 3, wherein the four chroma samples are selected to derive maxY/maxC and minY/minC, and wherein the four chroma samples and the corresponding luma samples are divided into two arrays G0 and G1, each array including two chroma samples and their corresponding luma samples.

6. The method of clause 5, wherein the two arrays G0 and G1 include one of following sets:

i) G0={S0, S1}, G1={S2, S3},
ii) G0={S1, S0}, G1={S3, S2},
iii) G0={S0, S2}, G1={S1, S3},
iv) G0={S2, S0}, G1={S3, S1},
v) G0={S1, S2}, G1={S0, S3},
vi) G0={S2, S1}, G1={S3, S0},
vii) G0={S0, S3}, G1={S1, S2},
viii) G0={S3, S0}, G1={S2, S1},
ix) G0={S1, S3}, G1={S0, S2},
x) G0={S3, S1}, G1={S2, S0},
xi) G0={S3, S2}, G1={S0, S1}, or
xii) G0={S2, S3}, G1={S1, S0}, and wherein S0, S1, S2, S3 include the four chroma samples, respectively, and further includes corresponding luma samples, respectively.

7. The method of clause 6, wherein upon a comparison of two luma sample values of G0[0] and G0[1], a chroma sample and its corresponding luma sample of G0[0] are swamped with those of G0[1].

8. The method of clause 7, wherein the chroma sample and its corresponding luma sample of G0[0] are swamped with those of G0[1] in a case that a luma sample value of G0[0] is greater than a luma sample value of G0[1].

9. The method of clause 6, wherein upon a comparison of two luma sample values of G1[0] and G1[1], a chroma sample and its corresponding luma sample of G1[0] are swamped with those of G1[1].

10. The method of clause 9, wherein the chroma sample and its corresponding luma sample of G1[0] are swamped with those of G1[1] in a case that a luma sample value of G1[0] is greater than a luma sample value of G1[1].

11. The method of clause 6, wherein upon a comparison of two luma sample values of G0[0] and G1[1], chroma samples and its corresponding luma samples of G0[0] or G0[1] are swamped with those of G1[0] or G1[1].

12. The method of clause 11, wherein the chroma samples and its corresponding luma samples of G0[0] or G0[1] are swamped with those of G1[0] or G1[1] in a case that a luma sample value of G0[0] is greater than a luma sample value of G1[1].

13. The method of clause 6, wherein upon a comparison of two luma sample values of G0[1] and G1[0], a chroma sample and its corresponding luma sample of G0[1] are swamped with those of G1[0].

14. The method of clause 13, wherein the chroma sample and its corresponding luma sample of G0[1] are swamped with those of G1[0] in a case that a luma sample value of G0[1] is greater than a luma sample value of G1[0].

15. The method of clause 6, wherein upon a comparison of two luma sample values of G0[0], G0[1], G1[0], and G1[1], following swamping operations are conducted in an order: i) a swamping operation of a chroma sample and its corresponding luma sample of G0[0] with those of G0[1], ii) a swamping operation of a chroma sample and its corresponding luma sample of G1[0] with those of G1[1], iii) a swamping operation of chroma samples and its corresponding luma samples of G0[0] or G0[1] with those of G1[0] or G1[1], and iv) a swamping operation of a chroma sample and its corresponding luma sample of G0[1] with those of G1[0].

16. The method of clause 6, wherein maxY is calculated as an average of luma sample values of G0[0] and G0[1] or an average of luma sample values of G1[0] and G1[1], and maxC is calculated as an average of chroma sample values of G0[0] and G0[1] or an average of chroma sample values of G1[0] and G1[1].

17. The method of clause 6, wherein minY is calculated as an average of luma sample values of G0[0] and G0[1] or an average of luma sample values of G1[0] and G1[1], and minC is calculated as an average of chroma sample values of G0[0] and G0[1] or an average of chroma sample values of G1[0] and G1[1].

18. The method of clause 16 or 17, wherein the calculations of maxY and maxC or the calculations of minY and minC are conducted after any one of swamping operations that are performed upon a comparison of two luma sample values of G0[0], G0[1], G1[0] and G1[1], wherein the swamping operations includes: i) a swamping operation of chroma sample and its corresponding luma sample of G1[0] with those of G1[1], ii) a swamping operation of chroma samples and its corresponding luma samples of G0[0] or G0[1] with those of G1[0] or G1[1], and iii) a swamping operation of a chroma sample and its corresponding luma sample of G0[1] with those of G1[0].

19. The method of clause 1, wherein in a case that there are only two chroma samples are available, a padding is performed on the two available chroma samples to provide the four chroma samples.

20. The method of clause 19, wherein the four chroma samples include the two available chroma samples and two padding chroma samples that are copied from the two available chroma samples.

21. The method of clause 6, wherein S0, S1, S2, S3 are chroma samples and corresponding luma samples are selected in a given order within an above row and/or a left column of the current video block.

22. A method for video processing, comprising: selecting, for a conversion between a current video block of a video that is a chroma block and a coded representation of the video, chroma samples based on a position rule, the chroma samples used to derive parameters of a cross-component linear model (CCLM); and performing the conversion based on the determining, wherein the position rule specifies to select the chroma samples that are located within an above row and/or a left column of the current video block.

23. The method of clause 22, wherein the above row and the left column have W samples and H samples, respectively, W and H being a width and a height of the current video block, respectively.

24. The method of clause 22, wherein the position rule is applied for the current video block coded with a normal CCLM mode that is different from a first CCLM mode that uses only above-neighboring samples to derive the CCLM and from a second CCLM mode that uses only left-neighboring samples to derive the CCLM.

25. The method of clause 22, wherein the position rule specifies to select the chroma samples that are located within the above row and an above-right row of the current video block, and wherein the above row and the above-right row have W samples and H samples, respectively, W and H being a width and a height of the current video block, respectively.

26. The method of clause 25, wherein only available samples within the above row and the above-right row are selected.

27. The method of clause 25, wherein the position rule is applied for the current video block coded with a first CCLM mode that uses only above-neighboring samples to derive the CCLM.

28. The method of clause 25, wherein the position rule is applied to a case that the above-row is available and the left column is unavailable and that the current video block is coded with a normal CCLM mode that is different from a first CCLM mode that uses only above-neighboring samples to derive the CCLM and from a second CCLM mode that uses only left-neighboring samples to derive the CCLM.

29. The method of any of clauses 23-28, wherein numSampT is set based on a rule specifying that numSampT is set equal to nTbW in a case that above neighboring samples are available and numSampT is set equal to 0 in a case that the above neighboring samples are not available, and wherein numSampT represents the number of chroma samples within an above neighboring row used to derive the parameters of a cross-component linear model and nTbW represents an width of the current video block.

30. The method of clause 29, wherein the rule is applied for the current video block coded with a normal CCLM mode that is different from a first CCLM mode that uses only above-neighboring samples to derive the CCLM and from a second CCLM mode that uses only left-neighboring samples to derive the CCLM.

31. The method of any of clauses 23-28, wherein numSampT is set based on a rule specifying that numSampT is set equal to nTbW+Min(numTopRight, nTbH) in a case that above neighboring samples are available and the current video block is coded with a first CCLM mode that uses only above-neighboring samples to derive the CCLM, and that otherwise the numSampT is set equal to 0, and wherein numSampT represents the number of chroma samples within an above neighboring row used to derive the parameters of the cross-component linear model, nTbW and nTbH represent a width and a height of the current block, respectively, and numTopRight represents the number of available top right neighboring samples.

32. The method of clause 31, wherein the rule is applied for the current video block not coded with a normal CCLM mode that is different from a first CCLM mode that uses only above-neighboring samples to derive the CCLM and from a second CCLM mode that uses only left-neighboring samples to derive the CCLM.

33. The method of clause 22, wherein the position rule specifies to select the chroma samples that are located within the left column and a below-left column of the current video block, and wherein the left column and the below-left column have H samples and W samples, respectively, W and H being a width and a height of the current video block, respectively.

34. The method of clause 33, wherein only available samples within the left column and the below-left column are selected.

35. The method of claim 33, wherein the position rule is applied for the current video block coded with a second CCLM mode that uses only left-neighboring samples to derive the CCLM.

36. The method of clause 33, wherein the position rule is applied to a case that the above-row is unavailable and the left-column is available and that the current video block is coded with a normal CCLM mode that is different from a first CCLM mode that uses only above-neighboring samples to derive the CCLM and from a second CCLM mode that uses only left-neighboring samples to derive the CCLM.

37. The method of any of clauses 33-36, wherein numSampL is set based on a rule specifying that numSampL is set equal to nTbH in a case that left neighboring samples are available and otherwise numSampL is set equal to 0, and wherein numSampL represents the number of chroma samples within a left neighbouring column used to derive parameters of the cross-component linear model and nTbH represents a height of the current video block.

38. The method of clause 37, wherein the rule is applied for the current video block coded with a normal CCLM mode that is different from a first CCLM mode that uses only above-neighboring samples to derive the CCLM and from a second CCLM mode that uses only left-neighboring samples to derive the CCLM.

39. The method of any of clauses 33-36, wherein numSampL is set based on a rule specifying that numSampL is set equal to nTbH+Min(numLeftBelow, nTbW) in a case that left neighbouring samples are available and the current video block is coded with a second CCLM mode that uses only left-neighboring samples to derive the CCLM and that otherwise numSampL is set equal to 0, and wherein numSampL represents the number of chroma samples within a left neighboring column used to derive the parameters of the cross-component linear model, nTbW and nTbH represent a width and a height of the current block, respectively, and numLeftBelow represents the number of available below-left neighboring samples.

40. The method of clause 39, wherein the rule is applied for the current video block not coded with a normal CCLM mode that is different from a first CCLM mode that uses only above-neighboring samples to derive the CCLM and from a second CCLM mode that uses only left-neighboring samples to derive the CCLM.

41. The method of any of clauses 22-40, wherein luma samples corresponding to selected chroma samples are used to derive the parameters of the cross-component linear model.

42. The method of clause 41, wherein the luma samples are derived by downsampling.

43. The method of any of clauses 1-42, wherein the performing of the conversion includes generating the coded representation from the current block.

44. The method of any of clauses 1-42, wherein the performing of the conversion includes generating the current block from the coded representation.

45. An apparatus in a video system comprising a processor and a non-transitory memory with instructions thereon, wherein the instructions upon execution by the processor, cause the processor to implement the method in any one of clauses 1 to 44.

46. A computer program product stored on a non-transitory computer readable media, the computer program product including program code for carrying out the method in any one of clauses 1 to 44.

The eleventh set of clauses describe certain features and aspects of the disclosed techniques listed in the previous section, including, for example, Examples 20, 21, 22.

1. A method for video processing, comprising: determining, for a conversion between a current video block of a video that is a chroma block and a coded representation of the video, positions at which luma samples are downsampled, wherein the downsampled luma samples are used to determine parameters of a cross-component linear model (CCLM) based on chroma samples and downsampled luma samples, wherein the downsampled luma samples are at positions corresponding to positions of the chroma samples that are used to derive the parameters of the CCLM; and performing the conversion based on the determining.

2. A method of clause 1, wherein luma samples are not downsampled at a position which is out of the current video block and is not used to determine the parameters of the CCLM.

3. A method for video processing, comprising: determining, for a conversion between a current video block of a video that is a chroma block and a coded representation of the video, a method to derive parameters of a cross-component linear model (CCLM) using chroma samples and luma samples based on a coding condition associated with the current video block; and performing the conversion based on the determining.

4. The method of clause 3, wherein the coding condition corresponds to a color format of the current video block.

5. The method of clause 4, wherein the color format is 4:2:0 or 4:4:4.

6. The method of clause 3, wherein coding condition corresponds to a color representation method of the current video block.

7. The method of clause 6, wherein the color representation method is a RGB or YCbCr.

8. The method of clause 3, wherein the chroma samples are downsampled and the determining depends on locations of downsampled chroma samples.

9. The method of clause 3, wherein the method to derive parameters comprises determining the parameters of the CCLM based on the chroma samples and the luma samples that are selected from a group of neighboring chroma samples based on a position rule.

10. The method of clause 3, wherein the method to derive parameters comprises determining the parameters of the CCLM based on maximum and minimum values of the chroma samples and the luma samples.

11. The method of clause 3, wherein the method to derive parameters comprises determining the parameters of the CCLM that are completely determinable by two chroma samples and corresponding two luma samples.

12. The method of clause 3, wherein the method to derive parameters comprises determining the parameters of the CCLM using a parameter table whose entries are retrieved according to two chroma sample values and two luma sample values.

13. A method for video processing, comprising: determining, for a conversion between a current video block of a video that is a chroma block and a coded representation of the video, whether to derive maximum values and/or minimum values of a luma component and a chroma component that are used to derive parameters of a cross-component linear model (CCLM) based on availability of a left-neighboring block and an above-neighboring block of the current video block; and performing the conversion based on the determining.

14. The method of clause 13, wherein the maximum values and/or the minimum values are not derived in a case that the left-neighboring block and the above-neighboring block are unavailable.

15. The method of clause 13, wherein the determining determines based on a number of available neighboring samples of the current video block, and wherein the available neighboring samples are used to derive the parameters of the cross-component linear model.

16. The method of clause 15, wherein the maximum values and/or the minimum values are not derived in a case of numSampL==0 and numSampT==0, the numSampL and the numSampT indicating a number of available neighboring samples from the left-neighboring block and a number of available neighboring samples from the above-neighboring block, respectively, and wherein the available neighboring samples from the left-neighboring block and the available neighboring samples from the above-neighboring bock are used to derive the parameters of the cross-component linear model.

17. The method of clause 15, wherein the maximum values and/or the minimum values are not derived in a case of numSampL+numSampT==0, the numSampL and the numSampT indicating a number of available neighboring samples from the left-neighboring block and a number of available neighboring samples from the above-neighboring block, respectively, and wherein the available neighboring samples from the left-neighboring block and the available neighboring samples from the above-neighboring bock are used to derive the parameters of the cross-component linear model.

18. The method of any of clauses 1-17, wherein the performing of the conversion includes generating the coded representation from the current block.

19. The method of any of clauses 1-17, wherein the performing of the conversion includes generating the current block from the coded representation.

20. An apparatus in a video system comprising a processor and a non-transitory memory with instructions thereon, wherein the instructions upon execution by the processor, cause the processor to implement the method in any one of clauses 1 to 19.

21. A computer program product stored on a non-transitory computer readable media, the computer program product including program code for carrying out the method in any one of clauses 1 to 19.

The twelfth set of clauses describe certain features and aspects of the disclosed techniques listed in the previous section, including, for example, Example 23.

1. A method for video processing, comprising: determining, for a conversion between a current video block of a video and a coded representation of the video, parameters of a coding tool using a linear model based on selected neighboring samples of the current video block and corresponding neighboring samples of a reference block; and performing the conversion based on the determining.

2. The method of clause 1, wherein the coding tool is a local illumination compensation (LIC) tool that includes using a linear model of illumination changes in the current video block during the conversion.

3. The method of clause 2, wherein the neighboring samples of the current video block and the neighboring samples of the reference block are selected based on a position rule.

4. The method of clause 2, wherein the parameters of the coding tool are determined based on maximum and minimum values of the neighboring samples of the current video block and the neighboring samples of the reference block.

5. The method of clause 2, wherein the parameters of the coding tool are determined using a parameter table whose entries are retrieved according to two neighboring samples of the current video block and two neighboring samples of the reference block.

6. The method of clause 2, wherein the neighboring samples of the current video block and the neighboring samples of the reference block are downsampled to derive the parameters of the coding tool.

7. The method of clause 2, wherein the neighboring samples used to derive parameters of the LIC tool excludes samples at certain positions in an above row and/or a left column of the current video block.

8. The method of clause 2, wherein a top-left sample of the current video block has coordinates with (x0, y0), a sample with coordinates (x0, y0−1) is not used to derive parameters of the LIC tool.

9. The method of clause 2, wherein a top-left sample of the current video block has coordinates with (x0, y0), a sample with coordinates (x0−1, y0) is not used to derive parameters of the LIC tool.

10. The method of clause 7, wherein the certain positions depend on an availability of the above row and/or the left column.

11. The method of clause 7, wherein the certain positions depend on a block dimension of the current video block.

12. The method of clause 1, wherein the determining depends on an availability of the above row and/or the left column.

13. The method of clause 2, wherein N neighboring samples of the current video block and N neighboring samples of the reference block are used to derive the parameters of the LIC tool.

14. The method of clause 13, wherein N is 4.

15. The method of clause 13, wherein N neighboring samples of the current video block includes N/2 samples from an above row of the current video block and N/2 samples from a left column of the current video block.

16. The method of clause 13, wherein N is equal to min (L, T), T being a total number of available neighboring samples of the current video block and L being an integer.

17. The method of clause 13, wherein the N neighboring samples are selected based on a same rule that is applicable to select samples to derive parameters of the CCLM.

18. The method of clause 13, wherein N neighboring samples are selected based on a same rule that is applicable to select samples to derive parameters of a first mode of the CCLM that uses above-neighboring samples only.

19. The method of clause 13, wherein N neighboring samples are selected based on a same rule that is applicable to select samples to derive parameters of a second mode of the CCLM that uses left-neighboring samples only.

20. The method of clause 13, wherein the N neighboring samples of the current video block are selected based on availabilities of an above row or a left column of the current video block.

21. A method for video processing, comprising: determining, for a conversion between a current video block of a video and a coded representation of the video, parameters of a local illumination compensation (LIC) tool based on N neighboring samples of the current video block and N corresponding neighboring samples of a reference block, wherein the N neighboring samples of the current video block are selected based on positions of the N neighboring samples; and performing the conversion based on the determining, wherein the LIC tool uses a linear model of illumination changes in the current video block during the conversion.

22. The method of clause 21, wherein the N neighboring samples of the current video block are selected based on a width and a height of the current video block.

23. The method of clause 21, wherein the N neighboring samples of the current video block are selected based on availabilities of neighboring blocks of the current video block.

24. The method of claim 21, wherein the N neighboring samples of the current video block are selected with a first position offset value (F) and a step value (S) that depend on a dimension of the current video block and availabilities of neighboring blocks.

25. The method of any of clauses 1-24, wherein the current video block is affine-coded.

26. A method for video processing, comprising: determining, for a conversion between a current video block of a video that is a chroma block and a coded representation of the video, parameters of a cross-component linear model (CCLM) based on chroma samples and corresponding luma samples; and performing the conversion based on the determining, wherein some of the chroma samples are obtained by a padding operation and the chroma samples and the corresponding luma samples are grouped into two arrays G0 and G1, each array including two chroma samples and corresponding luma samples.

27. The method of clause 26, wherein in a case that a sum of cntT and cntL is equal to 2, following operations are performed in an order: i) pSelComp[3] is set equal to pSelComp[0], ii) pSelComp[2] is set equal to pSelComp[1], iii) pSelComp[0] is set equal to pSelComp[1], and iv) pSelComp[1] is set equal to pSelComp[3], wherein cntT and cntL indicate the number of samples selected from an above neighboring block and a left neighboring block, respectively, and wherein pSelComp[0] to pSelComp[3] indicate pixel values of color components of corresponding samples that are selected.

28. The method of clause 26, wherein the determining of the parameters includes initializing values of G0[0], G0[1], G1[0], and G1[1].

29. The method of clause 28, wherein G0[0]=0, G0[1]=2, G1[0]=1, and G1[1]=3.

30. The method of clause 28, wherein the determining of the parameters further includes, after the initializing of the values, upon a comparison of two luma sample values of G0[0] and G0[1], swamping a chroma sample and its corresponding luma sample of G0[0] with those of G0[1].

31. The method of clause 30, wherein a chroma sample and its corresponding luma sample of G0[0] are swamped with those of G0[1] in a case that a luma sample value of G0[0] is greater than a luma sample value of G0[1].

32. The method of clause 28, wherein the determining of the parameters further includes, after the initializing of the values, upon a comparison of two luma sample values of G1[0] and G1[1], swamping a chroma sample and its corresponding luma sample of G1[0] with those of G1[1].

33. The method of clause 32, wherein a chroma sample and its corresponding luma sample of G1[0] are swamped with those of G1[1] in a case that a luma sample value of G1[0] is greater than a luma sample value of G1[1].

34. The method of clause 28, wherein the determining of the parameters further includes, after the initializing of the values, upon a comparison of two luma sample values of G0[0] and G1[1], swamping chroma samples and its corresponding luma samples of G0[0] or G0[1] with those of G1[0] or G1[1].

35. The method of clause 34, wherein chroma samples and its corresponding luma samples of G0[0] or G0[1] are swamped with those of G1[0] or G1[1] in a case that a luma sample value of G0[0] is greater than a luma sample value of G1[1].

36. The method of clause 28, wherein the determining of the parameters further includes, after the initializing of the values, upon a comparison of two luma sample values of G0[1] and G1[0], swamping a chroma sample and its corresponding luma sample of G0[1] with those of G1[0].

37. The method of clause 36, wherein a chroma sample and its corresponding luma sample of G0[1] are swamped with those of G1[0] in a case that a luma sample value of G0[1] is greater than a luma sample value of G1[0].

38. The method of clause 28, wherein the determining of the parameters further includes, after the initializing of the values, upon a comparison of two luma sample values of G0[0], G0[1], G1[0], and G1[1], performing following swamping operations in an order: i) a swamping operation of chroma sample and its corresponding luma sample of G0[0] with those of G0[1], ii) a swamping operation of chroma sample and its corresponding luma sample of G1[0] with those of G1[1], iii) a swamping operation of chroma samples and its corresponding luma samples of G0[0] or G0[1] with those of G1[0] or G1[1], and iv) a swamping operation of a chroma sample and its corresponding luma sample of G0[1] with those of G1[0].

39. The method of any of clauses 1-38, wherein the performing of the conversion includes generating the coded representation from the current block.

40. The method of any of clauses 1-38, wherein the performing of the conversion includes generating the current block from the coded representation.

41. An apparatus in a video system comprising a processor and a non-transitory memory with instructions thereon, wherein the instructions upon execution by the processor, cause the processor to implement the method in any one of clauses 1 to 40.

42. A computer program product stored on a non-transitory computer readable media, the computer program product including program code for carrying out the method in any one of clauses 1 to 40.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:

determining, for a conversion between a current video block of a video that is a chroma block and a bitstream of the video, values of parameters of a cross-component linear model (CCLM) in a CCLM mode based on two chroma values denoted as minC and maxC and two luma values denoted as minY and maxY;

deriving, using the CCLM, predicted samples of the current video block based on reconstructed samples of a luma block corresponding to the current video block and the parameters of the CCLM; and performing the conversion based on the predicted samples of the current video block, wherein when maxY is not equal to minY, then one of the parameters is further determined based on a look-up table using an index derived based on a difference between maxY and minY, wherein when maxY is equal to minY, then the predicted samples of the current video block are based on minC and not based on minY, maxY and maxC, wherein maxY and minY are derived based on corresponding luma samples of selected chroma samples, wherein the selected chroma samples are selected from a group of neighboring chroma samples based on positions of the neighboring chroma samples and the CCLM mode of the current video block, wherein the positions of the neighboring chroma samples are derived based on distances from a top-left sample of the current video block to the neighboring chroma samples, wherein minC and maxC are derived based on two or more chroma selected samples from the neighboring chroma samples of the current video block, wherein the two or more chroma selected samples are selected based on the CCLM mode of the current video block and availabilities of the neighboring chroma samples, wherein the CCLM mode of the current video block is one of a first CCLM mode that derives the parameters of CCLM based on left neighboring chroma samples and above neighboring chroma samples, a second CCLM mode that derives the parameters of CCLM based on the left neighboring chroma samples and below-left neighboring samples, and a third CCLM mode that derives the parameters of CCLM based on the above neighboring chroma samples and above-right neighboring chroma sample, wherein a width and a height of the current video block is W and H, respectively, wherein the two or more chroma samples are selected further based on the W and/or the H, and wherein exactly two chroma samples are selected from the above neighboring chroma samples in response to only the above neighboring chroma samples being available, the CCLM mode of the current video block being the first CCLM mode, and the W being equal to 2, wherein positions of the two or more selected chroma selected samples derived based on a first position offset value (F) and a step value (S), and wherein F and S are derived at least based on availabilities of the neighboring chroma samples of the current video block and a dimension of the current video block, wherein a Floor operation comprises $F=\text{Floor}(M/2^i)$, wherein M is a number of the neighboring chroma samples used to derive the selected chroma samples in horizontal direction, or $F=\text{Floor}(N/2^i)$, wherein N is a number of the neighboring chroma samples used to derive the selected chroma samples in vertical direction, i is equal to 2 or 3, and the Floor operation is used to obtain an integer part of a number, and wherein a Max operation comprises $S=\text{Max}(1, \text{Floor}(M/2^j))$, or $S=\text{Max}(1, \text{Floor}(N/2^j))$, j is equal to 1 or 2, and the Max operation is used to obtain a maximum of multiple numbers.

2. The method of claim 1, wherein M and N are both less than or equal to W+H, and determined based on the CCLM mode of the current video block, and wherein in response to the CCLM mode being the first CCLM mode and the above neighboring chroma samples being available, M is equal to W.

3. The method of claim 1, wherein in response to selecting two chroma samples in the horizontal direction, positions of the two selected chroma samples in the horizontal direction are Floor(M/4) and Floor (M/4)+Floor (M/2), wherein in response to selecting two chroma samples in the vertical direction, positions of the two selected chroma samples in the vertical direction are Floor(N/4) and Floor (N/4)+Floor(N/2).

4. The method of claim 1, wherein in response to selecting four chroma samples in the horizontal direction, positions of the four selected chroma samples in the horizontal direction are Floor(M/8), Floor (M/8)+Floor (M/4), Floor (M/8)+2*Floor (M/4), Floor (M/8)+3*Floor (M/4), and wherein in response to selecting four chroma samples in the vertical direction, positions of the four selected chroma samples in the vertical direction are Floor(N/8), Floor(N/8)+Floor (N/4), Floor(N/8)+2*Floor (N/4), Floor(N/8)+3*Floor (N/4).

5. The method of claim 1, further comprising:

determining, based on a color format of the current video block, whether the luma samples are downsampled to derive the values of parameters of the cross-component linear model, wherein the luma samples are downsampled in response to the color format being 4:2:0 or 4:2:2.

6. The method of claim 1, wherein when the CCLM mode is the second CCLM mode, exactly two chroma samples are selected from the left neighboring chroma samples in response to only the left neighboring chroma samples being available and the height of the current video block being equal to 2, and wherein when the CCLM mode is the second CCLM mode, exactly four chroma samples are selected from the left neighboring chroma samples in response to only the left neighboring chroma samples being available and the height of the current video block being larger than 2.

7. The method of claim 1, wherein when the CCLM mode is the third CCLM mode, exactly two chroma samples are selected from the above neighboring chroma samples in response to only the above neighboring chroma samples being available and the width of the current video block being equal to 2, and wherein when the CCLM mode is the third CCLM mode, exactly four chroma samples are selected from the above neighboring chroma samples in response to only the above neighboring chroma samples being available and the width of the current video block being larger than 2.

8. The method of claim 1, wherein the parameters of the CCLM are derived based on a value of Floor (Log2(MAXY-MINY)), and wherein Floor(x) is a floor function that outputs an integer portion of x.

9. The method of claim 1, wherein the determining of the parameters is further based on a two-point method, and wherein at least one sample of the group of neighboring chroma samples that is located beyond 2×W above neighboring chroma samples or 2×H left neighboring chroma samples.

10. The method of claim 1, wherein in a case that maxY is equal to minY, the predicted samples of the current video block are based on a specific chroma value minC, and wherein minC is derived from the neighboring chroma samples of the current video block, wherein the predicted samples of the current video block are set to minC.

11. The method of claim 1, wherein in response to chroma samples and two corresponding luma samples mapped with two original indices being used to derive maxY, maxC, minY, and minC, applying a padding operation to generate two padded chroma samples and two padded luma samples, and wherein the two original indices are denoted as S0 and S1, and two mapped indices with which the padded chroma samples and the two padded luma samples are mapped are denoted as S2 and S3, and wherein the padding operation is done as follows orderly:

1) The chroma sample and the corresponding luma sample mapped with S0 is copied to the chroma sample and the corresponding luma sample mapped with S3, respectively;
2) The chroma sample and the corresponding luma sample mapped with S1 is copied to the chroma sample and the corresponding luma sample mapped with S2, respectively;
3) The chroma sample and the corresponding luma sample mapped with S1 is copied to the chroma sample and the corresponding luma sample mapped with S0, respectively;
4) The chroma sample and the corresponding luma sample mapped with S3 is copied to the chroma sample and the corresponding luma sample mapped with S1, respectively.

12. The method of claim 1, wherein in response to four chroma samples and four corresponding luma samples mapped with four indices being used to derive maxY, maxC, minY, and minC, the four indices are divided into two arrays G0 and G1, each array includes two indices, wherein G0[0]=S0, G0[1]=S2, G1[0]=S1, and G1[1]=S3, and wherein each of S0, S1, S2 and S3 represent one index, which is mapped with a chroma sample and a corresponding luma sample, wherein the method further comprises applying a first comparison between the luma samples of G0[0] and the luma samples of G0[1], and selectively swapping G0[0] and G0[1] based on the first comparison, and wherein the method further comprises swapping G0[0] and G0[1] in response to the luma samples of G0[0] is larger than the luma samples of G0[1].

13. The method of claim 1, wherein when maxY is equal to minY, other intra prediction mode than the cross-component linear model in the CCLM mode is used, and wherein the parameters of the cross-component linear model are derived by excluding a division operation; or, wherein the parameters of the cross-component linear model are derived by using an operation without the look up table, the operation excluding the division operation.

14. The method of claim 1, further comprising determining two or more luma samples corresponding the two or more chroma samples, wherein in response to four luma samples being determined, two maximum values of the four luma samples are averaged to derive a first averaging luma value and two minimum values of the four luma samples are averaged to derive a second averaging luma value, respectively, and wherein the first averaging luma value and the second averaging luma value are used to derive the parameters of CCLM.

15. The method of claim 1, in response to the neighboring chroma samples of the current video block being unavailable, the prediction values of the current video block are set to a default value, and wherein the default value is equal to 1<<(BitDepth-1), wherein BitDepth represents a bit-depth of the chroma samples.

16. The method of claim 1, wherein the conversion includes encoding the current video block into the bitstream.

17. The method of claim 1, wherein the conversion includes decoding the current video block from the bitstream.

18. An apparatus for processing video data comprising a processor and a non-transitory memory with instructions thereon, wherein the instructions upon execution by the processor, cause the processor to:

determine, for a conversion between a current video block of a video that is a chroma block and a bitstream of the video, values of parameters of a cross-component linear model (CCLM) in a CCLM mode based on two chroma values denoted as minC and maxC and two luma values denoted as minY and maxY;

derive, using the CCLM, predicted samples of the current video block based on reconstructed samples of a luma block corresponding to the current video block and the parameters of the CCLM; and perform the conversion based on the predicted samples of the current video block, wherein when maxY is not equal to minY, then one of the parameters is further determined based on a look-up table using an index derived based on a difference between maxY and minY, wherein when maxY is equal to minY, then the predicted samples of the current video block are based on minC and not based on minY, maxY and maxC, wherein maxY and minY are derived based on corresponding luma samples of selected chroma samples, wherein the selected chroma samples are selected from a group of neighboring chroma samples based on positions of the neighboring chroma samples and the CCLM mode of the current video block, wherein the positions of the neighboring chroma samples are derived based on distances from a top-left sample of the current video block to the neighboring chroma samples, wherein minC and maxC are derived based on two or more chroma selected samples from the neighboring chroma samples of the current video block, wherein the two or more chroma selected samples are selected based on the CCLM mode of the current video block and availabilities of the neighboring chroma samples, wherein the CCLM mode of the current video block is one of a first CCLM mode that derives the parameters of CCLM based on left neighboring chroma samples and above neighboring chroma samples, a second CCLM mode that derives the parameters of CCLM based on the left neighboring chroma samples and below-left neighboring samples, and a third CCLM mode that derives the parameters of CCLM based on the above neighboring chroma samples and above-right neighboring chroma sample, wherein a width and a height of the current video block is W and H, respectively, wherein the two or more chroma samples are selected further based on the W and/or the H, and wherein exactly two chroma samples are selected from the above neighboring chroma samples in response to only the above neighboring chroma samples being available, the CCLM mode of the current video block being the first CCLM mode, and the W being equal to 2, wherein positions of the two or more selected chroma selected samples derived based on a first position offset value (F) and a step value (S), and wherein F and S are derived at least based on availabilities of the neighboring chroma samples of the current video block and a dimension of the current video block, wherein a Floor operation comprises F=Floor $(M/2^i)$, wherein M is a number of the neighboring chroma samples used to derive the selected chroma samples in horizontal direction, or F=Floor $(N/2^i)$, wherein N is a number of the neighboring chroma samples used to derive the selected chroma samples in vertical direction, i is equal to 2 or 3, and the Floor operation is used to obtain an integer part of a number, and wherein a Max operation comprises S=Max(1, Floor $(M/2^j)$), or S=Max(1, Floor $(N/2^j)$), j is equal to 1 or 2, and the Max operation is used to obtain a maximum of multiple numbers.

19. A non-transitory computer-readable storage medium storing instructions that cause a processor to:

determine, for a conversion between a current video block of a video that is a chroma block and a bitstream of the video, values of parameters of a cross-component linear model (CCLM) in a CCLM mode based on two chroma values denoted as minC and maxC and two luma values denoted as minY and maxY;

derive, using the CCLM, predicted samples of the current video block based on reconstructed samples of a luma block corresponding to the current video block and the parameters of the CCLM; and perform the conversion based on the predicted samples of the current video block, wherein when maxY is not equal to minY, then one of the parameters is further determined based on a look-up table using an index derived based on a difference between maxY and minY, wherein when maxY is equal to minY, then the predicted samples of the current video block are based on minC and not based on minY, maxY and maxC, wherein maxY and minY are derived based on corresponding luma samples of selected chroma samples, wherein the selected chroma samples are selected from a group of neighboring chroma samples based on positions of the neighboring chroma samples and the CCLM mode of the current video block, wherein the positions of the neighboring chroma samples are derived based on distances from a top-left sample of the current video block to the neighboring chroma samples, wherein minC and maxC are derived based on two or more chroma selected samples from the neighboring chroma samples of the current video block, wherein the two or more chroma selected samples are selected based on the CCLM mode of the current video block and availabilities of the neighboring chroma samples, wherein the CCLM mode of the current video block is one of a first CCLM mode that derives the parameters of CCLM based on left neighboring chroma samples and above neighboring chroma samples, a second CCLM mode that derives the parameters of CCLM based on the left neighboring chroma samples and below-left neighboring samples, and a third CCLM mode that derives the parameters of CCLM based on the above neighboring chroma samples and above-right neighboring chroma sample, wherein a width and a height of the current video block is W and H, respectively, wherein the two or more chroma samples are selected further based on the W and/or the H, and wherein exactly two chroma samples are selected from the above neighboring chroma samples in response to only the above neighboring chroma samples being available, the CCLM mode of the current video block being the first CCLM mode, and the W being equal to 2, wherein positions of the two or more selected chroma selected samples derived based on a first position offset value (F) and a step value (S), and wherein F and S are derived at least based on availabilities of the neighboring chroma samples of the current video block and a dimension of the current video block, wherein a Floor operation comprises $F=\text{Floor}(M/2^i)$, wherein M is a number of the neighboring chroma samples used to derive the selected chroma samples in horizontal direction, or $F=\text{Floor}(N/2^i)$, wherein N is a number of the neighboring chroma samples used to derive the selected chroma samples in vertical direction, i is equal to 2 or 3, and the Floor operation is used to obtain an integer part of a number, and wherein a Max operation comprises $S=\text{Max}(1, \text{Floor}(M/2^j))$, or $S=\text{Max}(1, \text{Floor}(N/2^j))$, j is equal to 1 or 2, and the Max operation is used to obtain a maximum of multiple numbers.

20. A non-transitory computer-readable recording medium storing a bitstream of a video which is generated by a method performed by a video processing apparatus, wherein the method comprises:

determining, for a current video block of the video that is a chroma block, values of parameters of a cross-component linear model (CCLM) in a CCLM mode based on two chroma values denoted as minC and maxC and two luma values denoted as minY and maxY;

deriving, using the CCLM, predicted samples of the current video block based on reconstructed samples of a luma block corresponding to the current video block and the parameters of the CCLM; and generating the bitstream based on the predicted samples of the current video block, wherein when maxY is not equal to minY, then one of the parameters is further determined based on a look-up table using an index derived based on a difference between maxY and minY, wherein when maxY is equal to minY, then the predicted samples of the current video block are based on minC and not based on minY, maxY and maxC, wherein maxY and minY are derived based on corresponding luma samples of selected chroma samples, wherein the selected chroma samples are selected from a group of neighboring chroma samples based on positions of the neighboring chroma samples and the CCLM mode of the current video block, wherein the positions of the neighboring chroma samples are derived based on distances from a top-left sample of the current video block to the neighboring chroma samples, wherein minC and maxC are derived based on two or more chroma selected samples from the neighboring chroma samples of the current video block, wherein the two or more chroma selected samples are selected based on the CCLM mode of the current video block and availabilities of the neighboring chroma samples;

wherein the CCLM mode of the current video block is one of a first CCLM mode that derives the parameters of CCLM based on left neighboring chroma samples and above neighboring chroma samples, a second CCLM mode that derives the parameters of CCLM based on the left neighboring chroma samples and below-left neighboring samples, and a third CCLM mode that derives the parameters of CCLM based on the above neighboring chroma samples and above-right neighboring chroma sample, wherein a width and a height of the current video block is W and H, respectively, wherein the two or more chroma samples are selected further based on the W and/or the H, and wherein exactly two chroma samples are selected from the above neighboring chroma samples in response to only the above neighboring chroma samples being available, the CCLM mode of the current video block being the first CCLM mode, and the W being equal to 2, wherein positions of the two or more selected chroma selected samples derived based on a first position offset value (F) and a step value (S), and wherein F and S are derived at least based on availabilities of the neighboring chroma samples of the current video block and a dimension of the current video block, wherein a Floor operation comprises $F=\text{Floor}(M/2^i)$, wherein M is a number of the neighboring chroma samples used to derive the selected chroma samples in horizontal direction, or $F=\text{Floor}(N/2^i)$, wherein N is a number of the neighboring chroma samples used to derive the selected chroma samples in vertical direction, i is equal to 2 or 3, and the Floor operation is used to obtain an integer part of a number, wherein a Max operation comprises $S=\text{Max}(1, \text{Floor}(M/2^j))$, or $S=\text{Max}(1, \text{Floor}(N/2^j))$, j is equal to 1 or 2, and the Max operation is used to obtain a maximum of multiple numbers.

* * * * *